US008065307B2

(12) United States Patent
Haslam et al.

(10) Patent No.: US 8,065,307 B2
(45) Date of Patent: Nov. 22, 2011

(54) PARSING, ANALYSIS AND SCORING OF DOCUMENT CONTENT

(75) Inventors: Brian Dean Haslam, North Bend, WA (US); Patrick Wayne John Evans, Redmond, WA (US); Arul Menezes, Sammamish, WA (US); Patrick Santos, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1080 days.

(21) Appl. No.: 11/613,958

(22) Filed: Dec. 20, 2006

(65) Prior Publication Data
US 2008/0154848 A1 Jun. 26, 2008

(51) Int. Cl.
*G06F 17/30* (2006.01)
(52) U.S. Cl. ......... 707/738; 707/750; 707/751; 707/755
(58) Field of Classification Search .............. 707/3, 102, 707/736, 738, 750, 751, 755
See application file for complete search history.

(56) References Cited

U.S. PATENT DOCUMENTS

| 4,815,005 | A |   | 3/1989  | Oyanagi et al.  |             |
|-----------|---|---|---------|-----------------|-------------|
| 4,839,853 | A |   | 6/1989  | Deerwester et al. |           |
| 5,056,021 | A |   | 10/1991 | Ausborn         |             |
| 5,278,980 | A |   | 1/1994  | Pedersen et al. |             |
| 5,325,298 | A |   | 6/1994  | Gallant         |             |
| 5,377,103 | A |   | 12/1994 | Lamberti et al. |             |
| 5,424,947 | A |   | 6/1995  | Nagao et al.    |             |
| 5,488,719 | A |   | 1/1996  | Kaplan et al.   |             |
| 5,592,661 | A |   | 1/1997  | Eisenberg et al. |            |
| 5,617,578 | A |   | 4/1997  | Kroll et al.    |             |
| 5,619,709 | A |   | 4/1997  | Caid et al.     |             |
| 5,675,745 | A |   | 10/1997 | Oku et al.      |             |
| 5,675,819 | A |   | 10/1997 | Schuetze        |             |
| 5,724,594 | A |   | 3/1998  | Pentheroudakis  |             |
| 5,745,745 | A | * | 4/1998  | Tada et al.     | 707/999.001 |
| 5,754,840 | A | * | 5/1998  | Rivette et al.  | 707/999.002 |
| 5,774,833 | A | * | 6/1998  | Newman          | 704/9       |
| 5,794,050 | A |   | 8/1998  | Dahlgren et al. |             |
| 5,794,178 | A |   | 8/1998  | Caid et al.     |             |
| 5,794,236 | A |   | 8/1998  | Mehrle          |             |
| 5,799,308 | A |   | 8/1998  | Dixon           |             |
| 5,873,056 | A |   | 2/1999  | Liddy et al.    |             |

(Continued)

FOREIGN PATENT DOCUMENTS
CN  1252876 A  5/2000
(Continued)

OTHER PUBLICATIONS

Indukuri et. al., Similarity Analysis of Patent Claims Using Natural Language Processing Techniques, 2007, International Conference on Computational Intelligence and Multimedia Applications, pp. 1-7.*

(Continued)

*Primary Examiner* — Charles Rones
*Assistant Examiner* — Rezwanul Mahmood

(57) ABSTRACT

The present invention may be used to analyze subject content, search and analyze reference content, compare the subject and reference content for similarity, and output comparison reports between the subject and reference content. The present invention may incorporate and utilize text from intrinsic and/or extrinsic subject documents. The analysis may employ a variety of metrics, including scores generated from a natural language processing system, scores based on classification similarity, scores based on proximity similarity, and in the case of analysis of patent documents, scores based on measurement of claims.

19 Claims, 34 Drawing Sheets

U.S. PATENT DOCUMENTS

| | | | |
|---|---|---|---|
| 5,991,751 A * | 11/1999 | Rivette et al. | 707/999.001 |
| 6,006,221 A | 12/1999 | Liddy et al. | |
| 6,038,561 A * | 3/2000 | Snyder et al. | 707/999.006 |
| 6,038,574 A | 3/2000 | Pitkow et al. | |
| 6,070,134 A | 5/2000 | Richardson et al. | |
| 6,076,051 A | 6/2000 | Messerly et al. | |
| 6,098,033 A | 8/2000 | Richardson et al. | |
| 6,161,084 A | 12/2000 | Messerly et al. | |
| 6,161,130 A | 12/2000 | Horvitz et al. | |
| 6,175,824 B1 | 1/2001 | Breitzman et al. | |
| 6,182,091 B1 | 1/2001 | Pitkow et al. | |
| 6,192,360 B1 | 2/2001 | Dumais et al. | |
| 6,246,977 B1 | 6/2001 | Messerly et al. | |
| 6,253,169 B1 | 6/2001 | Apte et al. | |
| 6,286,018 B1 | 9/2001 | Pitkow et al. | |
| 6,339,767 B1 | 1/2002 | Rivette et al. | |
| 6,389,436 B1 | 5/2002 | Chakrabarti et al. | |
| 6,457,028 B1 | 9/2002 | Pitkow et al. | |
| 6,499,026 B1 | 12/2002 | Rivette et al. | |
| 6,728,725 B2 | 4/2004 | Garfield et al. | |
| 6,871,174 B1 | 3/2005 | Dolan et al. | |
| 6,879,990 B1 * | 4/2005 | Boyer et al. | 707/749 |
| 7,013,264 B2 | 3/2006 | Dolan et al. | |
| 7,089,226 B1 | 8/2006 | Dumais et al. | |
| 7,383,169 B1 | 6/2008 | Vanderwende et al. | |
| 7,716,226 B2 * | 5/2010 | Barney | 707/748 |
| 2002/0035499 A1 | 3/2002 | Germeraad et al. | |
| 2002/0090631 A1 | 7/2002 | Gough et al. | |
| 2002/0163541 A1 | 11/2002 | Williams et al. | |
| 2002/0184044 A1 | 12/2002 | Reader | |
| 2003/0004716 A1 * | 1/2003 | Haigh et al. | 704/238 |
| 2003/0026459 A1 * | 2/2003 | Won et al. | 382/113 |
| 2003/0028460 A1 | 2/2003 | Kraemer | |
| 2003/0033295 A1 | 2/2003 | Adler et al. | |
| 2003/0046307 A1 | 3/2003 | Rivette et al. | |
| 2003/0059837 A1 | 3/2003 | Levinson et al. | |
| 2003/0074351 A1 * | 4/2003 | van Stegeren et al. | 707/3 |
| 2003/0187832 A1 * | 10/2003 | Reader | 707/3 |
| 2003/0212572 A1 | 11/2003 | Poltorak | |
| 2004/0015481 A1 * | 1/2004 | Zinda | 707/1 |
| 2004/0059566 A1 | 3/2004 | Fogel et al. | |
| 2004/0059661 A1 | 3/2004 | Arndt et al. | |
| 2004/0059994 A1 * | 3/2004 | Fogel et al. | 715/500 |
| 2004/0078192 A1 | 4/2004 | Poltorak | |
| 2004/0078365 A1 * | 4/2004 | Poltorak | 707/3 |
| 2004/0088332 A1 | 5/2004 | Lee et al. | |
| 2004/0103112 A1 * | 5/2004 | Colson et al. | 707/102 |
| 2004/0122656 A1 * | 6/2004 | Abir | 704/4 |
| 2004/0123235 A1 | 6/2004 | Yeh et al. | |
| 2004/0153467 A1 | 8/2004 | Conover et al. | |
| 2004/0181427 A1 * | 9/2004 | Stobbs et al. | 705/1 |
| 2005/0004806 A1 * | 1/2005 | Lin et al. | 705/1 |
| 2005/0010515 A1 | 1/2005 | Woltjen | |
| 2005/0010580 A1 | 1/2005 | Lancefield | |
| 2005/0049990 A1 | 3/2005 | Milenova et al. | |
| 2005/0050087 A1 | 3/2005 | Milenova et al. | |
| 2005/0108652 A1 * | 5/2005 | Beretich et al. | 715/764 |
| 2005/0198026 A1 * | 9/2005 | Dehlinger et al. | 707/5 |
| 2005/0210008 A1 | 9/2005 | Tran et al. | |
| 2005/0262031 A1 | 11/2005 | Saidi et al. | |
| 2006/0063156 A1 | 3/2006 | Willman et al. | |
| 2006/0095248 A1 * | 5/2006 | Menezes et al. | 704/3 |
| 2006/0122849 A1 * | 6/2006 | Masuyama et al. | 705/1 |
| 2006/0149711 A1 * | 7/2006 | Zellner | 707/3 |
| 2006/0173903 A1 * | 8/2006 | Zimmerman et al. | 707/102 |
| 2006/0173920 A1 | 8/2006 | Adler et al. | |
| 2006/0224972 A1 | 10/2006 | Albrecht et al. | |
| 2006/0224974 A1 | 10/2006 | Albrecht et al. | |
| 2006/0224975 A1 | 10/2006 | Albrecht et al. | |
| 2006/0224980 A1 | 10/2006 | Albrecht et al. | |
| 2006/0224982 A1 | 10/2006 | Albrecht et al. | |
| 2006/0224983 A1 | 10/2006 | Albrecht et al. | |
| 2006/0224984 A1 | 10/2006 | Albrecht et al. | |
| 2006/0224999 A1 | 10/2006 | Albrecht et al. | |
| 2006/0225000 A1 | 10/2006 | Albrecht et al. | |
| 2006/0248055 A1 * | 11/2006 | Haslam et al. | 707/3 |
| 2006/0248094 A1 * | 11/2006 | Andrews et al. | 707/100 |
| 2006/0259475 A1 * | 11/2006 | Dehlinger | 707/3 |
| 2007/0073625 A1 * | 3/2007 | Shelton | 705/59 |
| 2007/0136116 A1 | 6/2007 | Germeraad et al. | |
| 2007/0208669 A1 | 9/2007 | Rivette et al. | |
| 2008/0005103 A1 * | 1/2008 | Ratcliffe et al. | 707/5 |
| 2008/0288489 A1 * | 11/2008 | Kim | 707/6 |
| 2008/0310723 A1 * | 12/2008 | Manu et al. | 382/182 |

FOREIGN PATENT DOCUMENTS

| | | |
|---|---|---|
| CN | 1429370 A | 7/2003 |
| EP | 0304191 A2 | 2/1989 |
| EP | 0386825 A1 | 9/1990 |
| EP | 0687987 A1 | 12/1995 |
| EP | 0805404 A1 | 11/1997 |
| EP | 0965089 A1 | 12/1999 |
| EP | 1290574 A2 | 11/2001 |
| EP | 1 276 059 A2 | 1/2003 |
| JP | 2001513243 T | 8/2001 |
| JP | 2003533827 T | 11/2003 |
| JP | 2004094528 A | 3/2004 |
| WO | WO 98/39714 A1 | 9/1998 |
| WO | WO 00/60495 A2 | 10/2000 |
| WO | WO 01/88747 A2 | 11/2001 |
| WO | WO 2005/048055 | 11/2004 |

OTHER PUBLICATIONS

Web Site: http://www.google.com/patents, Dec. 14, 2006.

Jonathan A. Barney, Comparative Patent Quality Analysis—A Statistical Approach for Rating and Valuing Patent Assets, 2001, USA.

Takeuchi, Hironori; Uramoto, Koichi; Takeda, Koichi. Experiments on Patent Retrieval at NTCIR-4 Workshop, Working Notes of NTCIR-4, Tokyo, Jun. 2-4, 2004.

Amsler, The Structure of the Merriam-Webster Picket Dictionary, Dec. 1980, pp. 1-163.

Atkins et al., "Explicit and Implicit Information in Dictionaries," Proceedings of the Second Annual Conference of the University of Waterloo Centre for the Oxford English Dictionary: Advances in Lexicology, 1986, pp. 45-63.

Boguraev et al., "From Structural Analysis of Lexical Resources to Semantics in a Lexical Knowledge Base," Position paper for Workshop on Lexicon Acquisition (IJCAI, Detroit, 1989), not published in proceedings, 16 pages.

Calzolari, "Detecting Patterns in a Lexical Data Base," Proceedings of COLING84, 1984, pp. 170-173.

Chodorow et al., "Extracting Semantic Hierarchies From A Large On-Line Dictionary," Proceedings of the 23rd Annual Meeting of the Association for Computational Linguistics, Jul. 1985, pp. 299-304.

Dahlgren, Naive Semantics for Natural Language Understanding, Kluwer Academic Publishers, Norwell, MA, 1988, pp. 1-258.

Grishman et al., "Acquisition of Selectional Patterns," Proc. of COLING-92, Nantest, Aug. 23-28, 1992, pp. 658-664.

Jensen et al., "Disambiguating Prepositional Phrase Attachments by Using On-Line Dictionary Definitions," Computational Linguistics, vol. 13, Nos. 3-4, Jul.-Dec. 1987, pp. 251-260.

Jensen, "A Broad-Coverage Natural Language Analysis System," Current Issues in Parsing Technology, Chapter 17, Kluwer Academic Publishers, 1991, pp. 261-276.

Klavans et al., "From Dictionary to Knowledge Base via Taxonomy," Proceedings of the 4th Annual Conference of the University of Waterloo Centre for the New Oxford English Dictionary: Electronic Text Research, 1990, pp. 110-132.

Lenat et al., Building Large Knowledge-Based Systems: Representation and Inference in the Cyc Project, Addison-Wesley Publishing Company, Inc., 1989, pp. 1-372.

Markowitz, et al., "Semantically Significant Pattersn In Dictionary Definitions," Proceedings of the 24th Annual Meeting of the ACL, 1986, pp. 112-119.

Miller et al., "Introduction to WordNet: An On-line Lexical Database," International Journal of Lexicography, vol. 3, No. 4, Oxford University Press, 1990, pp. 235-244.

Montemagni et al., L"Structural Pattersn vs. String Patterns for Extracting Semantic Information from Dictionaries," Proceedings of COLING92, 1992, pp. 546-552.

Pustejovsky et al., "Lexical Semantic Techniques for Corpus Analysis," Computational Linguistics, vol. 19, No. 2, pp. 331-358, 1993.

Ravin, "Disambiguating and Interpreting Verb Definitions," Proceedings of the 28th Annual Meeting of the ACL, 1990, pp. 260-267.

Velardi et al., "How to Encode Semantic Knowledge: A Method for Meaning Representation and Computer-Aided Acquisition," Computational Linguistics, vol. 17, No. 2, pp. 153-170, 1991.

Veronis et al., "Large Neural Networks for the Resolution of Lexical Ambiguity," GRTC/CNRS Technical Report No. 593, Feb. 1993, 21 pages.

Wilks et al., "A Tractable Machine Dictionary as a Resource for Computational Semantics," Computational Lexicography for Natural Language Processing, London: Longman Group, 1989, pp. 193-228.

Alshawi, H., "Analysing the Dictionary Definitions," Computational Lexicography for Natural Language Processing, ed. B.K. Boguraev and E.J. Briscoe, 153-170, London: Longman Group, 1989.

Basili, R., M.T. Pazienaz, and P. Velardi, "Combining NLP and Statistical Techniques for Lexical Acquisition," Proceedings of AAAI Fall Symposium Series: Probabilistic Approaches to Natural Language, Oct. 23-25, 1992, pp. 1-9, 1992.

Grefenstette, G., 1992, "Finding Semantic Similarity in Raw Text: the Deese Antonyms," Proceedings of aAAI FallSymposium Series: Probabilistic Approaches to Natural Language, Oct. 23-25, 1992, pp. 61-65, 1992.

Hearst, M.A., "Automatic Acquisition of Hyponyms from Large Text Corpora," COLING92, pp. 539-545, 1992.

Montemagni, S., "Tailoring a Broad-Coverage Grammar for the Analysis of Dictionary Definitions," EURALEX .ae butted.92: Papers Submitted to the 5th International Euralex Congress on Lexicography, 1992.

Lenat, "Steps to Sharing Knowledge," Towards Very Large Knowledge Bases, IOS Press, 1995, pp. 3-6.

Guha et al., "Cyc: A Mid-Term Report," MCC Technical Report Number ACT-CYC-134-90, Mar. 1990.

Berg-Cross, "Can a Large Knowledge Base Be Built By Importing and Unifying Diverse Knowledge?: Lessons From Scruffy Work," Knowledge-Based Systems, vol. 5, No. 3, Sep. 1992, pp. 245-254.

Guha et al., "Cyc: A Mid-Term Report," AI Magazine, 1990, pp. 45-86.

Dagan et al., "Similarity-Based Estimation of Word Coocurrence Probabilities," in Proceedings of the 32nd Annual Meeting of the ACL, 1994, pp. 272-278.

Dagan et al., "Contextual Word Similarity and Estimation From Sparse Data," in Proceedings of the 31st Annual Meeting of the Assoc. for Computational Linguistics, Columbus, OH, Jun. 2-26, 1993, pp. 164-171.

Resnik, Philip, "Disambiguating Noun Groups With Respect to WordNet Senses," in Proceedings of the Third Workshop on Very Large Corpora, MA, Jun. 30, 1995, pp. 1-16.

Salton, Gerard, and Michael J. McGill, Introduction to Modern Information Retrieval, McGraw-Hill Publishing Co., New York, NY 1983, pp. 1-448.

Wilks et al., "Providing Machine Tractable Dictonary Tools," Machine Translations 5:99-154, 1990.

Hindle, Donald, "Noun Classification From Predicate-Argument Structures," in Proceedings of the 28th Annual Meeting of the ACL, Pittsburgh, PA. Jun. 6-9, 1990, pp. 268-275.

Sato, Satoshi, "Example-Based Machine Translation," in Proceedings of the International Workshop on Fundamental Research for the Future Generation of Natural Language Processing, Kyoto, Japan, Sep. 1991, pp. 1-16.

Hearst, Marti A., and Gregory Grefenstette, Refining Automatically-Discovered Lexical Relations: Combining Weak Techniques for Stronger Results,: in Papers From the 1992 AAAI Workshop, Menlo Park, CA 1992, pp. 64-72.

Furuse, Osamu, and Hitoshi Iida, "An Example-Based Method for Transfer-Driven Machine Translation," in Proc. Of the 4th International Conference on Theoretical and Methodological Issues in Machine Translation, Montreal, Quebec, Canada, 1992, pp. 139-150.

Yarowsky, David, "Word-Sense Disambiguation Using Statistical Models of Roget's Categories Trained on Large Corpora," in Proceedings in the 15th Int'l. Conference on Computational Linguistics, Nantes, France, Aug. 23-28, 1992, pp. 454-460.

Brown et al., "Class-Based n-gram Models of Natural Language," Computational Linguistics 18(4):467-479, Dec. 1992.

Tsutsumi, Taijiri, Natural Language Processing: The PLNLP Approach, Kluwer Academic Publishers, Boston, MA, 1993, Chap. 20, "Word-Sense Disambiguation by Examples," pp. 263-272.

Pereira et al., "Distributional Clustering of English Words," in Proceedings of the 31st Annual Meeting of Assoc. for Computational Linguistics, Columbus, OH, Jun. 22-26, 1993, pp. 183-190.

Kozima, Hideki, and Teiji Furugori, "Similarity Between Words Computed by Spreading Activation on an English Dictionary," in Proceedings of the 6th Conference of the European Chapter of the ACL, Utrecht, Germany, 1993, pp. 232-240.

Braden-Harder, Lisa, Natural Language Processing: The PLNLP Approach, Kluwer Academic Publishers, Boston, MA, 1993, Chap. 19, "Sense Disambiguation Using Online Dictionaries," pp. 247-261.

Utsuro et al., "Thesaurus-Based Efficient Example Retrieval by Generating Retrieval Queries From Similarities," in Proceedings of the 15th International Conference on Computational Linguistics, Kyoto, Japan, Aug. 509, 1994, pp. 1044-1048.

Grishman, Ralph, and John Sterling, "Generalizing Automatically Generated Selectional patterns," in Proceedings of the 15th International Conference on Computational Linguistics, Kyoto, Japan, Aug. 5-9, 1994, pp. 742-747.

Uramoto, Naohiko, "A Best-Match Algorithm for Broad-Coverage Example-Based Disambiguation," in Proceedings of the 15th International Conference on Computational Linguistics, Kyoto, Japan, Aug. 5-9, 1994, pp. 717-721.

Agirre, Eneko, and German Rigau, "Word Sense Disambiguation Using Conceptual Density," in Proceedings of COLING 96, 1996, pp. 16-23.

Van Zuijlen, Job M., Probabilistic Methods in Dependency Grammar Parsing,: International Parsing Workshop, 10375-142-141, 1989.

Gerard Salton, "Automatic Information Organization and Retrieval," McGraw Hill Book Company, pp. 168-178 (1968).

Fagan, Joel, L., Ph.D., Experiments in automatic phrase indexing for document retrieval: A comparison of syntatic and non-syntatic methods,: Cornell University, UMI Dissertation Information Service, pp. 1-261 (1987).

James Allen, "Natural Language Understanding," The Benjamin/Cummings Publishing Company, Inc. Chapter 8, pp. 227-238, 1995.

Sumita, Eiichiro, and Hitoshi Iida, "Experiments and Prospects of Example-Based Machine Translation," in Proceedings of the 29.sup.th Annual Meeting of the ACL, 1991, pp. 185-192.

Leah S. Larkey, "Some Issues in the Automatic Classification of U.S. Patents", In Learning for Text Categorization, Papers from the 1998 Workshop. AAAI Press, Technical Report WS-98-05, pp. 87-90.

Leah S. Larkey, "A Patent Search and Classification System", in Digital Libraries 9—The Fourth ACM Conference on Digital Libraries (Berkely, CA, Aug. 11-14, 1999) ACM Press, pp. 79-87.

Larkey, Leah S., Connell, Margaret and Callan, Jamie; "Collection Selection and Results Merging with Topically Organized U.S. Patents and TREC Data", In Proceedings of Ninth International Conference on Information Knowledge and Management, (Nov. 6-10, 2000. Washington D.C.) ACM Press, pp. 282-289.

Lewis, David D. et al; "Report on the Workshop on Operational Text Classification Systems (OTC-01)" includes presentation summary from Montgomery, Thomas p. 3; Sep. 2001 pp. 1-4.

Online Help for Text Clustering, Thomson Delphion, Obtained Online on Apr. 18 2005. pp. 1-6.

Online Web Help for Aureka Thesescape and Aureka Citation Analysis, Cashed by Google Search Engine, http://www.google.com/search?q=cache:jk8BwS3fEzAJ:www.aurigin.com/static/advanced.htm+aureka+themescape&hl=en, Obtained Online on Apr. 18, 2005. pp. 1 -7.

Jason D.M. Rennie. Improving multi-class text classification with naive bayes. Master's thesis, Massachusetts Institute of Technology, 2001. http://citeseer.ist.psu.edu/article/rennie01improving.html. pp. 1-43.

Fall, C.J., Torcsvari, A., Benzineb K., and Karetka, G. 2003. Automated categorization in the international patent classification. SIGAR Forum 37, 1 (Apr. 2003), 10-25. DOI=http://doi.acm.org/10.1145/945546.945547 pp. 1-16.

Cited Reference Searching in Files, 34, 434 "SciSearch (registered")", Thomson Dialog; Copyright 2003 Dialog; 6 pages.

Rennie, J.D.M; Rifkin, R. Improving Multiclass Text Classification with the Support Vector Machine. (2001). pp. 1-14.

International Search Report for PCT/US 98/03005, Mailing Date Jun. 10, 1998. pp. 1-2 .

International Search Report for PCT/US 01/15675, Mailing Date Jul. 4, 2002. pp. 1-3.

Garfield, E., I.H. Sher and R.J. Torpie "The Use of Citation Data in Writing the History of Science", Institute for Scientific Information, Dec. 31, 1967. pp. 1-71.

Garner, R. "A Computer-Oriented Graph Theoretic Analysis of Citation Index Structures", in "Three Drexel Information Science Research Studies", B. Flood, ed., Drexel Press, 1967. pp. 1-54.

Wouters, P. "The Citation Culture", PhD Thesis, University of Amsterdam, downloaded from garfield.library.upenn.edu/wouters/wouters.pdf, 1999. pp. 1-290.

Yancey, R. "Fifty Years of Citation Indexing and Analysis", KnowledgeLink Newsletter from Thomson Scientific, Sep. 2005. pp. 1-3.

Garfield, E. "Historiographs, Librarianship and the History of Science", Current Contents, vol. 38, Sep. 18, 1974. pp. 1-15.

Preliminary Examination Report for PCT/US01/15675, Report received Aug. 30, 2002. pp. 1-2.

* cited by examiner

Content Similarity Report – Subject Content 7,900,000

| | UPC Similarity | IPC Similarity | Logical Content Score | Logical Abstract Score | Logical Claim Score | Centroid Score | Cited by Subject Patent | Cited by Examiner | Overall Score |
|---|---|---|---|---|---|---|---|---|---|
| 8,000,000 | 0.7 | 0.4 | 0.8 | 0.6 | 0.7 | 0.6 | No | No | 0.7 |
| 8,400,000 | 0.5 | 0.6 | 0.7 | 0.5 | 0.6 | 0.5 | Yes | Yes | 0.6 |
| Http://www.microsoft.com/Reference.htm | 0.0 | 0.0 | 0.1 | 0.3 | 0.2 | 0.2 | No | No | 0.3 |
| 7,600,000 | 0.1 | 0.2 | 0.0 | 0.0 | 0.1 | 0.2 | Yes | No | 0.2 |
| 7,559,000 | 0.0 | 0.0 | 0.0 | 0.0 | 0.0 | 0.0 | No | No | 0.0 |
| 7,231,000 | 0.0 | 0.0 | 0.0 | 0.0 | 0.0 | 0.0 | No | No | 0.0 |

Figure 11

```
  1500  1502 1506  1508    1510
    \    \    \     \       \
    @@ store__Verb Tobj content__Noun
```

| POS | TERM |
|---|---|
| 17 | political |
| 18 | bands |
| 21 | connected |
| 24 | one |
| 27 | to |
| 28 | assume |

2000

Average Position (AVG) = (17 + 18 + 21 + 24 + 27 + 28 / 6)
= 22.5

| TERM | POS | POS-AVG | (POS-AVG)$^2$ |
|---|---|---|---|
| political | 17 | 5.5 | 30.25 |
| bands | 18 | 4.5 | 20.25 |
| connected | 21 | 1.5 | 2.25 |
| one | 24 | -1.5 | 2.25 |
| to | 27 | -4.5 | 20.25 |
| assume | 28 | -5.5 | 30.25 |

2010

2020

Average Square of Differences (ASD)
= (30.25 + 20.25 + 2.25 + 2.25 + 20.25 + 30.25) / 6
= 17.58333

2030

$\sqrt{ASD} \approx \sqrt{17.58} \approx 4.19$ = Unnormalized Centroid Score

When in the course of human events, it becomes necessary for one people to
1    2  3    4    5    6        7    8    9          10   11 12  13   14 dissolve the political bands which have connected them with one another, and
   15    16    17      18    19    20      21      22   23  24    25      26 to assume among the powers of the earth the separate and  equal station to
27   28      29    30    31    32 33   34    35    36       37    38    39   40 which the laws of nature, and of nature's God, entitle them.
  41   42   43  44    45       46  47   48       49     50    51

2110

| word | | | | | | |
|---|---|---|---|---|---|---|
| among | 29 | | | | | |
| and | 26 | 37 | 46 | | | |
| another | 25 | | | | | |
| assume | 28 | | | | | |
| bands | 18 | | | | | |
| becomes | 9 | | | | | |
| connected | 21 | | | | | |
| course | 4 | | | | | |
| dissolve | 15 | | | | | |
| earth | 34 | | | | | |
| entitle | 50 | | | | | |
| equal | 38 | | | | | |
| events | 7 | | | | | |
| for | 11 | | | | | |
| God | 49 | | | | | |
| have | 20 | | | | | |
| human | 6 | | | | | |
| in | 2 | | | | | |
| it | 8 | | | | | |
| laws | 43 | | | | | |
| nature | 45 | 48 | | | | |
| necessary | 10 | | | | | |
| of | 5 | | | | | |
| of | 32 | | | | | |
| of | 44 | | | | | |
| of | 47 | | | | | |
| one | 12 | 24 | | | | |
| people | 13 | | | | | |
| political | 17 | | | | | |
| powers | 31 | | | | | |
| separate | 36 | | | | | |
| station | 39 | | | | | |
| the | 3 | 16 | 30 | 33 | 35 | 42 |
| them | 22 | 51 | | | | |
| to | 14 | 27 | 40 | | | |
| when | 1 | | | | | |
| which | 19 | 41 | | | | |
| with | 23 | | | | | |

Figure 21

2500 — Subject Patent: 8,432,000
Subject Priority Date: 9/12/2012
Subject Patent Title: A Method and System for Writing Data from Files
Subject Abstract: ...

2502 —

| | | References Found | 2508 | 2510 |
|---|---|---|---|---|
| 2504 | 2506 | | | |

2512 —

| Reference ID | Priority Date | Assignee/Owner | Title | 2516 |
|---|---|---|---|---|
| http://www.microsoft.com/Reference.htm | 8/1/2006 | Microsoft | API for Opening Files | |
| US8,000,000 | 9/7/2010 | Patrick Smith | System and Method for Opening Files | |
| EP 900000 | 3/14/2009 | Brian Santos | Computer for Opening Files | |

2514 —

- - - - - - - - - - - - - - - - - - - - - - - - -

2548 —

| 2550 | Automatically Generated Claim Chart 2552 | 2554 |
|---|---|---|
| 8,432,000; Claim 1 | Support in 8,432,000 Specification | Http://www.microsoft.com/Reference.htm |
| A computer-readable medium comprising instructions for: | Para. 2: "The software is placed on a computer-readable medium." | "Software is ubiquitous." |
| opening a file; | Para. 3: "In step 10, the file is opened." | "MFC contains an API for opening files." |
| reading contents. | Para. 4: "In step 12, the contents are read." | "After a stream has been opened, data may be read from the file." |

- - - - - - - - - - - - - - - - - - - - - - - - -

2556 —

| 2558 | Automatically Generated Claim Chart 2560 | 2562 |
|---|---|---|
| 8,432,000; Claim 1 | Support in 8,432,000 Specification | US8,000,000 |
| A computer-readable medium comprising instructions for: | Para. 2: "The software is placed on a computer-readable medium." | Para. 11: "Software is stored on magnetic media." |
| opening a file; | Para. 3: "In step 10, the file is opened." | Para. 12: "For example, files are opened and data from the file is read." |
| reading contents. | Para. 4: "In step 12, the contents are read." | Para. 12: "For example, files are opened and data from the file is read." |

Figure 25

PARSING, ANALYSIS AND SCORING OF DOCUMENT CONTENT

The following U.S. patent applications are hereby fully incorporated by reference: DETERMINING SIMILARITY BETWEEN WORDS, U.S. Pat. No. 6,098,033; and Method and System for Compiling a Lexical Knowledge Base, U.S. Pat. No. 7,383,169; and SYSTEM AND METHOD FOR MATCHING A TEXTUAL INPUT TO A LEXICAL KNOWLEDGE BASE AND FOR UTILIZING RESULTS OF THAT MATCH, U.S. Pat. No. 6,871,174.

TECHNICAL FIELD

Techniques for content search, analysis and comparison are described herein. In one embodiment, these methods may be used to enhance the efficiency and quality of prior art search, analysis of patents, and comparison of patents with reference content. However, the techniques may be used for any other type of content search, comparison and analysis.

BACKGROUND

A variety of projects require search, analysis and comparison of document content. For example, in the field of patent analysis, work may involve analysis of content from one or more subject patents, analysis of extrinsic documents to patents, such as file histories or dictionaries, and work may revolve around finding and analyzing reference content and evaluating claims in the one or more subject patents against the reference content and against the extrinsic texts.

A patent prior art search may first involve manual selection of terms from the claims or specification of a subject patent, from the file history of a patent, or terms known to be similar in meaning, typically selected from a thesaurus or dictionary. After the terms are selected, and logical connectors or relationships formulated, the terms are often used to query for relevant reference content via keyword query searching. Additionally, in the case of patent searches, searchers may design filters to restrict results to references associated with certain classifications, potentially using UPC or IPC classifications associated with the subject patent. Other fields of information may be employed to find reference content, such as inventor names, or references cited directly or indirectly by the subject patent.

In the field of patent prior art searching, the task may be all the more complicated by the fact that multiple references may be combined in order to form a rejection of a subject patent. For example, if a first reference document contains support for one part of a claim, and a second reference document contains support for a second part of a claim, then the reference content might be combined, especially if there is a reason or motivation for the combination of reference documents. Interestingly, the prior art search may involve not only the search for the reference documents that anticipate a claim, but may also require special analysis and consideration as to why the combination of references can be grouped together.

After relevant reference content has been found from a prior art search, questions arise as to whether claims from a subject patent document read on reference content, especially given claim interpretation. Claims may be interpreted based on language used in claims, language used in the specification associated with the claims, language used in the file history of the subject patent, and potentially, language used in extrinsic sources, such as dictionaries. When preparing office action responses, patent examiners may wish to include claim charts that include the claim text, a construction of claims from language in the claims, specification, file history and/or extrinsic sources, and the text of relevant references. Yet preparation of claim charts that match claim strings to portions of content from one or more references, particularly claim charts including supporting text from a file history or extrinsic sources, may be time consuming and require significant work. This task of producing claim charts is particularly burdensome if a subject patent document contains hundreds of claims, and each claim contains many claim strings, and if the file history runs for some length. Even more daunting may be selecting text from the prosecution history of siblings within a patent family (e.g. divisionals, continuations, continuation-in-parts.)

It is notable that the processes and types of information that are useful in prior art searching may be useful for other processes within patent analysis, or for other business applications entirely. For example, still within the field of patent analysis, comparison of patent claims, accompanied by text extracted from the supporting specification and patent file history, and accompanied with text from reference content may be performed when one or more patents of a portfolio are compared against product documentation, in order to determine product infringement.

As another example, the analysis and systems described herein may be used to analyze other legal instruments, such as contracts. In particular, association and analysis of terms of contracts with extrinsic (parole) evidence is of particular interest.

As another example, in a different business field, such as generic web search engines, determination of groups of references, that when combined are applicable to a user query, may be useful for general query processing.

DESCRIPTION OF THE DRAWINGS

The present description will be better understood from the following detailed description read in light of the accompanying drawings, wherein:

FIG. 11 illustrates a sample report showing similarity scores between subject content and multiple references.

FIG. 20 illustrates calculation of an unnormalized centroid score from a convex hull of keyword instances.

FIG. 21 illustrates calculation of a normalized centroid score from an unnormalized centroid score and exemplary maximum and minimum scores.

FIG. 25 illustrates a sample output comparison report between a subject patent document and multiple references.

Like reference numerals are used to designate like parts in the accompanying drawings.

SUMMARY OF THE INVENTION

Figure 1:
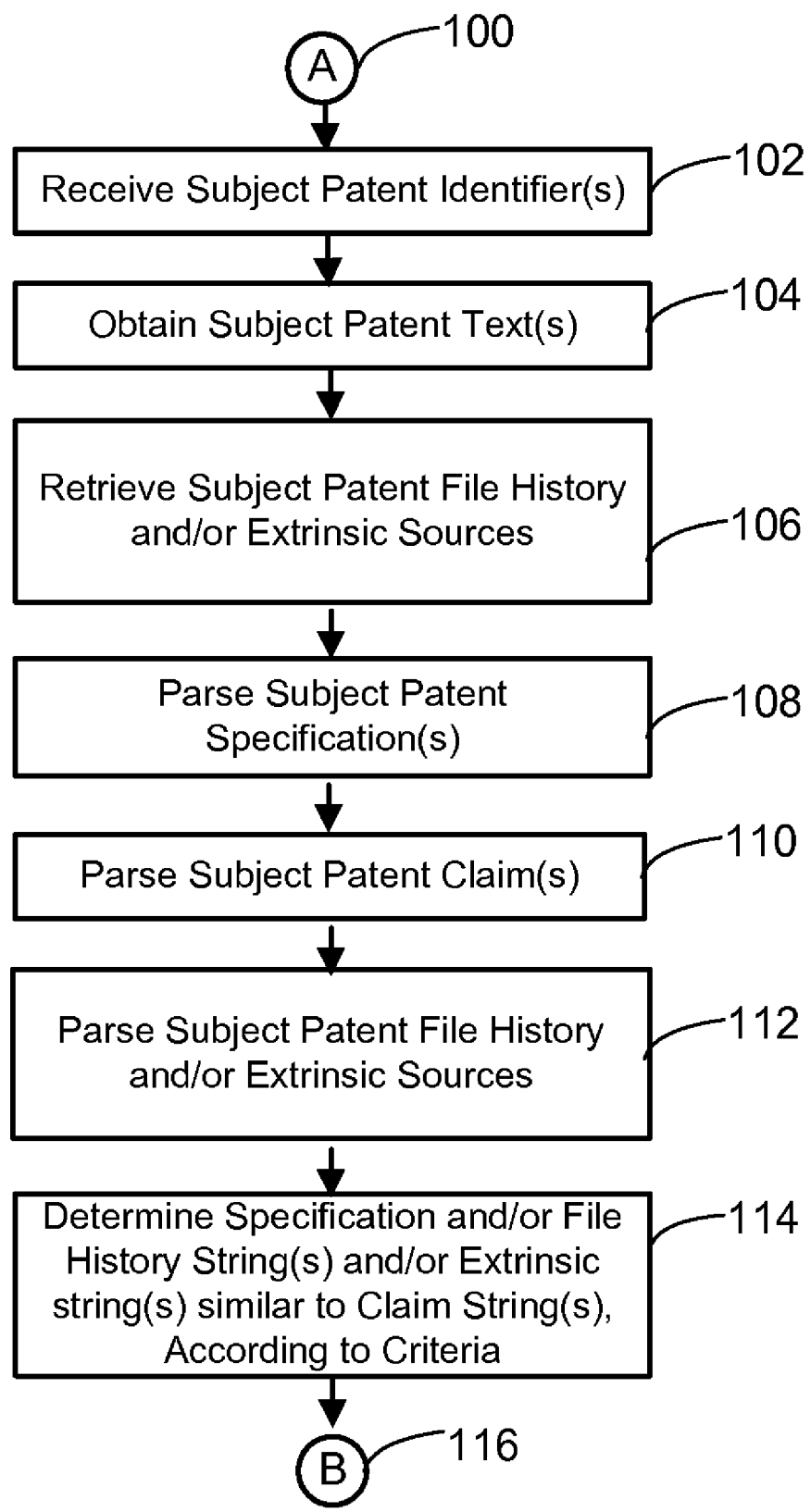
FIG. 1 illustrates a method for determining strings from a patent file history that are associated with strings from a claim of the subject patent.

One embodiment of the invention includes software for automated search, analysis and comparison of text content. As an example, the embodiment may be used for defensive and offensive patent analysis. The embodiment allows for rich reports, and may display reports of content analysis and comparison. The embodiment may be used to automatically carry out a prior art search on one or many (e.g. thousands) of patents within a patent portfolio. The embodiment may automatically analyze the subject patent itself, as well as the patent file history (also known as prosecution history) associated with the subject patent, and may also analyze extrinsic sources, such as dictionaries or thesaurus in order to collect terms and limitations on terms. In one embodiment, the software may be employed to rank the likelihood that any or all claims from patents within a portfolio of thousands of patents read on one or more reference documents.

An embodiment of the invention may include a user interface by which a user may specify subject content information. For example, the user may enter an identifier associated with a subject patent (e.g. a patent number, a patent publication number, a link to one or more documents, or other mechanism of specifying subject content). Alternatively, the user may specify a folder containing subject patent applications and/or subject patent file history document(s), or the user may just specify part of a subject patent (e.g. text from a claim). The embodiment of the invention may retrieve the documents, such as the subject patent specification and claims, subject patent file history, extrinsic sources of information. The information retrieved may then be parsed and fields stored within an object model and/or database. At this stage, automatic search, analysis and comparison may commence.

The search may be performed using a number of techniques such as, without limitation, recursive traversals through citations, or queries for content from web sites, web services or databases. Terms from the claims, specification, file history and/or extrinsic sources may be used to perform the search.

In one embodiment, the search may returns groups of references, wherein each group may contain two or more references, and where the group of references taken as a whole might satisfy the query criteria. The search engine may also analyze and suggest reasons and/or motivations for the combination of references.

An embodiment of the invention may include a natural language processing component. For example, the natural language processing component may include methods and software described by U.S. Pat. No. 6,098,033 and/or U.S. Pat. No. 6,871,174 as well as U.S. Pat. No. 7,383,169. These references are already incorporated by reference, as above. The natural language processing component may be used to determine similarities between strings in a subject patent, in a file history, in extrinsic sources, and/or reference content.

An embodiment of the invention may include a comparison and scoring component. The comparison and scoring component may use the information extracted by a content object model and natural language processing component to compute further properties and scores, such as brevity scores associated with the claims. Additionally, an embodiment of the invention may compare information associated with subject content against reference content, and output similarity scores. Similarity scores may include logical scores based on natural language processing output, a centroid score, scores based on comparison of classifications, or other types of score. The similarity scores of subject content and reference content may be compared and reported.

An embodiment of the invention may include a reporting component. The report component may include the ability to display rich HTML reports with hyperlinks to other content. The reports may be displayed on the web, or generated as a file on a client computer, or using any other means known to one of ordinary skill in the art. As an example, in a prior art search, an output report may list references, in descending order of similarity, associated with subject content. The output report may include claim charts. The claim charts may include text from a claim in a subject patent, text from the specification of the subject patent, text from the subject patent file history, text from an extrinsic source, and may include text from one or more references. In the case of infringement analysis, subject patents may be listed in order of descending claim brevity, and optionally, links to applicable reference content may be associated with each subject patent, and listed in order of descending similarity score. In the latter example of infringement analysis, software may also include claim charts mapping claims (e.g. claims with a low brevity score) against references.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a software system, the system described is provided as an example and not a limitation. As those skilled in the art will appreciate, the present examples are suitable for application in a variety of different types of hardware or software systems.

Method for Determining Specification, File History and Extrinsic Strings Associated with Claim Strings Referring to FIG. 1, a method for determining strings in the specification, and/or file history, and/or extrinsic sources that may be associated with claim strings is shown. The strings that may be associated with the claim strings can be useful in interpreting claims, and therefore, may be useful in interpreting the scope of the claims, as well as for finding art related to the subject claims. At starting step A 100, a user or another application has identified a subject patent identifier for analysis. At step 102, software receives the subject patent identifier, and in step 104 the application obtains text associated with the subject patent identifier. The subject patent text retrieved in step 104 may comprise some or all of the subject patent specification and subject patent claims. In step 106 the application retrieves some or all of the subject patent file history. The subject patent file history may comprise any of office actions issued by an examiner, office action responses, amendments, notices from a patent office, and/or any document associated with a file history. Notably, the text of the file history needs to be in a readable format. In the case of office action responses, these are often available to applicants since they are storable in a word processing format. In order to retrieve text from a subject patent file history where word processing files are not available, it is also possible to employ Optical Character Recognition (OCR) on images of the documents, and/or manually type the data in a format that is readable by the software. As patent offices become increasingly automated, it is expected that text from many more parts of a file history will be readable by software.

In step 108, software parses the subject patent text. If the current subject content comes from a content database, it may already be broken into appropriate fields (e.g. Title, Abstract, Authors, etc). However, if a raw document associated with the current subject content is retrieved, the text content may have to be parsed and broken into corresponding data structures. Step 108 may require lexical and logical analysis of the text of the current subject content, as well as extraction of other properties from the current subject content. For example, the natural language processing system described by U.S. Pat. No. 6,871,174 may be employed on some or all of the text within the subject content in order to create logical graphs and logical relations from the text. In particular, in one embodiment, analysis of logical relations produced by one natural language processing component is considered, but one of ordinary skill in the art would recognize that any natural language processing component would be able to derive lexical and logical information from the text of a subject patent. In step 110, again uses natural language processing software to parse the subject patent claim. Typically, this involves breaking each claim into claim strings, and extracting terms from each claim string, as well as logical relationships between the terms. In step 112, the application further employs natural language processing software to parse the subject patent file history. In step 114, the application determines associations between the file history strings and claim strings according to criteria. Criteria by which file history strings are associated with claim strings may include finding one or more matching terms in the strings being compared, finding one or more terms that have a certain part of speech (e.g. noun, verb, etc) within strings being compared, or having a similarity score higher than a threshold value, or using any similar text matching algorithms implemented by natural language processing systems. For example, similarity scores between strings may be calculated using a method described in U.S. Pat. No. 6,871,174, or may be calculated using the logical relation match method described in relation to FIGS. 16A, 16B, 16C, 16D and 16E, or it may involve use of a similarity match method described in relation to other natural language processing systems known to one of ordinary skill in the art. The program may terminate at step 114, or the program may proceed to subsequent analysis, that makes use of the claim and file history strings, as illustratively shown by FIG. 2, and FIG. 3.

Method for Search, Analysis and Comparison of Content

Figure 2:
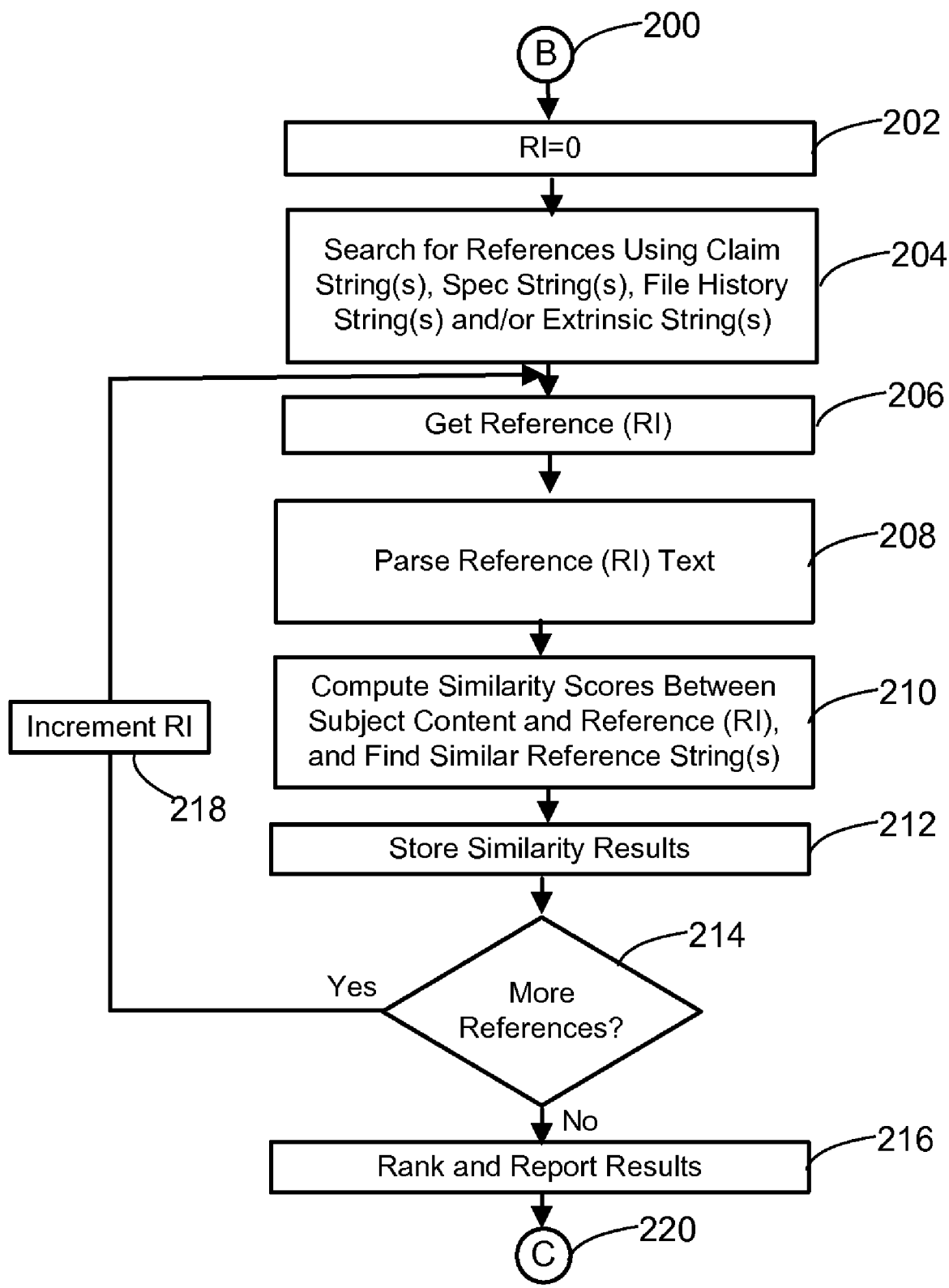
FIG. 2 illustrates a method for searching for references, computing similarity scores, ranking and reporting results that are similar to file history strings, extrinsic strings and/or claim strings from a subject patent.

Referring to FIG. 2, a method for search, analysis and comparison of subject content strings is shown. At starting step 200, a user or another program starts with a task of finding content similar to subject content strings. "Subject content", as used throughout this application, may be text from one or more patent documents, including any part of a subject patent (such as text from a claim), and/or text extracted from files associated with a subject patent, such as from part of the subject patent file history, or may be text extracted from extrinsic sources, such as a dictionary or thesaurus, or the subject content may be from any document (e.g. an academic article, or a contract). The user of computer program may specify the subject content strings by specifying the location of the subject content, giving the program an identifier by which the program may find the content (e.g. a patent document number), or by directly typing or providing subject content text. Strings may be extracted from the subject content by parsing the content using a natural language processing component, or simply parsing the text using delimiters, such as, without limitation, periods, commas, semi-colons, colons, or other grammatical constructions. A collection of subject content strings to be analyzed may come from multiple sources, including from a subject patent, a subject patent file history, extrinsic sources (such as dictionaries, thesaurus). The strings may be provided by a method, such as the method of FIG. 1.

Step 204 involves searching for a list of reference content that may be relevant to the strings within the subject content. The search for reference content may involve crawling backwards and forwards through citations, if any, contained inside of the subject content, or it may involve querying for content based on terms inside the text found within the current subject content, or it may involve retrieving one or more reference files specified by the user. Possible search methods are explained further in relation to FIGS. 5, 6 and 7. Still referring to FIG. 2, step 206 involves retrieving reference content from the list of reference content at index RI. The reference content at index RI will be referred to as the current reference content. In step 208, the current reference content is parsed, which may involve a lexical and logical analysis, as well as extraction of other properties. In step 210, similarity scores are generated by comparing lexical, logical information generated in steps 208, as well as by comparison of other properties of the current subject content and current reference content. Comparison may involve matching methods described by U.S. Pat. No. 6,871,174, or using methods described in relation to FIGS. 16A-16E, or any other matching method for a natural language processing system. Step 210 also includes finding text in the current reference content that may be similar to text in the current subject content.

Referring still to FIG. 2, in step 212, the similarity scores and similar text are stored in association with the current subject and reference content. In step 214, a determination is made as to whether more reference content is in the list of reference content. If there is more reference content in the list, the program executes step 218, which increments RI, and loops back to before step 206. In step 216, the program ranks and reports the results. Step 216 may output reference results, such that the most similar reference results are listed near the top of a table of results (e.g. the report output may be ranked by descending similarity). Also, step 216 may rank subject content so that subject content that had higher similarity results is ranked above other subject content. Step 216 may rank individual subject content strings, or it may produce an aggregate similarity score for any documents associated with the subject content, and rank subject documents. In the case of analysis of subject patent documents, step 216 may rank subject patent documents that had higher claim brevity scores in a higher position than subject patent documents with lower claim brevity scores. The program may terminate at step 216, or after the method described by FIG. 2, subsequent analysis may be performed, as illustrated by FIG. 3.

Method for Finding Combinations of References

Figure 3:
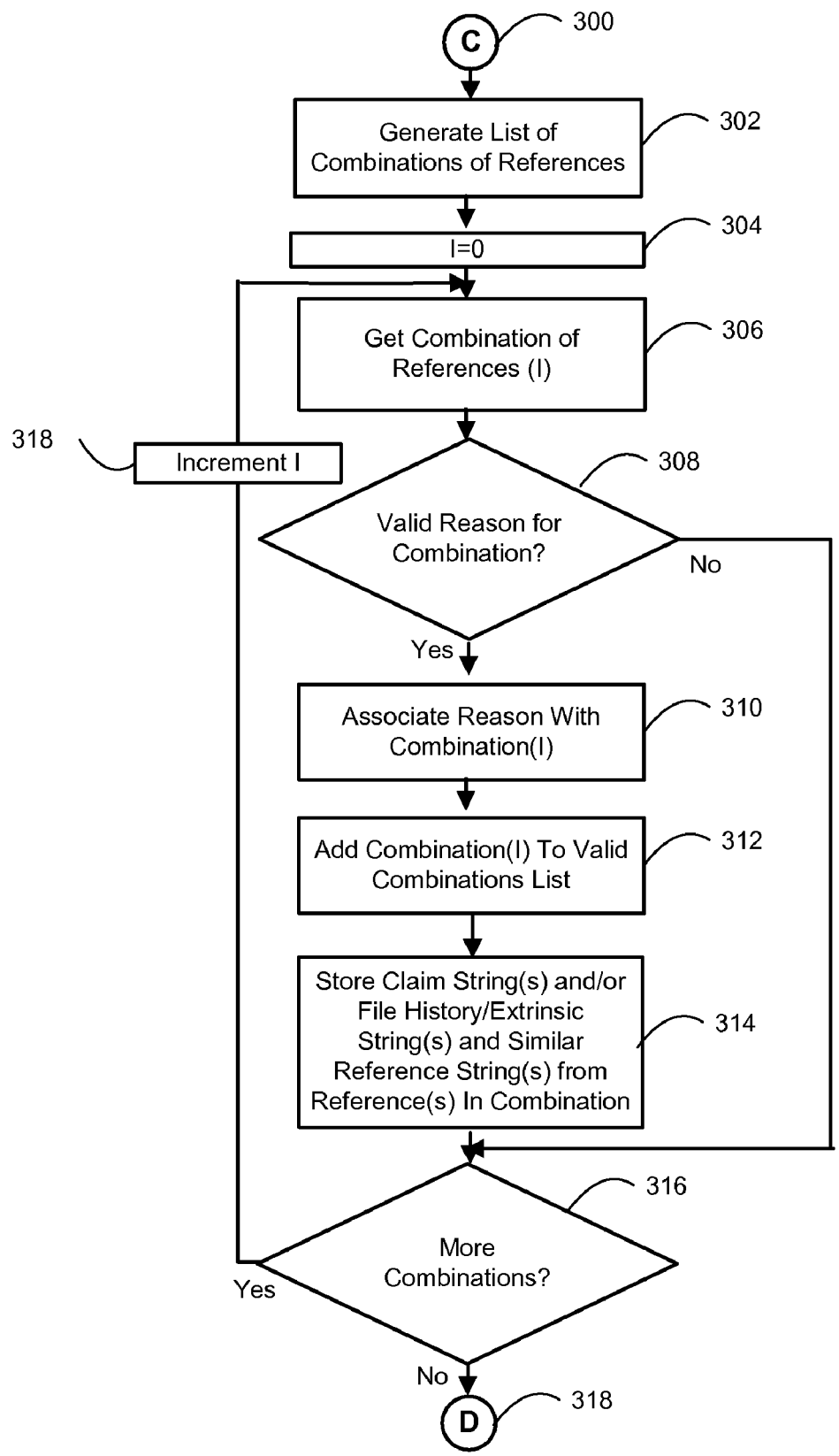
FIG. 3 illustrates a method of finding combinations of references that are determined to be similar to claim strings, and/or file history strings and/or extrinsic strings and wherein the references are identified as having a reason to be combined.

FIG. 3 shows an embodiment of a program routine that may be used for finding combinations of references, that when combined, may be similar to subject content strings. At starting stage C 300, references containing similar text have already been identified. For example, the references may have been generated using the method illustrated in FIG. 2. In step 302, a list of possible combinations of references is generated. Step 302 may generate possible combinations of references, up to a maximum number of references per combination (or up to the number of references, if the number of references happens to be less than the maximum number of references per combination). As an example, if there are two distinct references R1, R2, and if the maximum number of references per group is set at 2, then the combinations calculated in step 306 would include {R1}, {R2}, and {R1, R2}. Methods for generating all possible combinations of a group of items are known to a person of ordinary skill in the art. In step 304, an index I is initialized to value 0. Index I may be used to access a particular combination from the list of combinations. In step 306, the combination of references at index I is retrieved. At conditional step 308, a determination may be made as to whether the combination of references is valid. In one embodiment suitable for patent documents, step 308 may involve searching for conformance with a list of reasons why the combination of references could be valid. Examples of possible reasons that may be evaluated may include any one of the following: that the references came from the same web site; the references have an author in common; the references have an inventor in common; the references share one or more of the same UPC or IPC classifications; the references have a citation relationship (e.g. are cited by the same document, cite each other, or both cite the same document). The aforementioned list of reasons is not complete, but is meant to illustrate the idea that step 308 may search for a reason or motivation that the combination of documents may be considered valid. If conditional step 308 can find no valid reason then it jumps to step 316. If the combination of references at index I is deemed valid then the program routine proceeds to step 310. Step 310 involves storing the reason for combination of references at index I in association with the combination of references. The program routine then proceeds to step 312 where the combination of documents is added to a list of valid combinations. In step 314 the program routine stores claim string(s) and/or file history string(s) and similar reference string(s) from reference(s) in the combination. Conditional step 314 tests if there are more combinations. If there are no more combinations to consider then conditional step 316 evaluates to false and the program routine proceeds to step 306 where the list of valid combinations of documents is returned. The program routine illustrated in FIG. 3 may terminate when all possible combinations have been evaluated, when a maximum number of references per combination is reached, or when a maximum number of combinations has been reached.

System for Search, Analysis and Comparison of Content

Figure 4:
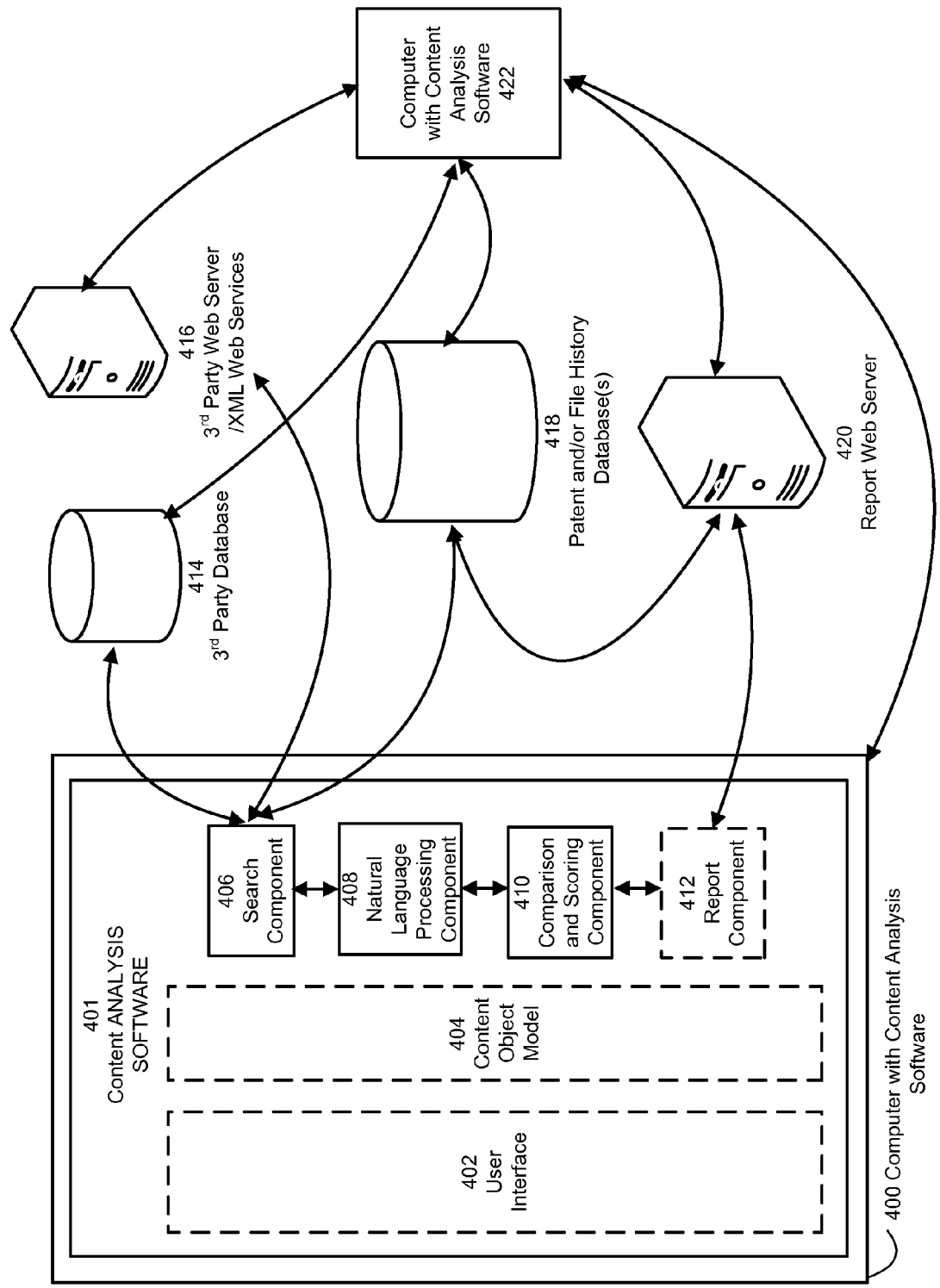
FIG. 4 illustrates the components of a system for the search, analysis and comparison of subject and reference content.

Referring to FIG. 4, an overview of a system for search, analysis and comparison of content is shown. Computer 400 runs content analysis software 401. Content analysis software 401 comprises user interface 402 for allowing users to enter input, such as subject document identifiers for references to be searched, analyzed or compared, and/or directories where content may be found, analyzed or compared. Optionally, content analysis software 401 contains content object model 404 that represents content to be analyzed and compared. The content object model 404 may contain data structures that reflect the schema for content database 418, or the content object model 404 may contain other data structures such as object oriented paradigms suitable for holding content information. As just one example, if the content object model 404 contains a class to represent issued patents, then class Patent may contain a collection of Claims. Similarly, the Claim class may contain a Claim strings collection, wherein each Claim string holds information about a claim string. For example, the Patent class may have an Inventors collection, a UPC classifications collection, an IPC classifications collection, a Title field, an Abstract field, and other fields that one would expect to represent Patent content. As another example, content object model 404 may contain a class FileHistory, and FileHistory may contain an OAs collection holding instances of the OA class. Each OA class may have an Examiner field, a Rejections collection, or other fields that reflect data within an office action. Other fields in typical data structures are readily ascertainable by one of ordinary skill in the art. Content Object Model 404 may have other classes to represent other content also. For example, it may have a WebDocument class to represent documents found on the web, and it may have an AcademicArticle class to represent articles from academic journals. The latter represent just some examples of classes and data structures that may be suitable for content object model 404.

Still referring to FIG. 4, other modules in the content analysis software 401 may include a search component 406, used to search for other content in the content database 418, and/or used to query against one or more third party databases 414, and/or used to retrieve material from one or more third party web servers 416. As one example, the search component 406 may retrieve documents using a web service provided over SOAP by a web search engine. The content analysis software 401 may also contain a natural language processing component 408. The natural language processing component 408 may ascertain information about content text, so that a similarity in meaning between text segments may be ascertained. In one embodiment, the natural language processing component includes the system and components that are described in detail, and already incorporated by reference, in U.S. Pat. No. 6,871,174. The comparison and scoring component 410 may use lexical and logical information from the natural language processing component 408 in order to generate similarity scores between subject and reference content, and the comparison and scoring component 410 may also calculate other comparison scores, such as UPC similarity, IPC similarity, centroid similarity, or others. The comparison and scoring component 410 may also use the natural language processing component 408 to identify strings or phrases in one text segment that are similar in meaning to strings or phrases in another text segment. Finally, the comparison and scoring component 410 may also generate metrics related to certain fields of content, such as claim breadth metrics concerning patent claims. The content analysis software 401 may also contain a report component 412 that outputs reports of the comparisons and analysis of content. For example, report component 412 may output one or more claim charts that illustrate strings in reference content that are similar in meaning to a claim in a subject patent document. As another example, the report component 412 may just output a list of documents containing reference content, where each reference document may be similar to subject content. Optionally, the report component 412, and/or all of the content analysis software 401 may run on a web server 420, or communicate with a web server 420 so that access to the content analysis software 401 and output reports is easily accessible to users. FIG. 4 also illustrates that multiple instances of content analysis software 401 may run. For example, FIG. 4 shows another computer running an instance of content analysis software 422. FIG. 4 illustrates that, in one embodiment, the instance 401 may be in communication with instance 422, so that search, analysis and comparison tasks may be shared across computers.

Exemplary Methods of Searching for References

Figure 5:
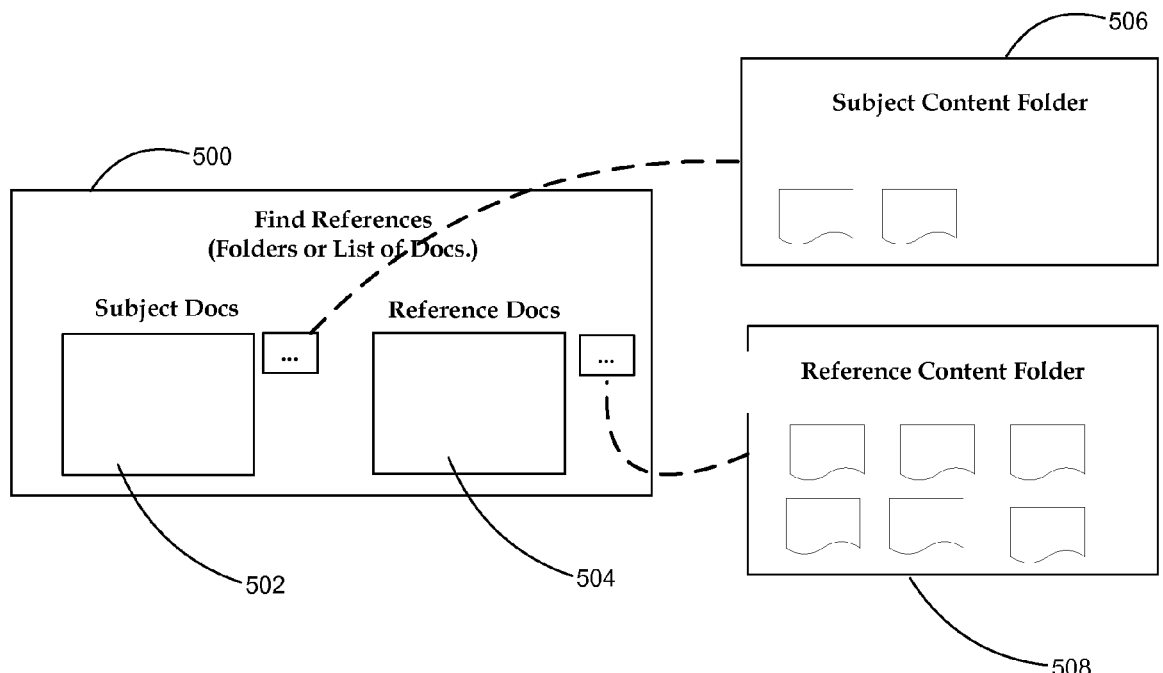
FIG. 5 illustrates a method for searching for content from folders.

Referring to FIG. 5, a method for specifying and searching for subject content and reference content using folders is shown. A user interface may include a dialog 500, and the user may specify a subject folder 502. Subject folder 506 may contain files, and may contain one or more sub-folders. The subject content list 502 may get populated with some or all of the files in subject content folder 506, and some or all files that are in any sub-folders. The search may recursively find all files in sub-folders of subject folder 506. Similarly, the user may specify a reference content folder 508, and reference list 504 may get populated with some or all files in folder 508 as well as some or all files in sub-folders. Once the subject content list 502 is populated, and the reference content list 504 is populated, each item in subject content list 502 may be compared to each item in reference content list 504.

Figure 6:
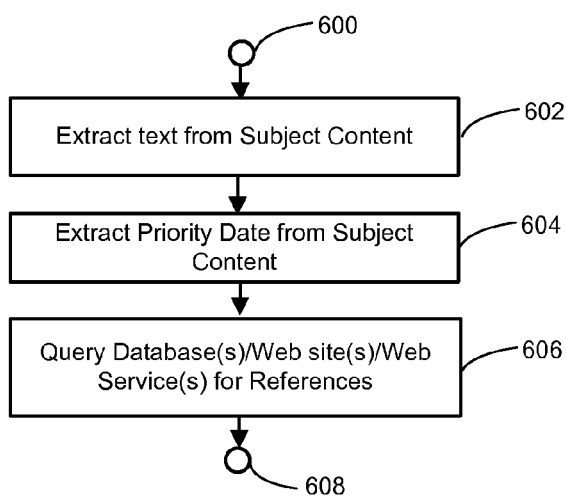
FIG. 6 illustrates a method of searching for content from a database, a web site or an XML web service.

Turning to FIG. 6, another method of searching for content from a database, a web site, or from an XML web service is shown. At start step 600, a user or computer program may specify subject content. As one example, a user may specify a claim from a patent document). In step 602, the method may automatically extract terms from the subject content. For example, the nouns and verbs from text may easily be extracted from logical relations that are output from the natural language processing system described in U.S. Pat. No. 6,871,174, incorporated by reference earlier. The program may proceeds to optional step 604, where other properties such as the priority date may be extracted from the text of the subject content. Obviously, some types of subject content may not have a priority date, and step 604 may not be executed in those cases. In step 606, the program queries a database, and/or a web site, and/or an XML web service for reference content related to the terms that were extracted in step 602. When step 604 is executed, the query in step 606 may be further restricted by querying only for references that are dated before the priority date extracted from step 604. The search routine ends at step 608 since a list of reference content is returned from the web site, and/or database, and/or XML web service.

Figure 7:
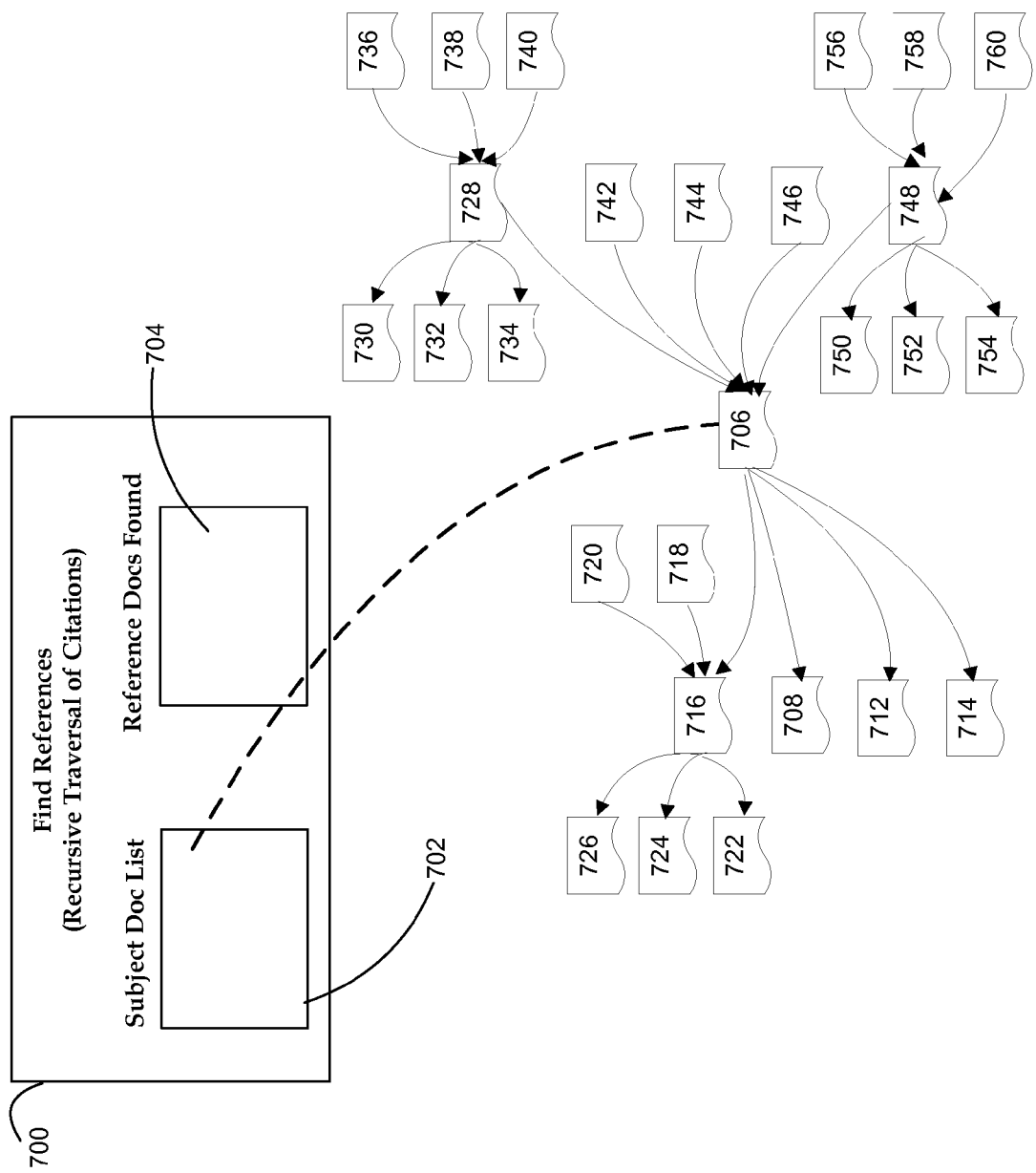
FIG. 7 illustrates a method of searching for content using a recursive citation traversal.

Referring to FIG. 7, another method for specifying and searching for reference content, using a recursive citation traversal, is illustrated. A user or computer program specifies a subject content list in area 702. In the example illustrated by FIG. 7, this list comprises a single content item with an identifier 706. The search program then finds all content that content 706 cites, and in this example, finds reference content with identifiers 716, 708, 712 and 714. The search component may also find all the reference content that cites subject content 706, and in the example shown, finds reference content with identifiers 728, 742, 744, 746, and 748. In this search mode, the search module may then recursively retrieve content that is cited by, and that cites those reference content items. For example, in FIG. 7, reference content 716 cites items 726, 724 and 722, and reference content 716 is cited by items 720 and 718. Similarly, reference content 728 cites items 730, 732 and 734, and is cited by items 736, 738 and 740. The example in FIG. 5 also shows that content item 748 cites items 750, 752 and 754 and that item 748 is cited by 756, 758 and 760. Clearly the recursive citation retrieval can continue indefinitely and go forwards and backwards for each item, to any depth of recursion. The search may stop when a maximum number of reference content items have been retrieved, or when a certain depth of recursion has been reached.

Relating File History Strings to Claim Strings

Figure 8:
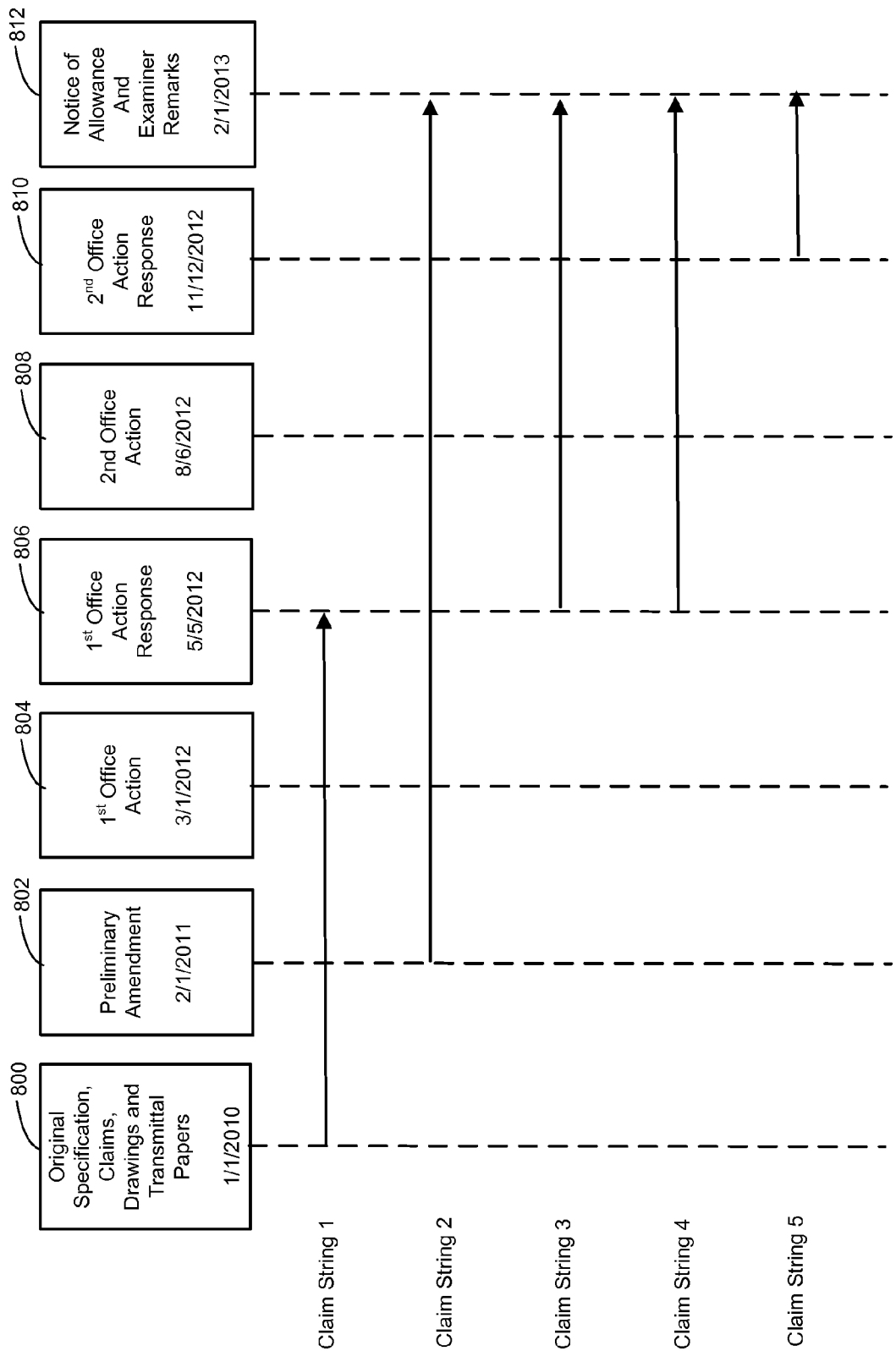
FIG. 8 illustrates an example of a sequence history of claim strings through an exemplary file history.

FIG. 8 illustrates a sequence chart showing the history of sample claim strings through prosecution. Claim strings may be elements of claims, an arbitrary group of words separated by punctuation or determined to be a clause via natural language processing software, or it may even just be a single word. The software may identify words, or collections of words that have a unified history—are added to a claim at a particular point and survive up to a particular point. Determining the history of claim strings is useful for several reasons. First of all, if a claim string is introduced in a particular document, such as an office action response, it is likely to be discussed significantly in that document. Similarly, if a claim string is terminated at a particular point, there may be some discussion of that claim string in the document where the claim string is removed from consideration. Collecting file history strings that are associated with a claim string from file history parts where it is initiated for consideration, removed from consideration, or discussed, is important because this is where the file history may contain limitations on the interpretation of the claim string.

FIG. 8 illustrates that claim strings may originate in the middle of prosecution, and/or may be morphed during prosecution. During prosecution, they may be discussed or modified, and in each case, comments in the file history may be associated with the claim strings. In FIG. 8, claim string 1 is originated in the original specification 800, and is determined to be removed from consideration in the first office action response 806. Claim string 2 originates in a preliminary amendment 802 and is determined to end up in the final allowed claims 812. Similarly, claim strings 3 and 4, which originate in the first office action response 806 are determined to survive through to the notice of allowance 812. In FIG. 8, claim string 5 is born in the second office action 810 and makes it through to the notice of allowance 812.

While FIG. 8 illustrates some typical parts of a file history, a person of ordinary skill in the art would realize there are many parts that may be considered and analyzed. For example, forms such as an applicant data sheet, application transmittal forms, assignment forms, requests to not publish, information disclosure forms, declarations, original specification and claims, amendments to specification and claims, office actions, and office action responses may be analyzed for text and for anomalies or inconsistencies, as well as for consistency or relevancy to claim strings.

Figure 9:
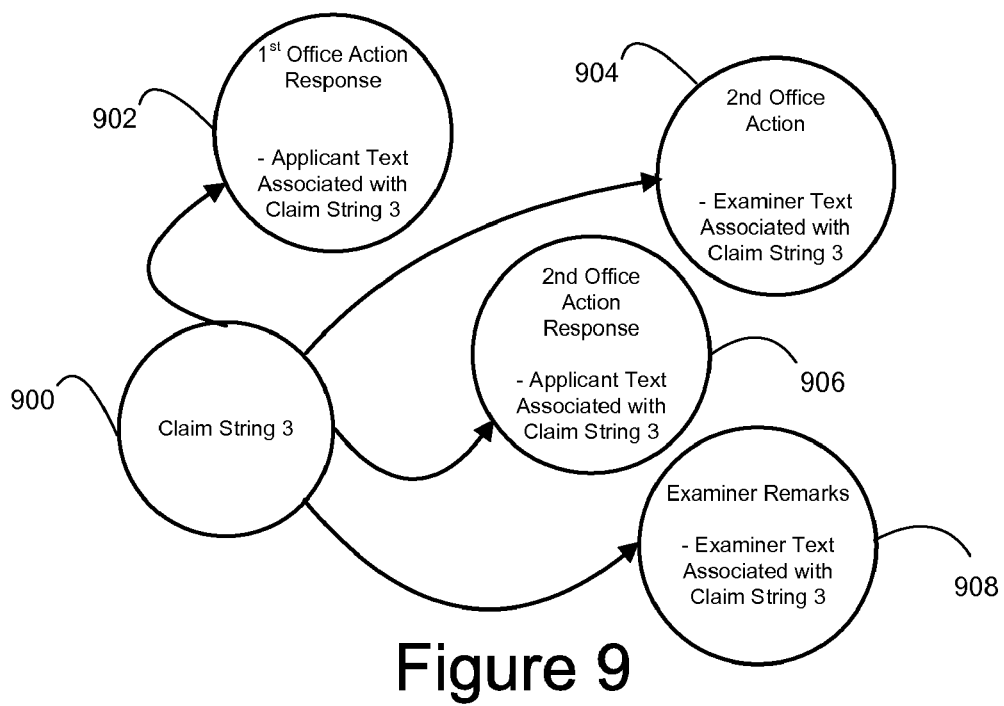
FIG. 9 illustrates an example of file history strings associated with a claim string.

FIG. 9 illustrates a data view of an association between claim strings and file history strings. Claim string 3 (900) is determined to be associated with text written by the applicant in a first office action response 902, and with text written by the applicant in a second office action response 906. Also, in the example of FIG. 9, claim string 3 (900) is associated with text written by the examiner in a second office action 904 and in the examiner remarks 908. By finding and holding the text associated with the claim string in a data structure, it is possible for software to easily search for other references that relate to the claim string and/or relate to text in associated text to the claim string. Similarly, it is possible to display the text that is associated with a claim string so that an applicant does not have to wade through a thick file history of a patent.

Figure 10:
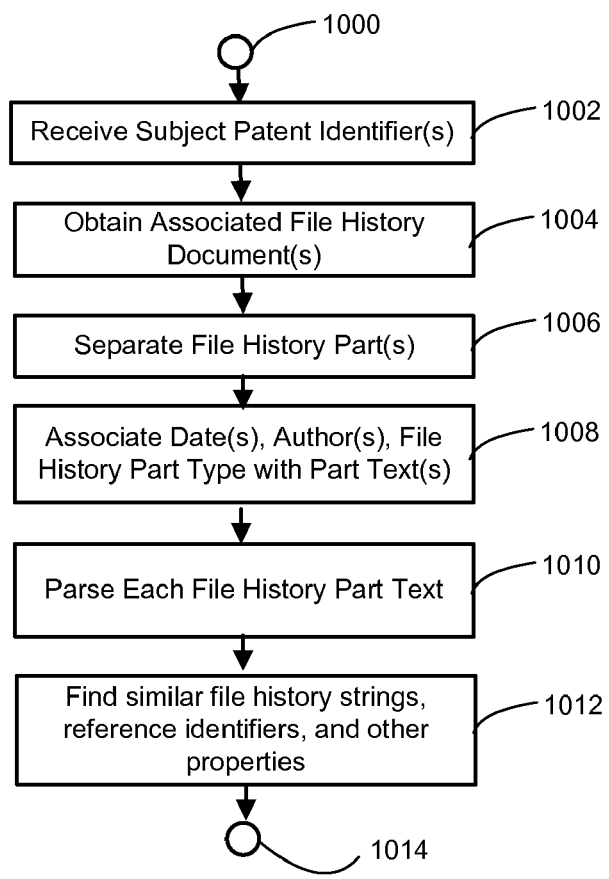
FIG. 10 illustrates a method for parsing file history text, and extracting file history properties.

FIG. 10 illustrates a method to find similar
Finding Similar Text Via Generation of Similarity Scores FIG. 11 illustrates a sample output similarity score report 1100 for a subject content item. In this instance, the subject content is a subject patent content. Reports of this type may be generated from an embodiment of content analysis software. Items 1116, 1118, 1120, 1122, 1124 and 1126 are identifiers for reference items. In evaluating the subject content against content from each reference item, similarity scores are computed, and the values are stored or displayed in corresponding columns of the report 1100. For example, UPC Similarity in column 1102 may contain scores indicative of similarity between UPC classifications associated with the subject content and any UPC classifications associated with the reference content. IPC Similarity in column 1104 may be a measure of the similarity between an IPC classification associated with subject patent content and an IPC classification associated with content in the reference item. Column 1106 includes a logical content score. The logical content score may be calculated using logical relations or logical graphs from most or all of the text of the subject content and comparing them to logical relations or logical graphs taken from most or all of the text of reference content. Column 1108 depicts Logical Abstract Scores. In the case of a Logical Abstract Score, the title and/or abstract text from the subject content may be compared with the title/abstract of the reference content. Notably, other comparisons are possible. For example, the text from the "Field of the Invention" section of a subject patent content may be compared with text from a similar section inside reference content. Column 1110 includes a Logical Claim Score. This may be calculated by comparing text from one or more claims in subject patent content with text inside reference content. Column 1112 depicts a centroid score, also determined by comparing proximity of terms in subject content with terms in reference content. Column 1114 includes an indication of whether the reference content has already been cited by the subject patent. Column 1114 is interesting for a number of reasons. First, if the reference has already been cited, it may indicate that a searcher would not wish to consider the reference because it has already been considered. Second, it is interesting because it allows a searcher to evaluate the position of non-cited content in relation to the position of the cited content. For example, if a non-cited content is ranked more similar than a cited content, it may indicate that the non-cited content is one that should be investigated with priority. Column 1115 illustrates a column indicating whether the reference was cited by the examiner in the file history. Lastly, report 1100 includes an overall score 1117. The overall score 1117 may be calculated as an average (e.g. mean, mode, median) of the other similarity scores, or it may be calculated as the best similarity score, or it may be computed using appropriate weights for each similarity score. This is particularly so if some similarity scores have more probative value than others. Embodiments for calculation of UPC similarity, IPC similarity, logical scores, and centroid scores are discussed below.

UPC and IPC Similarity Scores

Patent documents may contain UPC and/or IPC, or other classifications. These classifications may be determined by examiners of patents, or they may be determined by automatic classification software, and the classifications may characterize the area(s) of subject matter that document content concerns. If a subject document is associated with a particular classification, and a reference document is also associated with the same classification, then it may suggest that the document material is similar in nature. As such, it may be desirable to calculate classification similarity so that there is increased confidence that references found from automatic searches are similar to subject content. In particular, UPC or IPC classification similarity may be additional scores to be taken into account of an overall similarity score between a subject document and reference document. Notably, however, non-patent documents are not likely to have either a UPC or IPC classification. In those cases, the UPC or IPC classifications may be predicted using automatic classification software, or alternatively, the similarity scores may simply be unavailable and default to a 0 value.

Calculation of UPC Similarity Score

Figure 12:
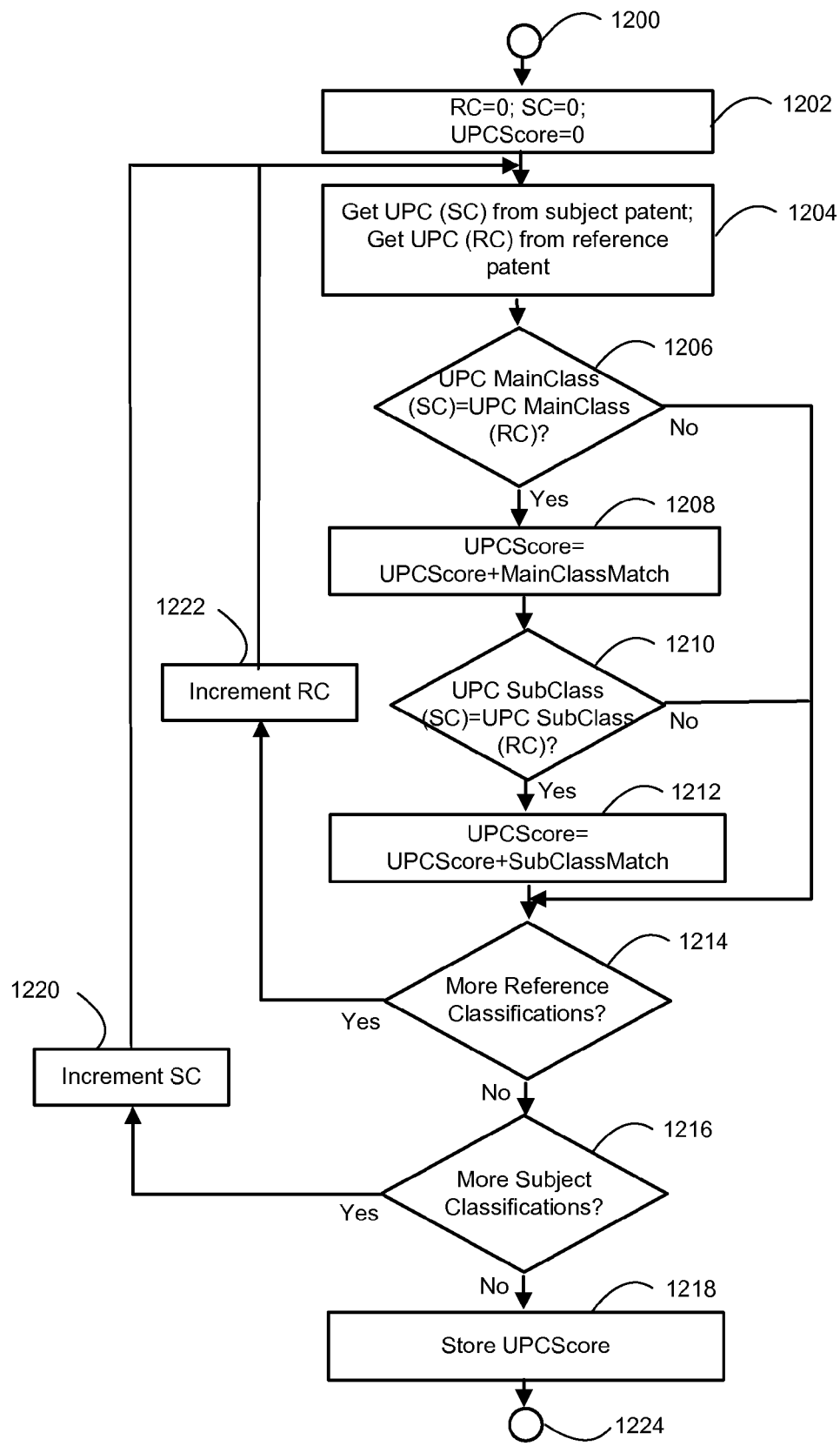
FIG. 12 illustrates a method of calculating a UPC similarity score.

FIG. 12 shows an embodiment for calculation of a UPC similarity score between two patent documents. Referring to FIG. 12, start stage 1200 can be reached when a subject patent document and a reference patent document have been identified, and a list of UPC classifications for the subject patent and a list of UPC classifications for the reference document have been ascertained. In step 1202, reference classification counter RC and subject classification counter SC are initialized to value 0. Also in step 1202, UPCScore variable is initialized to value 0. The program proceeds to step 1204 where the UPC classification at index SC is retrieved from the subject document, and the UPC classification at index RC is retrieved from the reference document. These UPC classifications are referred to as the current subject classification and the current reference classification respectively. The program then proceeds to conditional step 1206, where the UPC Main Class, from the current subject classification is compared with the UPC Main Class from the current reference classification. If they match, the program proceeds to step 1208 where a MainClassMatch value (e.g. 1.0) is added to the UPCScore. If the conditional step at 1206 evaluates to false, then the program proceeds to conditional step 1214, discussed below. After step 1208, the program proceeds to conditional step 1210 which compares the SubClass of the current subject classification with the subclass of the current reference classification. If the two SubClasses match, then conditional step 1210 proceeds to step 1212 where a SubClassMatch value (e.g. 1.0) is added to the UPCScore variable. After step 1212, the program proceeds to conditional step 1214. Conditional step 1214 determines if there are more UPC classifications in the reference document, and if so, proceeds to step 1222 which increments RC, and then loops back to before step 1204. If step 1214 evaluates to false, the program proceeds to conditional step 1216. Conditional step 1216 evaluates whether there are more subject classifications in the subject content. If conditional step 1216 evaluates to true, the program increments SC in step 1220 and loops back up to before step 1204. If step 1216 evaluates to false, the program proceeds to step 1218 where the UPCScore variable value is stored. Before step 1218 stores the UPCScore value, it may normalize the score to between 0.0 and 1.0 by dividing by the number of main classes and subclasses inside the subject document, such that 1.0 becomes the maximum score. However, this normalization of the score is optional. The UPC similarity calculation ends at stage 1224.

Calculation of IPC Similarity Score

Figure 13:
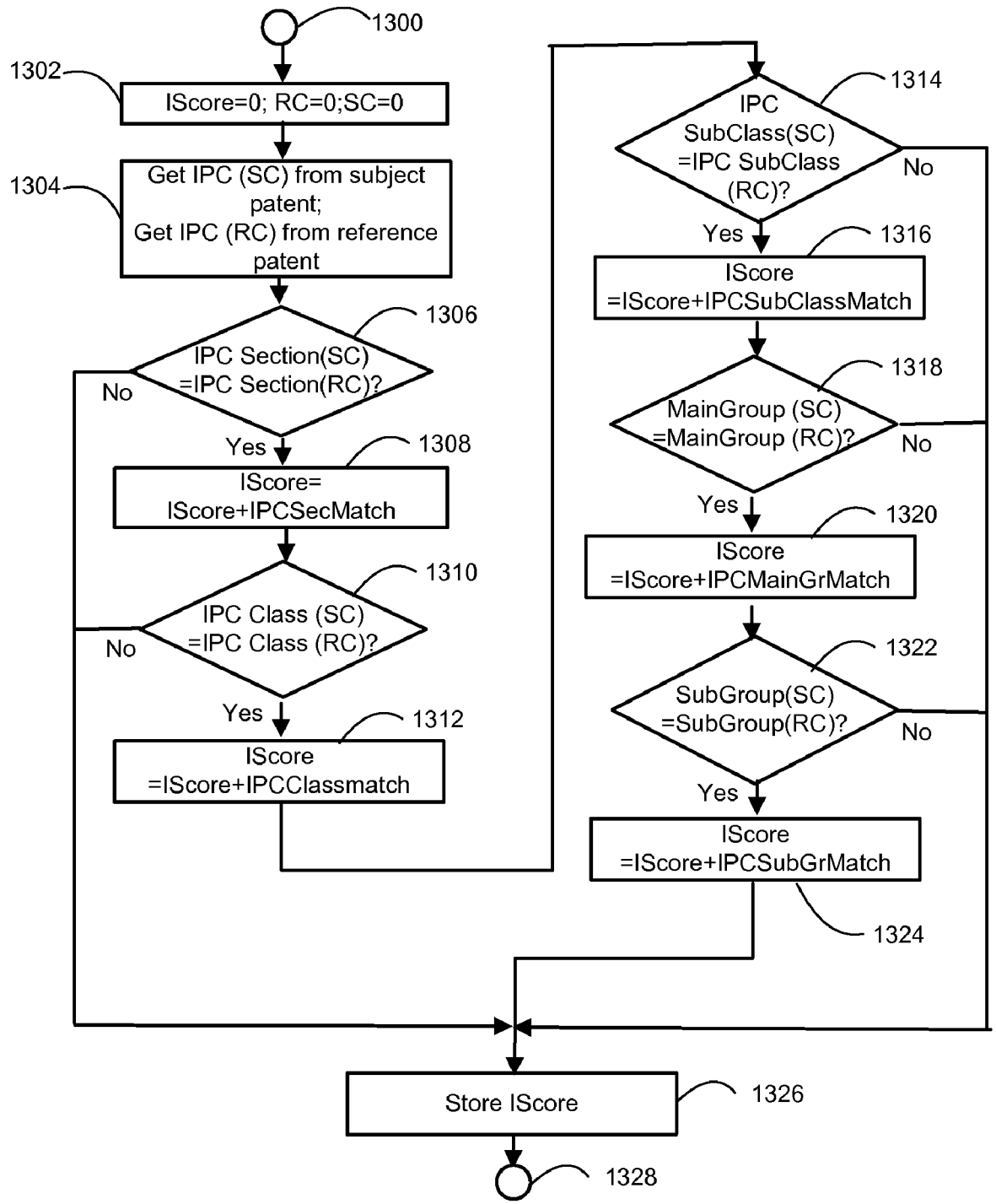
FIG. 13 illustrates a method of calculating an IPC similarity score.

FIG. 13 illustrates a program routine to calculate an IPC classification similarity score. At starting stage 1300 a list of IPC classifications has been obtained from subject content, and a list of IPC classifications has been obtained from reference content. The program routine proceeds to step 1302 that initializes a variable holding the IPC similarity score, IScore, to a 0.0 value. Also, subject content classification counter SC and reference content classification counter RC are initialized to 0. In step 1304, the classification at index SC is retrieved from the subject content (hereafter current subject classification) and the classification at index RC is retrieved from the reference content (hereafter current reference classification). The program routine then proceeds to conditional step 1306, where the IPC section from the current subject classification is compared with the IPC section from the current reference classification. If the IPC sections do not match, then conditional step 1306 evaluates to false, and the program proceeds straight to step 1326. If conditional step 1306 evaluates to true, then it proceeds to step 1308 where an IPCSecMatch value is added to the IScore variable. IPCSecMatch may be any value, but in one embodiment it has a value of 1.0. The program proceeds to conditional step 1310 where the IPC Class of the current subject classification is compared with the IPC Class of the current reference classification. If the evaluation of conditional step 1310 returns false, the program proceeds to step 1326. If the conditional step 1310 evaluates to true, the program proceeds to step 1312 where an IPCClassMatch value is added to the Iscore variable value. In one embodiment, IPCClassMatch has a value of 1.0. The program proceeds to conditional step 1314 where the IPC SubClass of the current subject classification is compared with the IPC SubClass of the current reference classification. If the evaluation of conditional step 1314 evaluates to false, the program proceeds to step 1326. If the conditional step 1314 evaluates to true, the program proceeds to step 1316 where an IPCSubClassMatch value is added to the Iscore variable value. In one embodiment, IPCSubClassMatch has a value of 1.0. The program proceeds to conditional step 1318 where the IPC MainGroup of the subject classification is compared with the IPC MainGroup of the reference classification. If the evaluation of conditional step 1318 evaluates to false, the program proceeds to step 1326. If the conditional step 1318 evaluates to true, the program proceeds to step 1320 where an IPCMainGrMatch value is added to the Iscore variable value. In one embodiment, IPCMainGrMatch has a value of 1.0. The program proceeds to conditional step 1322 where the IPC SubGroup of the current subject classification is compared with the IPC SubGroup of the current reference classification. If the evaluation of conditional step 1322 evaluates to false, the program proceeds to step 1326. If the conditional step 1322 evaluates to true, the program proceeds to step 1324 where an IPCSubGrMatch value is added to the Iscore variable value. In one embodiment, IPCSubGrMatch has a value of 1.0. The comparisons are then finished and the program proceeds to step 1326 where the Iscore value is stored. In one embodiment, the score may be normalized by dividing the score iScore by the number of possible matches (5, in the example shown); such that the maximum score is 1.0. The program exits at end stage 1328.

Generation of Logical (Semantic) Information of Text

The natural language processing system, such as the one described by U.S. Pat. No. 6,871,174, allows lexical and semantic information to be extracted about terms and phrases inside text. This information may then be used to compare text in subject content and reference content for similarity in meaning. The natural language processing tool may be employed to calculate logical similarity scores and/or find text that is similar in meaning to text inside subject content.

Figures 14, 15:
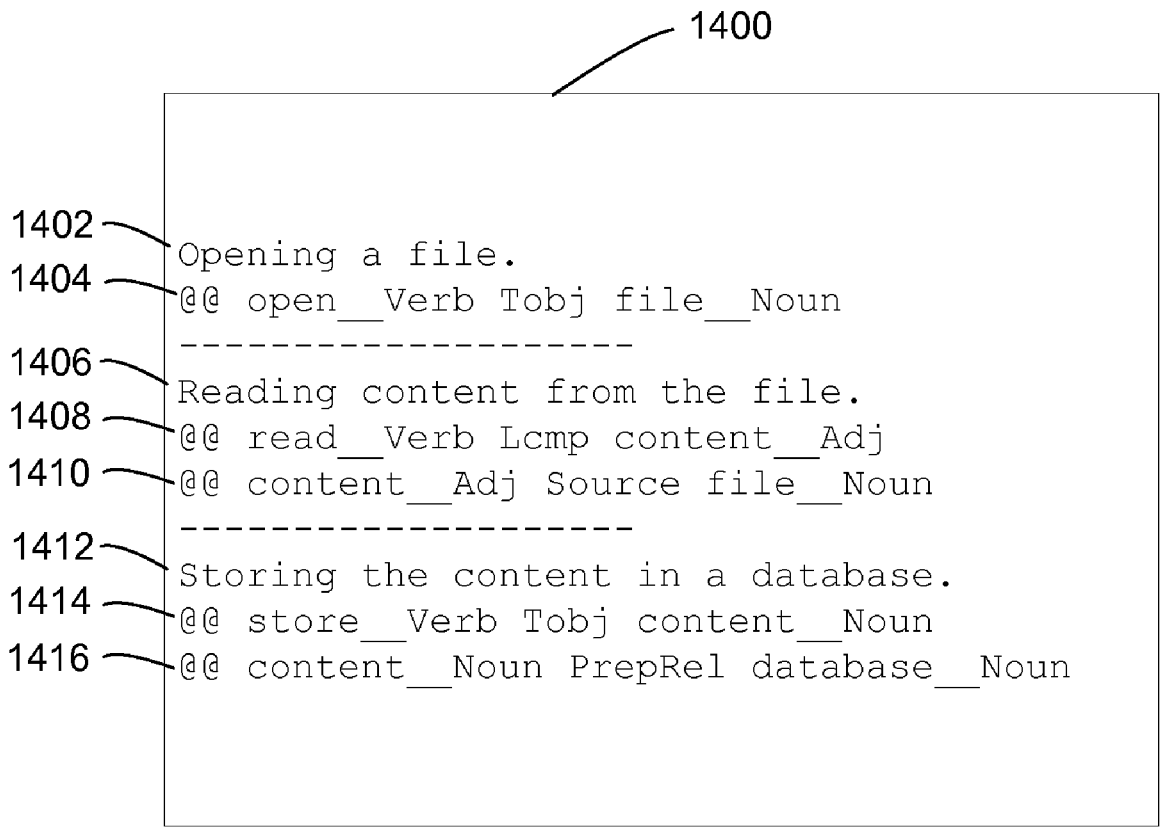
FIG. 14 illustrates sample output of logical relations from analysis of text.
FIG. 15 illustrates the structure of a sample logical relation.

Referring to FIG. 14, a sample output 1400 generated from the natural language processing tool described by U.S. Pat. No. 6,871,174 is illustrated. In particular, the natural language processing tool can break text into strings and output logical relations associated with those strings. In the example shown in output 1400, input string 1402 has one logical relation 1404 associated with it. In the example of FIG. 14, two logical relations, 1408 and 1410, are associated with text string 1406 and textual segment 1412 has two logical relations 1414 and 1416 associated with it. As such, the natural language processing system allows an arbitrary chunk of text to be split into a list of strings or phrases, and each string may be associated with a list of one or more logical relations. Notably, the text may be split arbitrarily, and string, as used herein, does not necessarily mean a grammatically correct string. For example, when parsing a claim, it is often convenient to separate out claim strings by semi-colon or by comma, and to treat each phrase as a separate claim string. Each claim string may be given to the natural language processing system as one string.

Referring to FIG. 15, it is instructive to note the breakdown of a sample logical relation. Each logical relation may represent the relation between a pair of words. In one embodiment, the natural language processing tool is able to normalize conjugations of verbs. As such, different forms of a verb such as "storing" and "stored" may be normalized into present tense form "store", shown as item 1500 of FIG. 15. Item 1502 indicates the part of speech associated with item 1500, which in the example shown, is a verb. Item 1506 shows a logical relationship between the pair of words. Relation types are described further in U.S. Pat. No. 6,871,174, which is already fully incorporated by reference. In the example shown in FIG. 15, the relationship is Tobj, indicating that the second word is the object of the verb. The second word 1508 in the sample shown in FIG. 15 is the word content. Part of speech 1510 correctly identifies the object of the string as a noun.

Finding Similar Text: Calculation of Logical Text Scores

Figure 16A:
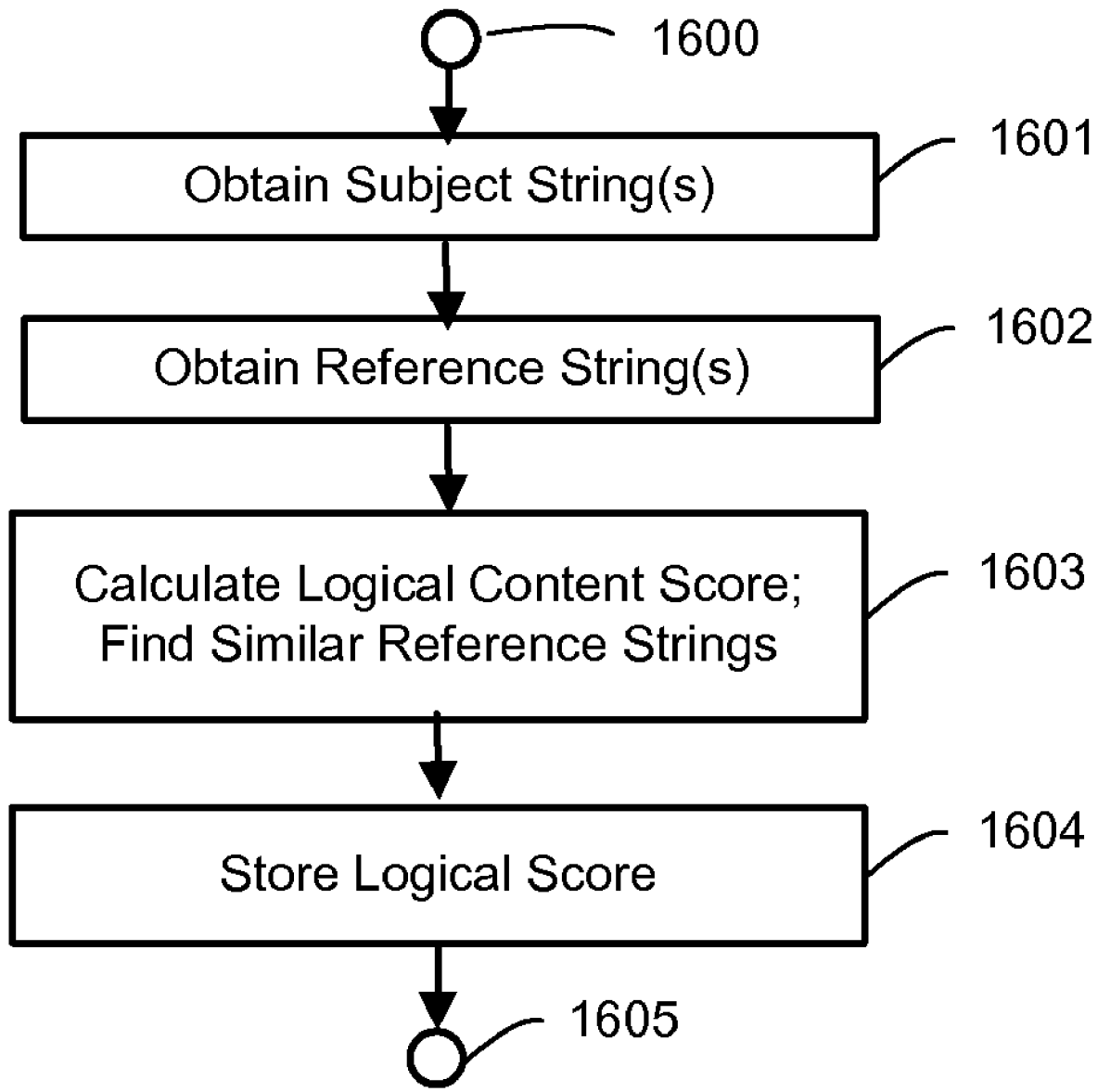
FIGS. 16A, 16B, 16C, 16D, 16E and 16F illustrate a method for calculation and storage of a logical score between subject content and reference content, as well as finding strings in reference content that are similar to strings in subject content.

Referring to FIG. 16A, an overview of a method for calculation and storage of a logical text score between subject and reference content is shown. Item 1600 represents the start point where subject content and reference content have been identified. At step 1601, text from the subject content is obtained. Notably, this may be any or all of the text from the subject content. The text obtained in step 1601 may be from any or all claim text inside a subject patent content, from a claim string in the subject content, from a title in the subject content, from an abstract in the subject content, the text of 1601 may be obtained from a field of the invention section in the subject content, from a summary section in the subject content, from content associated with one or more figures in the subject content, from any or all of the text of a subject content, from content linked to or cited by the subject content, or by any combination of text from these sources. In step 1602, text is obtained from the reference content. Here also, the text obtained in step 1602 may be from any or all claim text inside the reference patent content, from a claim string, from the title of the reference item, from the abstract, from a field of the invention section, from a summary section, from content associated with a figure in the reference content, from any or all of the text of the reference content, or the text of 1602 may be any combination of text from these sources. Notably, the text obtained in steps 1601 and 1602 may be selected depending on which logical score is being calculated. For example, in one embodiment, the text for 1601 is taken from the title and abstract of the subject content, and the text of 1602 is taken from the title and abstract of the reference content and this is used to calculate the logical abstract score. Additionally, to calculate the logical document score, the text for 1601 may be taken from the entire content of a subject document and the text of 1602 taken from the entire content of a reference document, and subsequent comparison may yield the logical document score. The logical claim score may be calculated by taking text from one or more claim strings in the subject content in step 1601, and comparing to the claim string text content with the reference content.

Still referring to FIG. 16A, step 1603 illustrates calculation of a logical text score by comparison of subject text to reference text. Step 1603 may also include finding text in the reference content that is similar to text in the subject content. Notably, there are many choices for how a logical text score may be calculated, and how similar text is identified. U.S. Pat. No. 6,871,174, previously incorporated by reference, describes at least two algorithms for calculation of a fuzzy logical score between two textual segments, and either of these may be used for step 1603. Regardless, FIGS. 16B-16F describe another embodiment for implementing step 1603 of FIG. 16A. Step 1604 indicates storage of the logical score in association with a reference content identifier and a subject content identifier. At ending step 1605, with the logical score result stored, and similar reference text identified, the logical score and reference text in association with a reference content identifier and a subject content identifier may be reported using any similar output reports described earlier.

Calculation of a Logical Claim Score

Figure 16B:
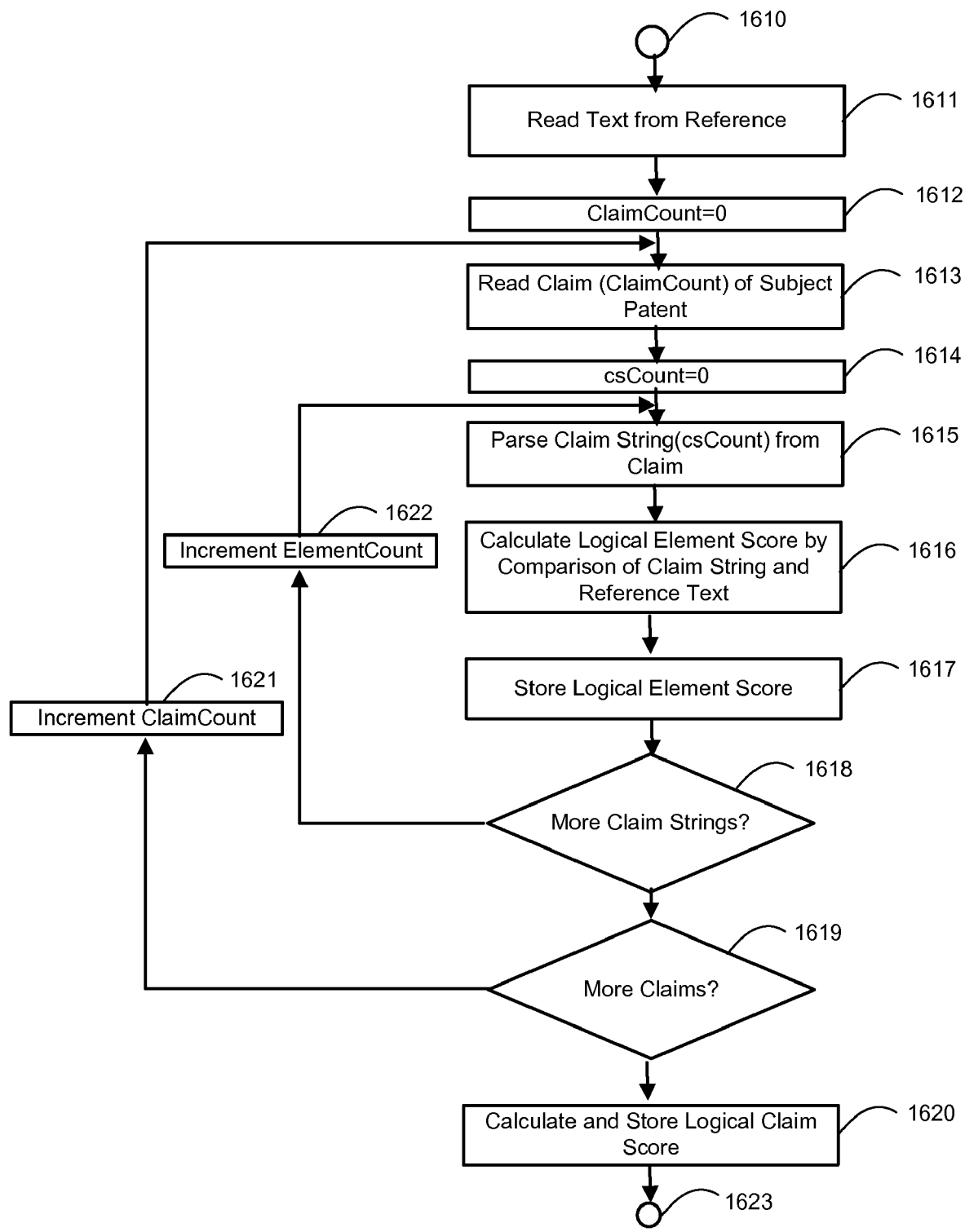

FIG. 16B depicts a method suitable for computation of a logical claim score, when evaluating claim text from subject content against text in reference content. Referring to FIG. 16B, at starting point 1610, subject patent content and reference content have been identified. In step 1611 the content analysis software reads text from the reference content. This may be all or some of the textual content from the reference item. At step 1612, a claim counter ClaimCount is initialized to value 0. At step 1613, the content analysis software reads the claim at index ClaimCount from the subject patent content. The claim at index ClaimCount is the current claim. At step 1614, a claim string counter csCount is initialized to 0. At step 1615, claim string at index csCount is read from the current claim. The claim string at index CsCount is the current claim string. When csCount is 0, the first claim string of the claim would ordinarily be the preamble of the claim, though optionally, the computer program may choose to skip the preamble and retrieve the next claim string as the first claim string of the claim.

A detail concerns how the content analysis software may divide a claim into claim strings. In one embodiment it may do this by separating the text of a claim using semi-colons, if present, and/or using commas if present. In another embodiment, the content analysis software may just divide the claim using a character count, but ending on whole words only.

Still referring to FIG. 16B, step 1616 indicates a calculation of the logical claim string score between the text from the current claim string from step 1615 and the reference text obtained from step 1611. Notably, the logical claim string score calculated in step 1616 may be an indication of how well the claim string retrieved form step 1613 reads on the text retrieved from step 1611. One embodiment for calculating the logical claim string score is described in more detail in relation to FIGS. 16C, 16D, 16E and 16F, but again a logical score may also be calculated using fuzzy matching algorithms, such as detailed by U.S. Pat. No. 6,871,174.

Referring still to FIG. 16B, step 1617 stores the claim string logical score. In conditional step 1618, an evaluation is made as to whether there are more claim strings in the current claim, and if there are, the program increments the claim string counter CsCount in step 1622 and loops back to before step 1615 where the next claim string is retrieved and parsed. The program proceeds again through steps 1615, 1616, 1617 and 1618 until conditional step 1618 evaluates to false, in which case the program proceeds to conditional step 1619 where a determination is made as to whether there are more claims in the subject patent content. If there are, then the program increments the counter ClaimCount at step 1621, and loops back to before step 1613 where the next claim is read from the subject patent content. If there are no more claims in the subject patent content, then the program proceeds to step 1620 where the overall claim score may be calculated and stored. Possible ways to calculate the overall claim score in step 1620 include calculating an average (mean, mode, median) of the logical claim string scores, setting the claim score to the best or worst claim string score, or calculating a logical claim score based on the claim string scores multiplied by weights. The weights may be decided based on the frequency of terms in the claim strings. For example, if terms appear infrequently, the claim string may get a correspondingly higher weight. Finally, the program terminates at 1623, where the logical claim string scores and the logical claim scores have been calculated and stored.

FIGS. 16C, 16D, 16E and 16F show one embodiment for calculation of a logical score between two textual segments, and find similar strings to subject text from reference content. The method described by FIGS. 16C, 16D, 16E and 16F may be used in step 1603 of FIG. 16A, or used in step 1616 of Figure B. However, as has already been discussed, computation of a logical text score and finding similar strings in reference text may be done in multiple ways, and other ways include employment of a Lexical Knowledgebase (LKB) as described by U.S. Pat. No. 6,871,174.

Figure 16C:
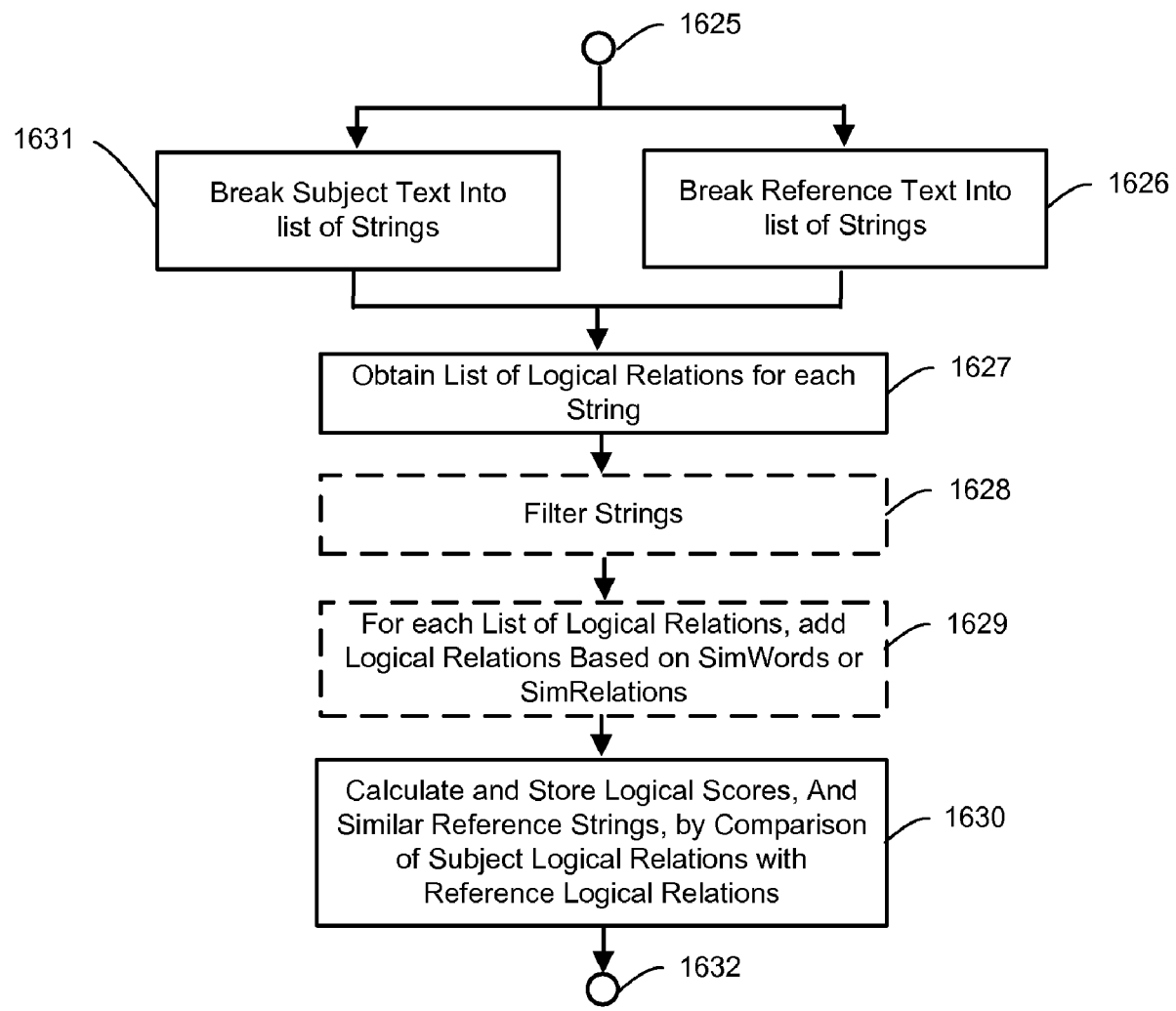

Referring to FIG. 16C, the first phase for a logical similarity calculation, and finding similar strings, is shown. At step 1625, two blocks of text are received. These two blocks of text could both be from one document, two documents, or any number of sources, but typically, the first block of text is from a subject document (referred to as subject text), and the second block of text is from a reference document (referred to as reference text). The subject and reference text blocks may of any length. For example, the subject text may comprise just one phrase within a claim, it may comprise one claim string of a claim, or it may comprise the entire contents of a document. Notably, before step 1625 is reached, claim strings may be parsed out as separate textual segments if desired, so that each claim string can be examined separately. In step 1631, the subject text is broken into strings. Typically, if just one phrase, without punctuation is included, step 1631 will break the phrase into just into one string. Similarly, if a text block contains only a comma, it may typically be converted into one string. However, the string breaker software employed may break text into strings using typical heuristics, such as the presence of periods followed by spaces, etc. Step 1626 also breaks the reference text into strings using the same heuristics employed in step 1631. The list of strings from step 1626 and the list of strings from step 1631 are separately sent to step 1627.

Figure 16D:
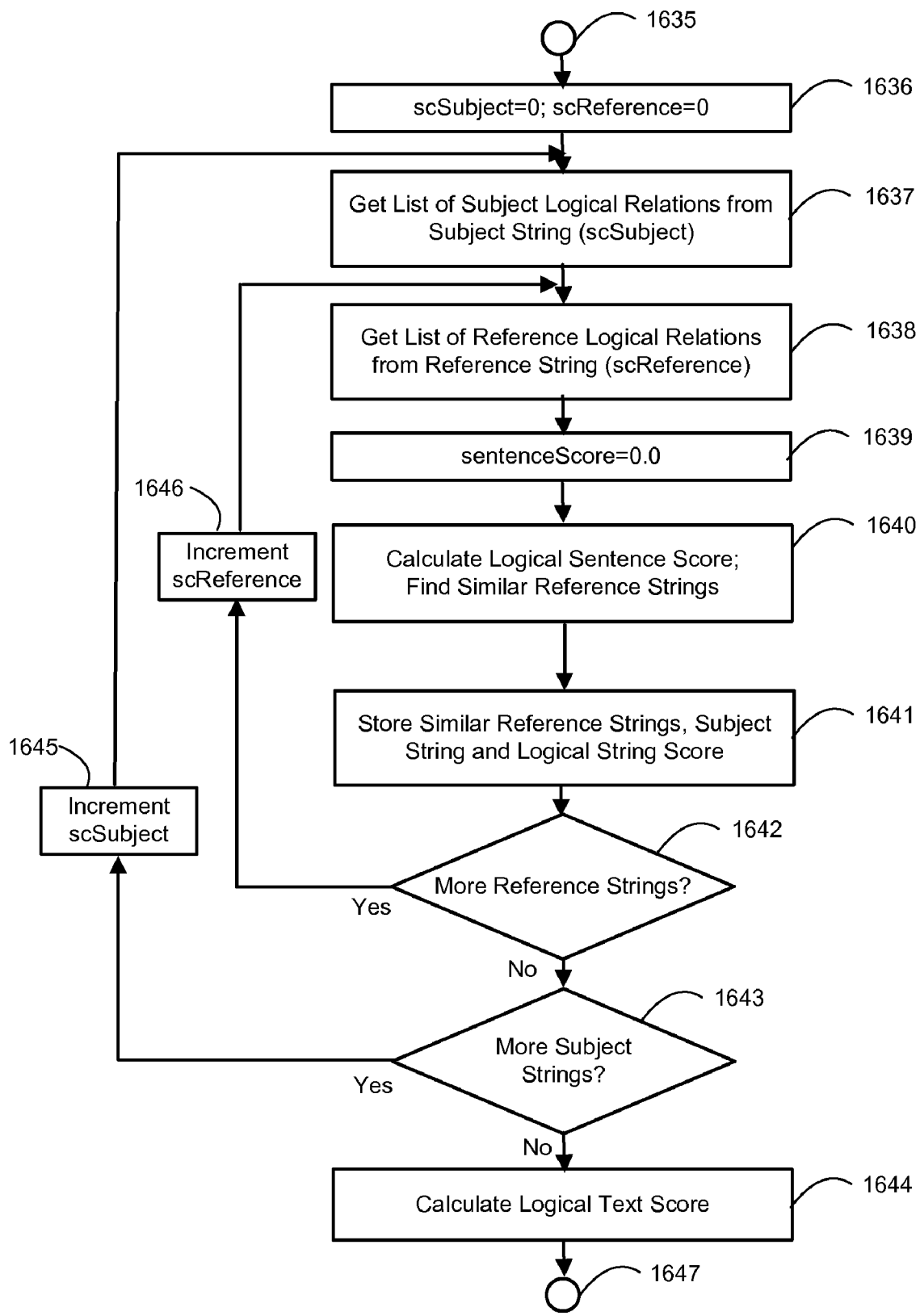
Figure 16E:
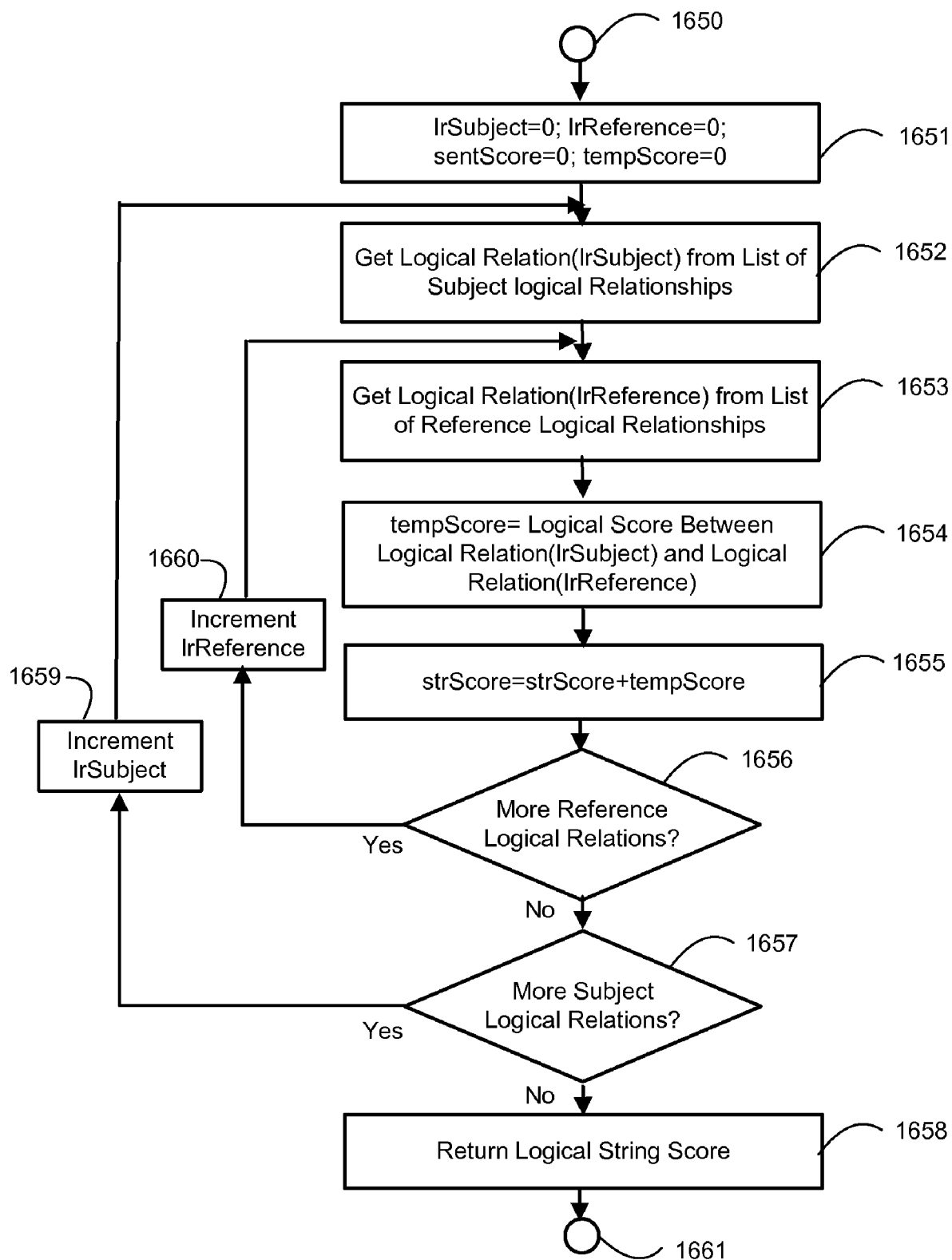
Figure 16F:
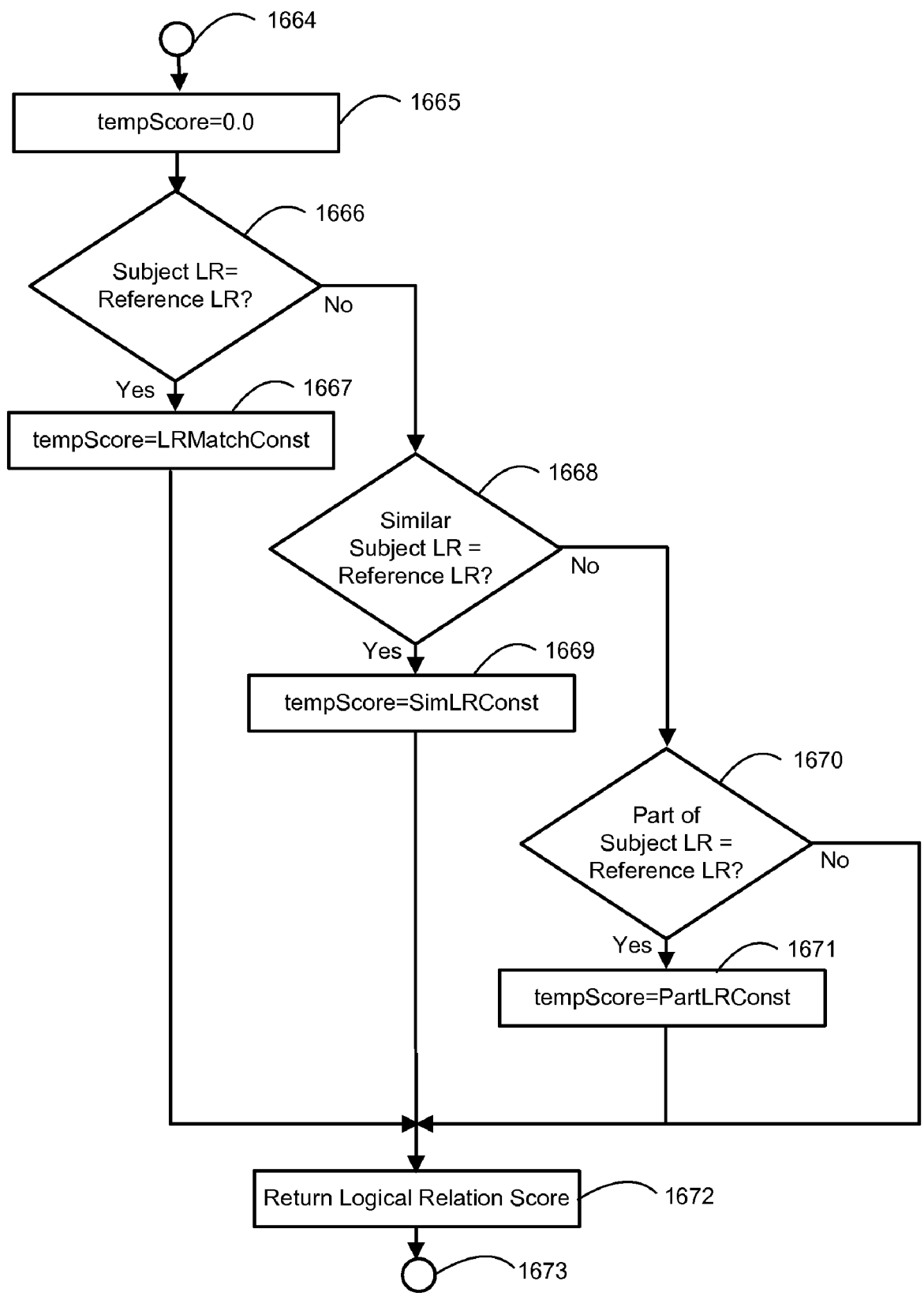

Referring still to FIG. 16C, step 1627 employs a natural language processing tool, such as the one described by U.S. Pat. No. 6,871,174, to obtain a list of logical relations for each string in the subject text, and a list of logical relations for each string in the reference text. At optional step 1628, the list of strings may be filtered so that only certain strings are compared as possible matches. For example, if it desirable to only find matching strings that contain nouns or verbs found within the subject text, then step 1628 may remove all strings (and their associated lists of logical relations) from the reference text that do not contain the nouns or verbs that were contained in the subject text. The nouns and verbs, or other parts of speech are easily identified because the information is included as part of each logical relation, as described previously in relation to FIG. 15. At optional step 1629, additional logical relations may be added to each list of logical relations using SimWords or SimRelationships. For example, as part of step 1629 a thesaurus of similar words may be loaded, and if is determined, using the thesaurus, that a word has the same part of speech and a similar meaning as another word, then a logical relation may be added to the list of logical relations associated with the string, with the original word in the logical relation replaced by a similar word. Similarly, as part of step 1629, a thesaurus of similar semantic relationships may be loaded, and if is determined, using the thesaurus of similar semantic relationships, that a different semantic relationship has a similar meaning as another semantic relationship, then a logical relation may be added to the list of logical relations associated with the string, with the original semantic relationship replaced by a similar relationship. By adding additional logical relations to either the subject logical relations, or the reference logical relations, or both, partial or whole matches may be found even if the subject text does not perfectly match reference text. Notably, even if SimWords and SimRelationships are not added, matching may be performed for non-perfect matches because of the normalization that the natural language processing software performs on verbs (such as converting "storing" and "stored" to a common root "store"). In step 1630, having obtained a list of logical relations for each string in the subject text, and each string of the reference text, a similarity score may be calculated. FIGS. 16D, 16E, and 16F provide more detail for an embodiment of step 1630 in FIG. 16C. After the logical text score has been calculated, and similar reference strings have been identified, the routine ends at step 1632.

FIG. 16D illustrates a program routine that may be called by step 1630 of FIG. 16C. Starting point 1635 corresponds to the start of step 1630 in FIG. 16C, where a list of logical relations has been obtained for each string in a list of strings associated with the subject text, and a list of logical relations has been obtained for each string in a list of strings associated with the reference text. At step 1636, a counter to keep track of subject strings scSubject, and a counter to keep track of reference strings scReference are initialized to 0. At step 1637 the list of logical relations associated with the subject string at index scSubject is retrieved. At step 1638 the list of logical relations associated with the reference string at index scReference is retrieved. At step 1639, a string score stringScore is initialized to 0.0. In step 1640, a logical string similarity score is calculated by comparing the lists of logical relations with the list of logical relations associated with the reference string. Step 1640 is discussed in more detail in relation to FIG. 16D. After a logical string similarity score has been calculated in step 1640, the program proceeds to step 1641 where a data structure stores either the reference string or an identifier associated with the reference string, the subject string or an identifier associated with the subject string, and the logical string similarity score. In step 1642, the program determines whether there are more reference strings in the reference text, and if there are, it increments the string counter scReference at step 1646, and loops back to before step 1637 where the next list of logical relations are retrieved from the next reference string. When conditional step 1642 returns false, the program proceeds to conditional step 1643. At conditional step 1643, the program determines if there are more subject strings in the subject text. If conditional step 1643 evaluates to true, then the program goes to step 1645 where the subject string counter scSubject is incremented, and the program loops back to before step 1637 where the list of logical relations associated with the next subject string at index scSubject is retrieved. The program again proceeds until conditional step 1643 evaluates to false, in which case the program proceeds to step 1644. In step 1644, a logical text score for the subject and reference text may be calculated and stored. In step 1644, the logical text score may be calculated as an average (e.g. mode, median, mean) of the logical string scores, or alternatively, it may be calculated as the best or worst logical string score, or alternatively, it may be calculated as a weighted average of the logical string scores, where the weights depend on such factors as how common matching terms are inside the strings. For example, if matching terms are more common, they may be assigned lower weights. The program routine exits at end state 1647.

FIG. 16E illustrates a program routine that may be called by step 1640 of FIG. 16D. In FIG. 16E, starting point 1650 corresponds to the start of step 1640 in FIG. 16D, where a list of logical relations has been obtained for a string in the subject text, and a list of logical relations has been obtained a string in the reference text. In FIG. 16E, at step 1651, a counter lrSubject to keep track of logical relations in the list of subject logical relations, and a counter lrReference to keep track of reference logical relations are initialized to 0. Also, at step 1651 a logical string score is initialized to value 0.0 and a tempScore variable is initialized to 0.0. At step 1652 the logical relation from the list of subject logical relations, at index lrSubject, is retrieved. At step 1653 the logical relation from the list of reference logical relations, at index lrReference, is retrieved. In step 1654, tempScore is calculated by a routine described in relation to FIG. 16F. The routine described in relation to FIG. 16F compares two logical relations, and returns a score based on a partial or complete match. After tempScore has been calculated in step 1654, the program proceeds to step 1655 where tempScore is added to the existing value of the logical string score sentScore. In conditional step 1656, the program determines whether there are more reference logical relations in the list of logical relations associated with the current reference string, and if there are, it increments the reference logical relation counter lrReference at step 1660, and loops back to before step 1653 where the next logical relation is retrieved from the list of reference logical relations. As before, the program proceeds through steps 1653, 1654, 1655 until conditional step 1656 returns false, at which point the program proceeds to conditional step 1657. At conditional step 1657, the program determines if there are more logical relations in the subject list of logical relations. If conditional step 1657 evaluates to true, then the program goes to step 1659 where the subject logical relation counter IrSubject is incremented and the program loops back to before step 1652 where the logical relation associated with index IrSubject is retrieved from the list of subject logical relations. The program again proceeds until conditional step 1657 evaluates to false in which case the program proceeds to step 1658. In step 1658, the logical string score, sentScore, is returned to the caller routine. Finally, the program routine exits at step 1661.

FIG. 16F shows detail of a program routine that may be called by step 1654 in FIG. 16E to calculate a logical similarity score between two logical relations. Referring to FIG. 16F, at starting point 1664, a subject logical relation and a reference logical relation are to be compared. In step 1665, a tempScore variable is initialized to 0.0. The routine then proceeds to conditional step 1666, where a determination is made as to whether there is an exact match between the subject logical relation and reference logical relation. If there is an exact match in step 1666, then the routine proceeds to step 1667 where the tempScore is assigned to the highest match constant LRMatchConst. In one embodiment, a value for LRMatchConst may be 1.0. If conditional step 1666 evaluates to false, then the routine may proceed to conditional step 1668. Conditional step 1668 may determine whether a similar subject logical relation exactly matches the reference logical relation. For example, if a word with similar meaning and the same part of speech is substituted into a subject logical relation, step 1668 may test whether the subject logical relation would exactly match the reference logical relation. Similar logical relations may be introduced in step 1668, or may have been introduced earlier in the program (for example, see discussion of step 1629 in FIG. 16C). Step 1668 may also determine whether a subject logical relation with a similar logical relationship substituted for the existing logical relationship would cause a logical relation match. If conditional step 1668 evaluates to true, then step 1669 is executed and the tempScore variable is assigned a score that reflects the value of a similar relationship or similar word match. Notably, SimLRConst may contain a different value depending on whether the match was based on a similar relationship or a similar word, and it may be a different value depending on the part of speech of the word that was matched. For example, similar nouns and verbs may have a higher value than adjectives. In one embodiment, a SimLRConst simply has a value of 0.5.

Still referring to FIG. 16F, if conditional step 1668 evaluates to false, then the routine proceeds to conditional step 1670, where the routine may evaluate whether just part of the subject logical relation matches part of the reference logical relation. As an example, if the first word of the logical relation and the relationship match, then PartLRConst may be assigned a score (e.g. value 0.2) whereas if just the first words match, but not the relationship, the PartLRConst value may be correspondingly lower (e.g. value 0.1). Also, step 1670 may compare the second words and/or the second words coupled with the logical relation. If step 1670 evaluates to false, then the routine proceeds to step 911 where tempScore is assigned to value 0.0. All paths of the program routine illustrated by FIG. 24D, from steps 1667, 1669, 1671 proceed through to step 1672 where the tempScore result is returned to the caller as the logical relation score, before the routine ends at stage 1673.

Naturally, many variations of calculation for logical relation score may exist. For example, SimWords and SimRelationships do not have to be compared. Also, there is great choice in the scores that may be assigned. Also, the scores may be multiplied together as terms within strings are compared. As mentioned previously, fuzzy match scores may also be calculated using algorithms and a Lexical KnowledgeBase (LKB) described in U.S. Pat. No. 6,871,174.

Calculation of Logical Claim Score for Combinations of References

Figure 17:
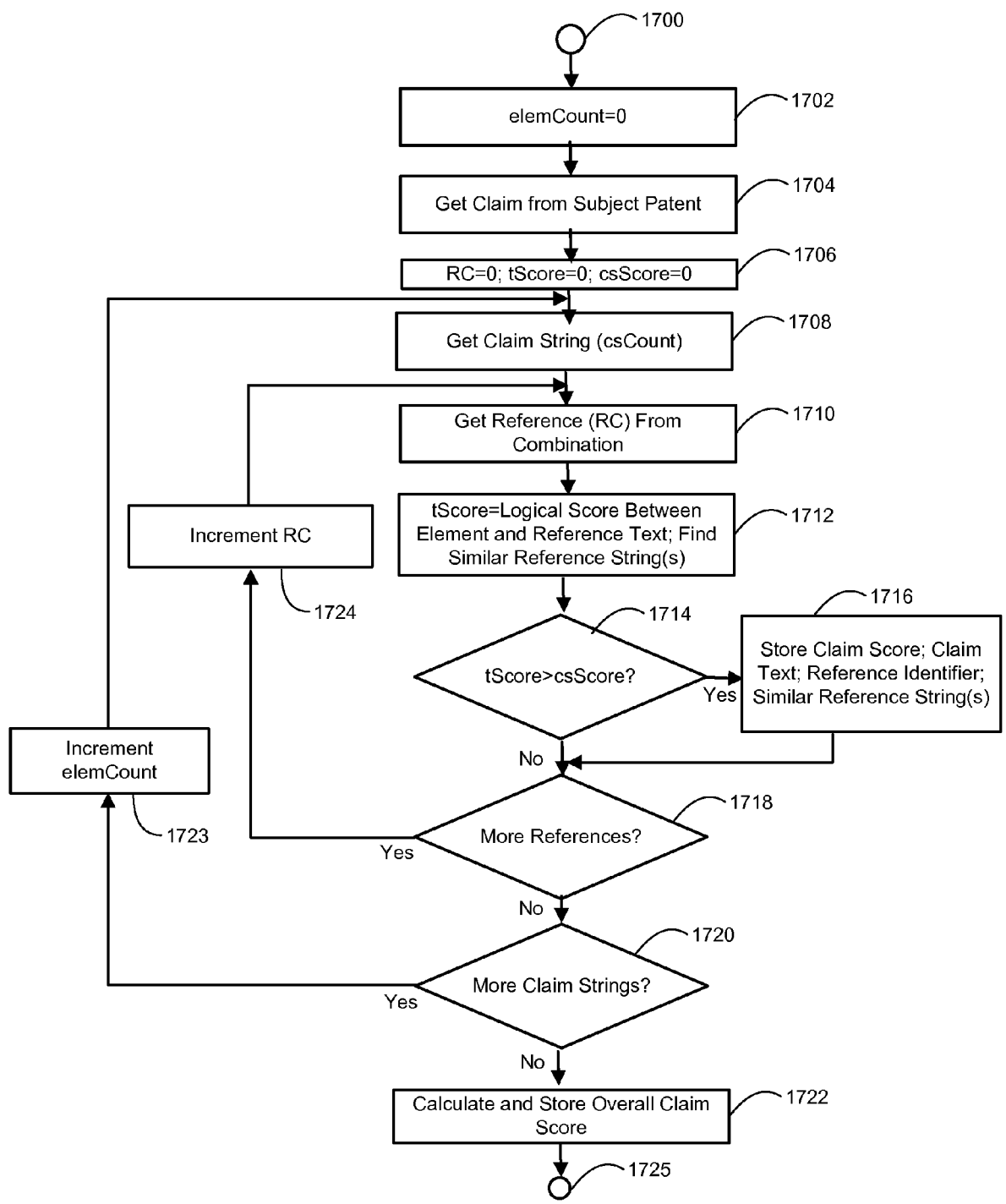
FIG. 17 illustrates a method of finding a combination of references that are similar to subject content, and finding a reference within the combination that is to each claim string of a claim.

FIG. 17 depicts a method suitable for computation of a logical claim score, when evaluating claim text from subject content against text from multiple references within a combination. At step 1702, a claim string counter elemCount is initialized to 0. At step 1704, the content analysis software reads the claim at index ClaimCount from the subject patent content. The claim at index ClaimCount is the current claim. At step 1706, a reference counter RC, a temporary score tScore and a claim string score csScore are all initialized to 0. At step 1708, claim string at index elemCount is read from the current claim. The claim string at index elemCount is the current claim string. When elemCount is 0, the first claim string of the claim would ordinarily be the preamble of the claim, though optionally, the computer program may choose to skip the preamble and retrieve the next claim string as the first claim string of the claim.

Still referring to FIG. 17, step 1712 indicates a calculation of the logical claim string score between the text from the current claim string retrieved from step 1708 and the reference text obtained from the reference that was retrieved in step 1710. The logical claim string score calculated in step 1712 may be an indication of how well the claim string retrieved form step 1708 reads on the text retrieved from step 1710. One embodiment for calculating the logical claim string score is described in more detail in relation to FIGS. 16C, 16D, 16E and 16F, but again a logical score may also be calculated using fuzzy matching algorithms, such as detailed by U.S. Pat. No. 6,871,174.

Referring still to FIG. 17, conditional step 1714 tests if the temporary score is greater than csScore, and if so, the program executes step 1716 which stores the claim score, claim text, reference identifier and similar reference string(s). In step 1718, an evaluation is made as to whether there are more references. If there are, then the program executes step 1724 to increment RC, and then loops back to before step 1710. If not, and more claim strings in the current claim, and if there are, the program increments the claim string counter CsCount in step 1723 and loops back to before step 1708 where the next claim string is retrieved and parsed. The program proceeds again through steps 1708, 1710, 1712, 1714 and 1718 until conditional step 1718 evaluates to false, in which case the program proceeds to step 1722 where the overall claim score may be calculated and stored. Possible ways to calculate the overall claim score in step 1722 include calculating an average (mean, mode, median) of the logical claim string scores, setting the claim score to the best or worst claim string score, or calculating a logical claim score based on the claim string scores multiplied by weights. The weights may be decided based on the frequency of terms in the claim strings. For example, if terms appear infrequently, the claim string may get a correspondingly higher weight. Finally, the program terminates at 1725, where the logical claim string scores and the logical claim scores have been calculated and stored.

Centroid Score

The centroid score reflects three insights: (1) references containing multiple instances of keywords tend to be more relevant than those without duplicates, (2) references with more matching keywords tend to be more relevant than those with less, and (3) references where the keywords are closer together tend to be more relevant than those further apart. For example, references with the keywords, "compiler" and "Java" in the same paragraph are more likely to refer to a compiler for the Java language than if one keyword was in the introduction and the other keyword was in the middle of the reference.

To measure this phenomenon, the centroid score takes a set of keywords to search, and determines not only if the keywords are in a reference, but also the distance the keywords cluster around a center point. The center point represents the average position of a cluster of keywords, and is called a centroid. The average distance of the keywords from the centroid is calculated. Then this average distance is optionally normalized to some scale, for example from 0 to 1, where 1 indicates high correlation and 0 indicates no correlation. This normalized score is the centroid score. The details of calculating and interpreting the centroid score are described below.

Calculation of Centroid Score

Figure 18:
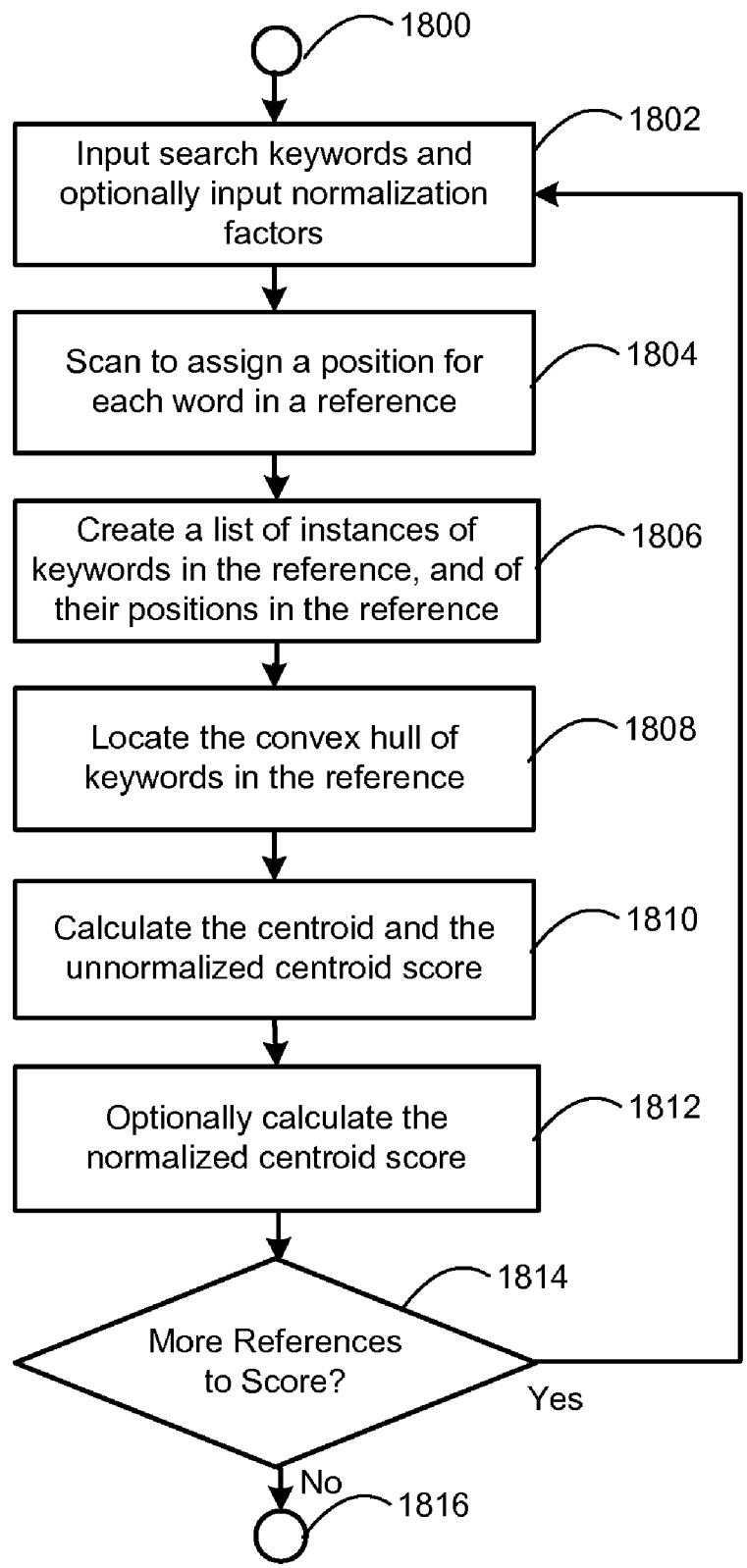
FIG. 18 illustrates a method for calculating a centroid score.

The calculation of the centroid score for a set of references is illustrated in FIG. 18. At start step 1802, the routine inputs a set of keywords, and optionally parameters with which to normalize the centroid scores. For each reference, the calculation of the centroid score involves taking the set of keywords and processing the following steps: step 1804 scanning the reference; step 1806 locating the positions of the keywords in the reference; step 1808 looking for the convex hull representing the smallest cluster of keywords in the reference, step 1810 calculating the centroid representing the average location of the keywords from the centroid and calculating an unnormalized centroid score represented by the average distance of each of the keywords from the centroid, and step 1812 optionally normalizing the resulting average distance to some scale to produce the final centroid score. In conditional step 1814 the routine checks to see if there are any more references to score. If there are, the routine takes the next reference and restarts execution at step 1804. Otherwise, the routine completes, and may either display results to the user, or may forward results to some composite score.

Figure 19A:
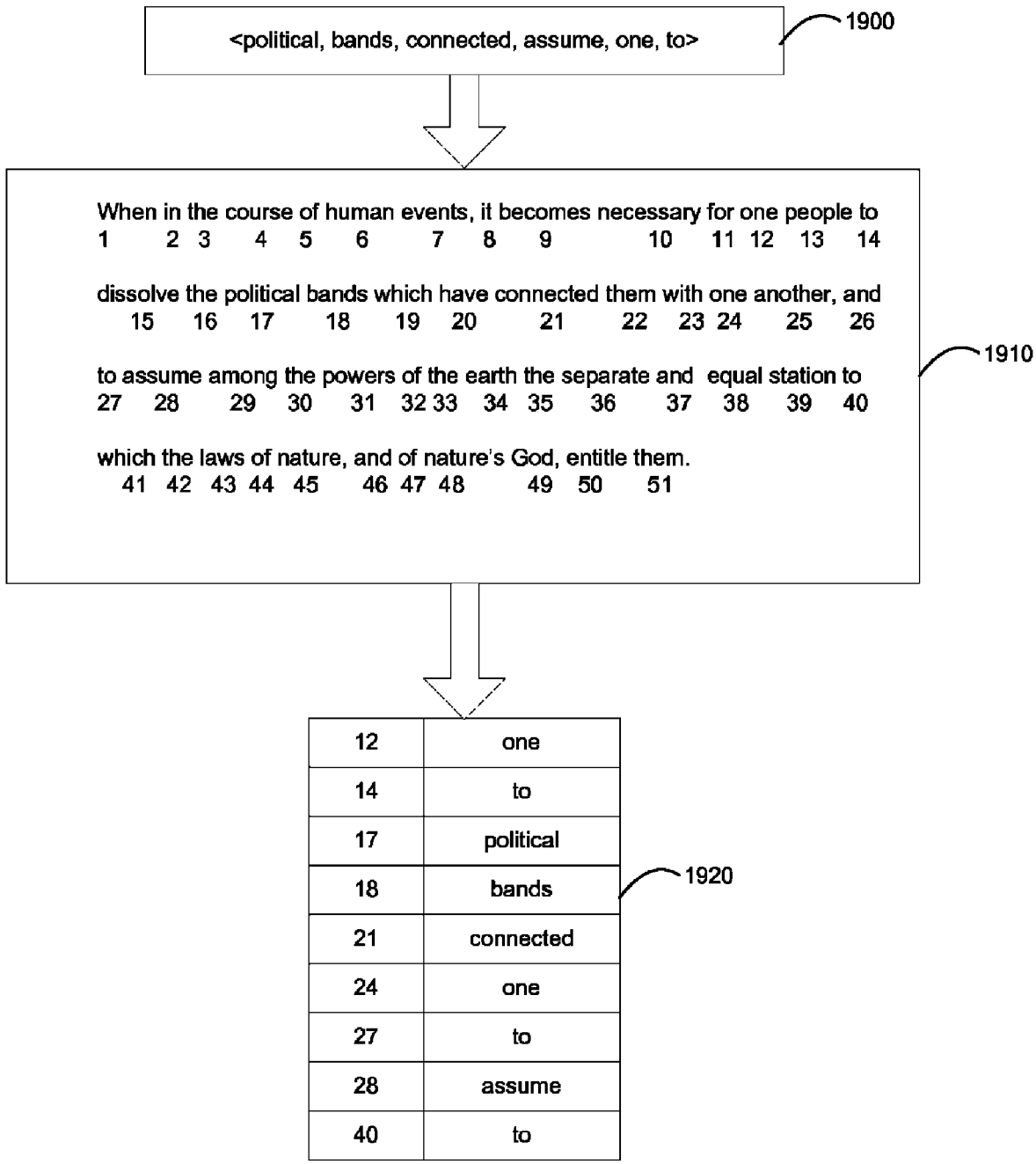
FIGS. 19A and 19B illustrate extracting and creating an ordered list of keyword instances, and their positions in a reference, and then identifying the convex hull of keyword instances and positions from the ordered list.

Turning to FIG. 19A, the positions of instances of the keywords in the reference are located and preferably stored in a list ordered by position. The routine starts with a set of search keywords 1900 to be applied to the references. A reference 1910 is scanned such that each word in the reference is assigned a sequential position. The first word of the reference is numbered 1, the second word in the reference is numbered 2, and so on. The reference 1910 is then scanned for instances of keywords. When a keyword is found, the word and its position are stored in a list as shown in 1920. At the end of scanning, the result is a list ordered by position.

The routine may require that all keywords are to be found in a reference in order to be considered for further calculation of a centroid score. In that case, if no instances of one or more search keywords are found in the reference, the analysis may stop and the reference rejected as not sufficiently relevant. Alternatively, a word not found in the reference may be interpreted as having a position far away from the centroid, and could be assigned an artificial distance later. The value of an artificial distance should be a relatively large number to minimize the impact of the missing search word from subsequent scoring.

Figure 19B:
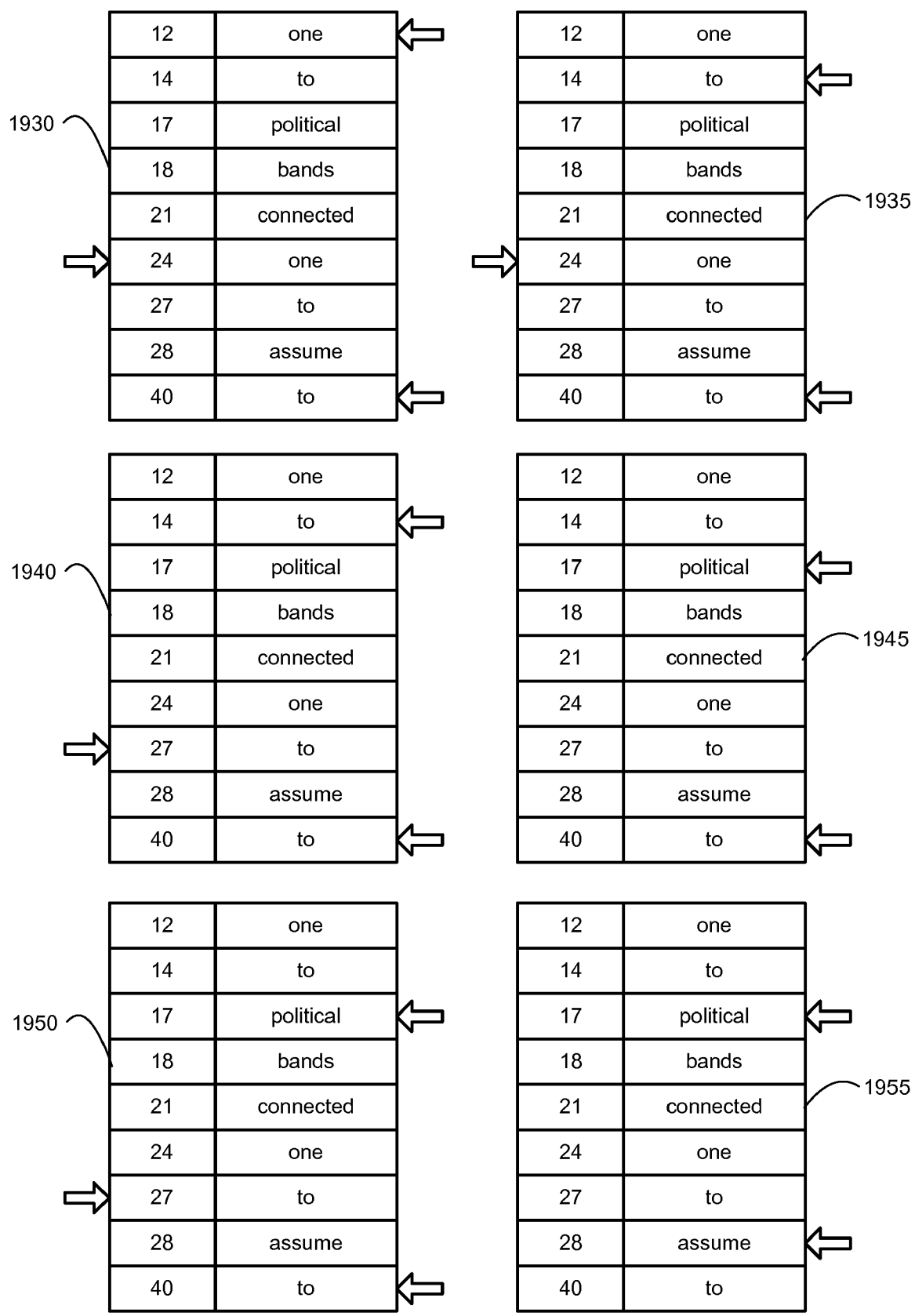

Turning to FIG. 19B, the convex hull is the outer boundaries of the smallest subset of words in the reference that contain all the search keywords. We determine the convex hull by a strategy of taking the largest set with all the keywords, and iteratively shrinking the set until the smallest set is determined. The convex hull is calculated from the ordered list of found words in an iterative process as follows. We store references to the first keyword in the ordered list, and the last keyword in the ordered list. As shown in 1930, we start with the first keyword in the ordered list (in this case "one"), we look for duplicates of that keyword with a larger position, but not beyond the last keyword. If a duplicate is found that is not beyond the last keyword in the ordered list (in this case we see "one" is duplicated at position 24), we know that we can eliminate the first keyword in the ordered list, and so increment the reference to the next keyword, as shown in 1935. In other words, the top of the convex hull has been reduced and reference to the top keyword in the convex hull now points to the next word. We search for a duplicate of the new top of the convex hull (in this case "to"). As shown in 1940, we find a duplicate ("to" at position 27), and we increment the reference again as shown in 1945. As shown in 1950, this continues until no more duplicates beyond the last keyword are found. Similarly, as shown in 1950, we reduce the bottom of the convex hull by starting with the reference to the last keyword in the ordered list (in this case "to" at position 40). We look for duplicates of that keyword with a smaller position, but not beyond the reference to the top of the convex hull. If we find a duplicate (as in this case "to" at position 27), as shown in 1950, we can eliminate the last keyword in the ordered list, and so decrement the reference to the prior keyword, as shown in 1955. This continues until no more duplicates beyond the keyword referenced at the top of the convex hull is found. At this point, the reference to the first keyword, and the reference to the last keyword provides the keyword positions of the smallest set of words in the reference containing all the search keywords, i.e. the convex hull. In the example shown in FIG. 19B, the convex hull has shrunk to the words between the word "political" at position 17 and the word "assume" at position 28.

Now that we have the convex hull, we can calculate an unnormalized centroid score as illustrated in FIG. 20. We calculate the centroid of the convex hull. Preferably, as shown in 2000, in the positions each keyword instance in the ordered list within the convex hull is averaged. As shown in 2010, for each keyword instance in the ordered list, (1) the position is subtracted from the average in order to get the distance and (2) each distance is squared. As shown in 2020, the squares of the distances are averaged. In 2030, the unnormalized centroid score calculated by taking the square root of this average of the squares of the distances.

In the calculation illustrated in FIG. 20, the square root yields the average distance of the keywords from the centroid. Note that the squaring technique, while having the effect of eliminating the difference between positive distances and negative distances, also has the chi-square like effect of emphasizing the effect of points further away from the centroid. Generally this is desirable because it measures the degree the keywords cluster towards a centroid. However, in some cases where a straightforward average of the distances is desired, without any weighting of the outlier data, an average of the absolute values of the distances may be made instead. Note that where keywords are duplicated in the convex hull, in effect the contributions of that keyword are averaged out. However, other implementations may elimination of the duplicate keywords furthest away from the centroid rather than rely on the averaging effect.

The average distance from the centroid may now be normalized to a desired comparative scale. This scale will vary depending thresholds set by the user. The user specifies a relatively small number to indicate an average distance of keywords from the centroid representing high correlation. The user then specifies a relatively large number to indicate an average distance of keywords from the centroid representing no correlation. All distance averages that are equal to or less than the small number correspond to some maximum value for a centroid score. All distance averages that are equal to or more than the large number correspond to some minimum value for a centroid score. The average distance values for references are then scaled between the centroid score maximum and minimum. Preferably, the scaling is done linearly. However, non-linear scaling may be used depending on the statistical requirements of the user. As will be shown in the following paragraphs, setting thresholds will impact interpretation of the final, normalized centroid scores.

Interpreting Centroid Scores

Interpreting centroid scores is dependent on the thresholds set by the user. These thresholds should reflect some physical attribute of the references being searched and scored. Table 1 illustrates one embodiment, where the centroid scores scale from 0 to 1, with 0 indicating no correlation and 1 indicating complete correlation.

TABLE 1

Calculation of Centroid Score

| Item | Value |
| --- | --- |
| Number of search terms | 6 |
| ½ Number of search terms | 3 |
| Max Score 1 | 3 |
| Min Score 0 | 100 |
| Unnormalized Centroid Score | 4.19 |
| Normalized Centroid Score | $1 - (4.19/(100 - 3)) \approx .96$ |

Complete correlation can be approximated as half of the number of keywords searched for. This would be indicative of all the keywords being present in the reference, and adjacent to each other. This is because the centroid of a set of keywords in a reference completely adjacent to each other would be the halfway point of the set, and the distance to either side of the convex hull would be half the number of keywords in the set. Thus all references with a distance equal to or less than half the number of keywords searched for would have a centroid score of 1. Similarly, if the average number of words in a paragraph were 1611, an average distance of 500 would indicate that many keywords in the convex hull were not in the same paragraph. Thus a centroid score of 0 would correspond to any average keyword distances of 500 or more. Average distances between half the number of keywords and 500 could be scaled between 1 and 0 accordingly.

The thresholds set need not be between half the number of keywords or half the average number of words in a paragraph. Similarly, the centroid scores need not range from 0 to 1. However, the interpretative value of the centroid score will depend on these thresholds corresponding to some physical property, such as number of adjacent keywords, or number of words in a paragraph. With correspondence to a physical property, the user may make qualitative statements like, "from this centroid score, the keywords appear to be in the reference, and are likely to be in the same paragraph."

Implementation of Centroid Score Optimizations

While the centroid score calculations may be implemented via brute force scanning of references, the calculations may be optimized by preprocessing. In a preferred embodiment, as illustrated in FIG. 21, a word index for each reference is generated. The index consists of a list of all unique words in the reference sorted alphabetically. Each word in turn is associated with a list of integers, where each integer represents the position of an instance of the keyword from the beginning of the reference.

The index may be generated by linearly scanning the reference 2100, word by word, starting from the beginning of the reference. When a first word is scanned from the reference, it is assigned a position of 1. The word is searched for in the list of words found so far. Since it is the first word, it is inserted into the list using an insertion sort. Its position, in this case 1, is stored in a list of integers corresponding to that word. The next word scanned is then associated with a position of 2, and if the word is found in the list of words, the position is stored in that word's list of integers. Word stemming may be implemented to determine if a related word should be treated as a duplicate, for example treating, "nature" and "nature's" as the same word. Otherwise if a duplicate is not found, it is added to the list via insertion sort, and its position stored in its corresponding list of integers. This repeats until all words in the reference are scanned, resulting in an index structure of the reference as illustrated in 2110. Other variations on insertion sort, such as open and closed hashing may be substituted, depending on performance requirements.

By creating this index for each reference, determination of the convex hull is very efficient. A linear scan of all the words in the index can rapidly determine if the reference contains all the words. A list of keyword positions may be generated via a mergesort with all the integer lists in the index corresponding to the keywords.

Finally, unnecessary calculation of the centroid, which is relatively expensive, may be avoided by noting that the size of the convex hull is too large to reasonably yield an average distance within set thresholds. Thus calculation of the centroid and the average distances is only executed for references likely to be relevant to the user.

The foregoing is merely a description of one preferred embodiment of centroid scores. However, the description is not intended to be limiting as persons having ordinary skill in the art may substitute different data structures and algorithms for implementation, such as trees for lists, or hashes for insertion sorts, without departing from the spirit of the centroid score. Similarly, calculation of average distances may be varied with different statistical techniques, for example average of absolute value rather than chi-square, without departing from the spirit of the centroid score.

Subject and Reference Comparison Reports

Since the content analysis software may include a natural language processing component, and is capable of finding similar text, a wide variety of output reports are possible.

Figure 22:
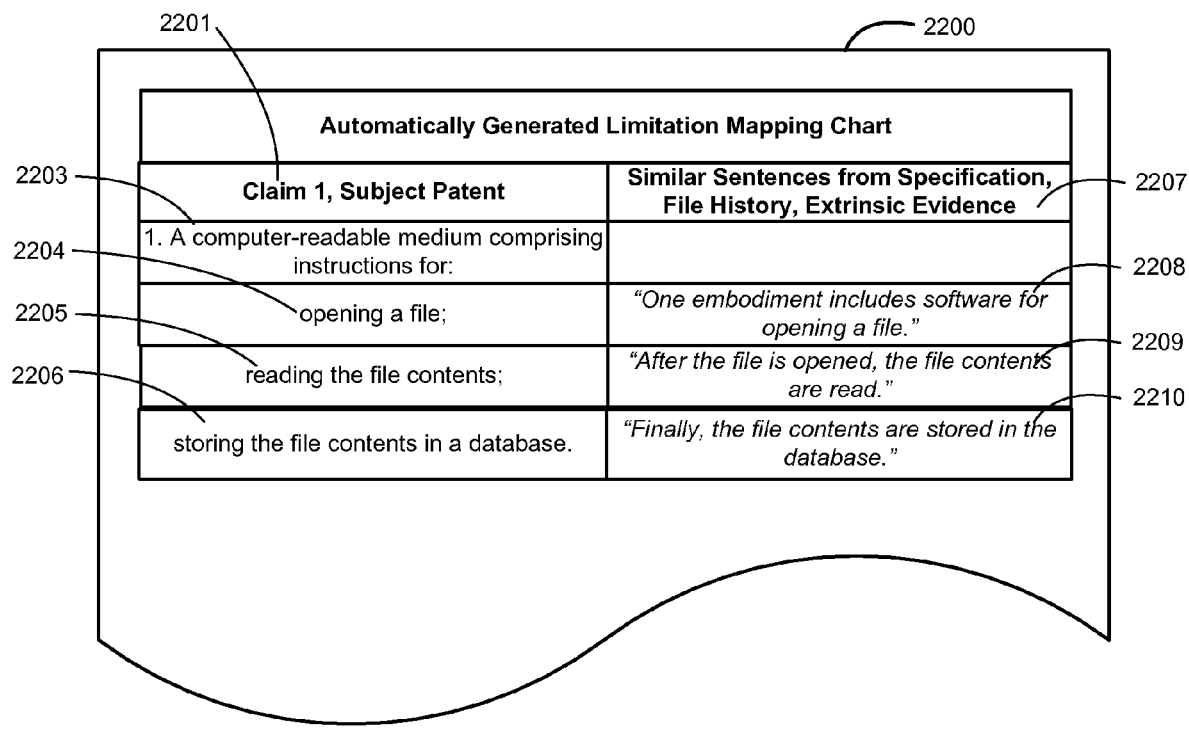
FIG. 22 illustrates a sample output report showing a limitation mapping chart.
Figure 23:
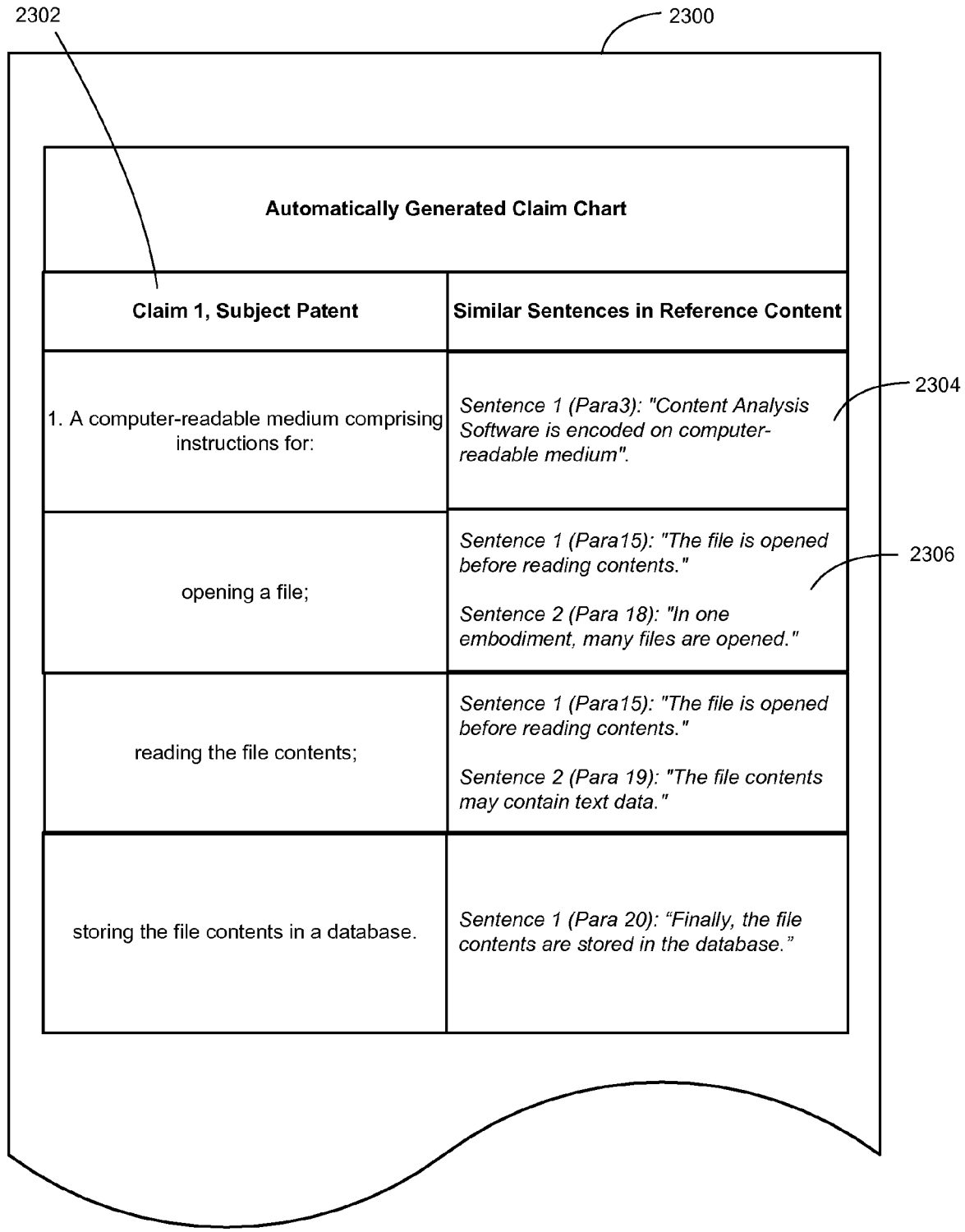
FIG. 23 illustrates a sample output report showing an automatically generated claim chart.

FIG. 22 illustrates a sample output report showing a limitation mapping chart, similar in nature to the kind of chart that might appear in a Markman hearing, and reports of this type may be automatically generated from an embodiment of content analysis software. Referring to FIG. 22, the chart report 2200 includes one or more claims from subject patent content starting in column 2201, and similar strings found from the subject patent specification and/or the subject patent prosecution history, displayed in column 2207. Area 2203 shows a preamble to a sample claim of the subject patent content. The content analysis software may find similar strings to claim preamble, or optionally, it may not display any similar matches for preambles. Area 2204 of the report includes the first claim string of a sample claim, and corresponding area 2208 includes one or more strings that are determined by the content analysis software to be similar in meaning to the claim string of the claim. In report 2200, the strings may be selected by the content analysis software from the subject patent content description. For the purposes of this report, the description may typically not include the claims of the subject patent content because the purpose of this report is to show support for the claim strings from the patent description. Area 2205 shows a second claim string, and 2209 shows a corresponding string selected from the subject patent content's description. Finally, in the example claim shown, area 2206 shows the last claim string of the claim and area 2210 includes a string determined to be similar. A benefit of the report shown in FIG. 2200 is that it may aid in determination of whether claim strings are supported by both the specification and/or file history, and whether there are contradictory statements in the file history that may undermine a claim.

Figure 24:
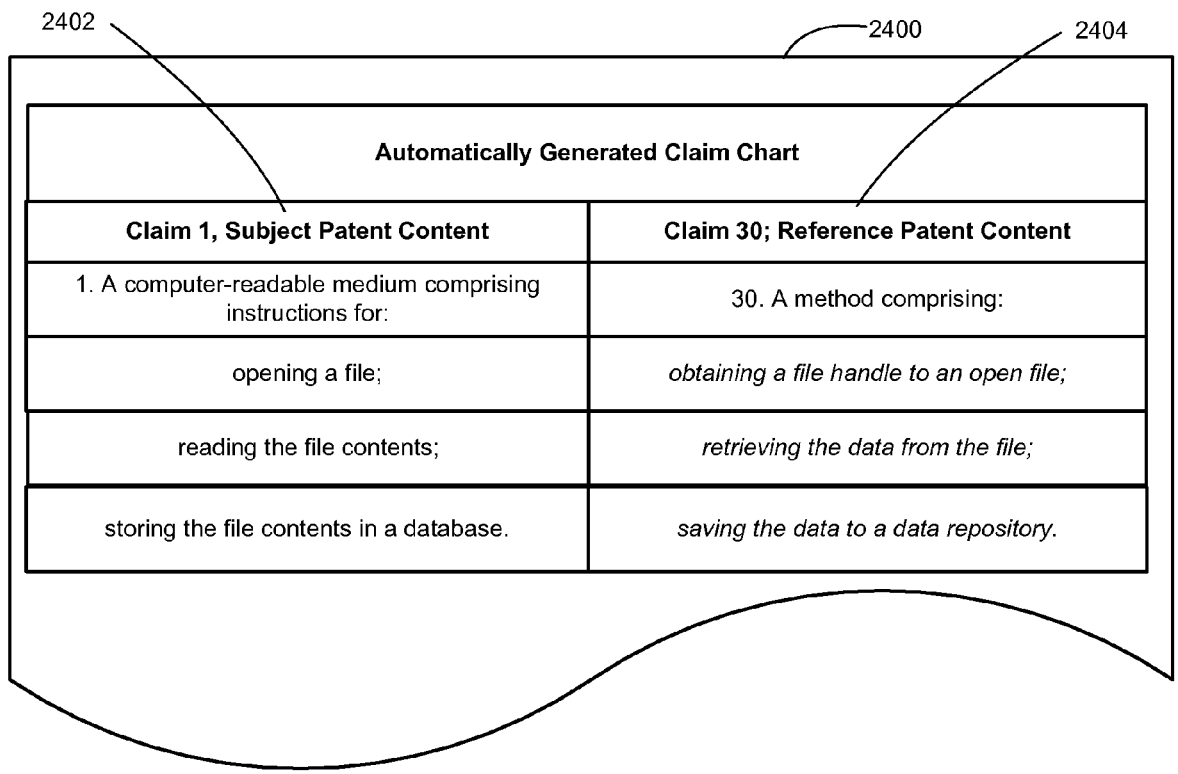
FIG. 24 illustrates a sample output report showing a comparison of a claim in a subject patent document with a claim in a reference patent document.

FIG. 24 illustrates a sample output report containing an automatically generated claim chart. Reports of this type may also be generated from an embodiment of content analysis software. Referring to FIG. 24, a claim chart report 2400 is shown, and it includes one or more claims from subject patent content in column 2402, and similar strings, as determined by the content analysis software, from reference content shown in column 2404.

FIG. 25 shows another possible output report from the content analysis software. Reports of this type may be generated from an embodiment of content analysis software. Specifically, it illustrates reference items that were determined to be similar to a subject patent document, and contains claim charts between claim text inside the subject patent content and content from each reference item. The report shown in FIG. 25 may list as many claim charts as desired. Typically, the list of references may extend as far as a user or computer program wishes by setting thresholds for similarity scores.

Referring to the example in FIG. 25, a header area 2500 shows some details of subject patent content. Area 2500 shows a subject patent identifier, a title, a priority date and an abstract but clearly it may show any number of fields from patent content, such as associated classifications, inventors, assignees, to other information. Area 2502 of the report shows a list of reference items found relevant, based on similarity scores. The references may be listed in order of descending overall similarity score, based on descending logical similarity score, or if the list has already been filtered to include reference items with similarity scores in a range, the items may simply be listed randomly or by date. In area 2502, an identifier column 2504 is shown where an identifier for the reference item may be displayed. For example, in the case of a content located on the World Wide Web, a URL may be displayed. In the case of patent content, the identifier may just consist of a patent number and/or a designation of the area the patents are from. Other identifiers may include the title of content, a unique identifier corresponding to records in a database, or other indicia. In the example shown in FIG. 25, a priority date column 2506 is displayed which may show a date associated with each reference item. This may be useful so that a user can glance at the report and see how close the date is to the date of the subject content. Column 2508 includes assignee or owner, and may indicate an entity associated with ownership of the reference content, if any. In the example shown in area 2502, the references found are listed as rows. For example, row 2512 lists information about a reference determined to be similar to the subject patent. Notably, the items may be hyperlinks. For example, the hyperlink corresponding to 2512 may navigate a browser window to the location of the reference content so that the user may access the reference quickly. Also, hyperlinks within the report may navigate to the claim charts further down in the same report or to separate reports containing claim charts. For example, hyperlink 2516 may navigate to area 2548 that contains the first claim chart.

Still referring to FIG. 25, area 2548 shows a first claim chart corresponding to the first reference item 2512 in reference header area 2502. Column 2550 may include claim strings of a claim from the subject patent content described in area 2500, and column 2552 may contain strings within the specification of the subject patent content and/or from, the subject patent file history that are determined to be similar to (based on logical or centroid scores) each claim string of the claim. Column 2554 may contain strings from the reference item 2512 determined to be similar to (based on logical or centroid scores) each corresponding claim string listed in column 2550.

Still referring to FIG. 25, area 2556 shows a second claim chart corresponding to the second row 2514 in reference header area 2502. Column 2558 may include claim strings of a claim from the subject patent content that was described in area 2500, and column 2560 may contain strings within the specification of the subject patent content or from the subject patent file history that are determined to be similar to or support each claim string of the claim. As before, column 2562 may contain strings determined to be similar to each corresponding claim string listed in column 2562.

FIG. 25 may also include a third claim chart (not shown), using content from the third reference item listed in header area 2502. Again, the sample report 2500 shows one variation of fields and items that may be useful in a search report. Clearly, many variations are possible. The report may show other fields, such as the abstract and/or summary of reference items, publication date of reference items, or any other information extracted from the subject or reference content.

Reports Listing Combinations of References that are Similar to Subject Content

Sometimes a single reference may not contain all of the content needed to fully meet query criteria, and where that is the case, it may be useful and desirable to find content from multiple references, that when combined together, meet query criteria or contain all of the claim strings of subject text. A method to determine similar reference documents to claim strings of a subject document were described in relation to FIG. 17.

Figure 26:
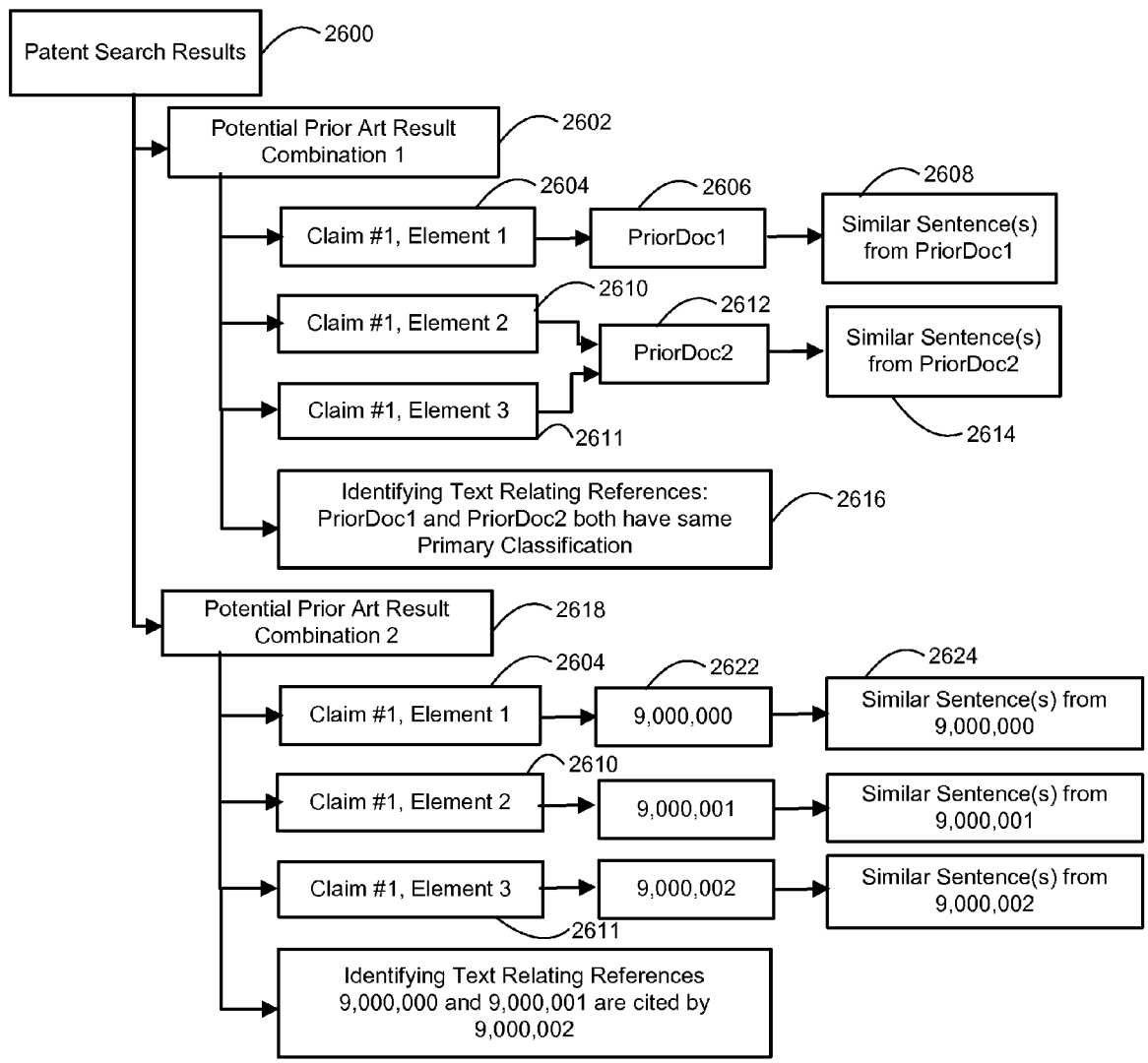
FIG. 26 illustrates a sample data structure for storing patent claim search results, wherein each claim string may link to one or more references.

FIG. 26 illustrates an example data structure 2600 that may result from searching for combinations of references that may be compared with a claim from a subject patent document. The data structure of FIG. 26 may be generated by an embodiment of the content analysis software. The first query result 2602 is associated with claim 1, which in the example, has three claim strings 2604, 2610, and 2611. Claim string 2604 has been matched with Prior Art Document 2606, and one or more similar strings 2608 found inside the Prior Art Document 2606. Claim string 2610, also part of the first claim in the example subject patent document, has been matched with Prior Art Document 2612. Also, Prior Art Document 2612 was found to contain text that was similar in meaning to claim string 2611. Strings from Prior Art Document 2614 that are similar in meaning to claim strings 2610 and 2611 are also associated with the result 2602. As previously described, each query result may also optionally comprise an explanation or motivation for the combination of prior art documents. In the example query result 2602, text 2616 contains information relating to the reason for the combination of prior art document reference 2606 and prior art document reference 2612.

Still referring to FIG. 26, a second query result 2618 is displayed. In this example of a query result, result 2618 is associated with three separate references. As before, the content analysis software may determine strings in each reference that are similar with corresponding claim strings of the subject patent document. For example, in the result 2618, claim string 2604 is matched with reference 2622, and one or more similar strings from reference 2622 are identified and stored in field 2624.

Figure 27:
FIG. 27 illustrates a sample report showing a comparison of a subject patent claim against multiple references.

FIG. 27 depicts an automatically generated claim chart that may be generated from a hierarchical data structure similar to the data structure shown in FIG. 26. Reports of the type shown in FIG. 27 may be generated by an embodiment of the content analysis software. The report Area 2700 may comprise a header section that contains a list of results. In the example shown in FIG. 27, only one query result is depicted, but obviously any number of results may be shown, where each result contains two or more references. Each query result is associated with two or more references, and sample area 2700 lists three documents that each meet a part of the query text. In the example of FIG. 27, the query text is from a claim of a subject patent document. Section 2700 shows details of three reference files listed, and may contain hyperlinks to these documents so that a user may easily browse to the references. The report shown in FIG. 27 may also display a motivation or reason for combining the references, as indicated in example column 2701.

Also, the sample report of FIG. 27 may contain an automatically generated claim chart using the reference documents found. For example, area 2702 contains a chart using the references found in the query result. Column 2704 may contain claim strings of the claim, optional column 2706 may contain supporting strings or text from the specification of the subject patent document, and column 2708 may contain text from the references associated with the result. In the example given in FIG. 27, the first claim string is satisfied by text in a first reference document, the second claim string is satisfied by text in a second reference document, and the third claim string is satisfied by text in a third reference document.

Portfolio Score Reports

Figure 28:
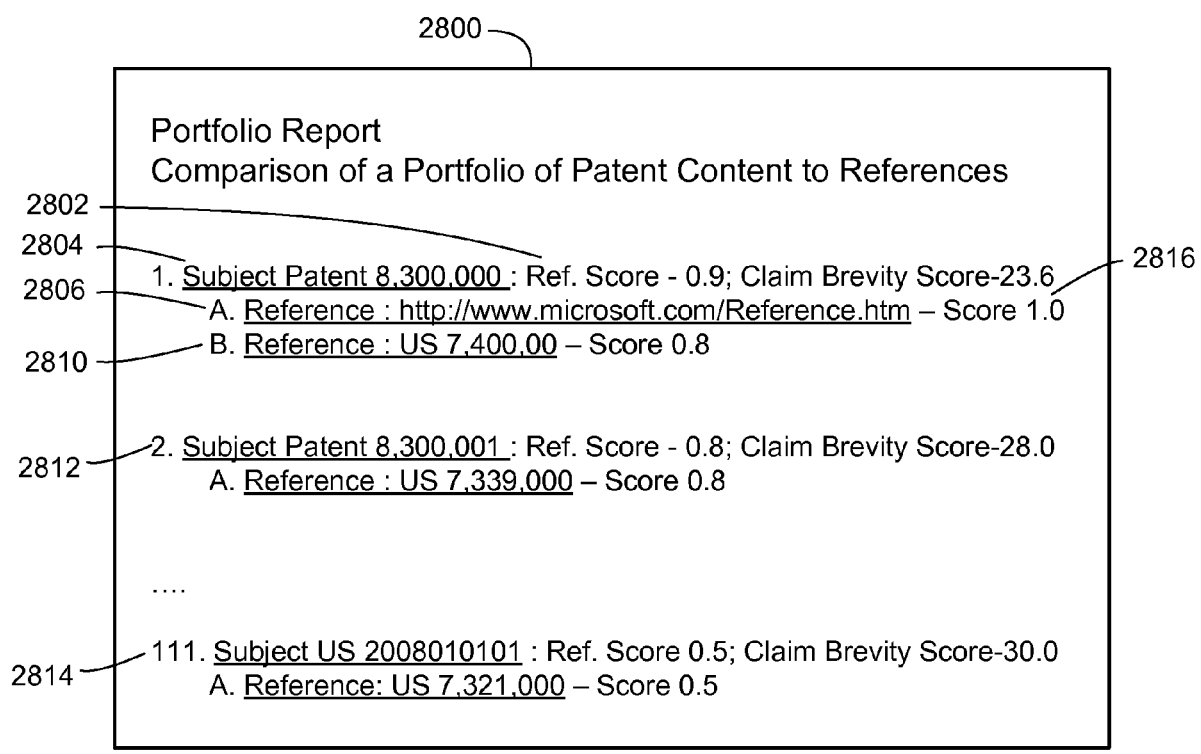
FIG. 28 illustrates a sample output report showing a comparison of a portfolio of subject patents with one or more reference documents relevant to each subject patent in the portfolio.

FIG. 28 shows a sample report 2800 for a comparison of a set of subject content items with a set of reference items. Reports of this type may be generated from an embodiment of content analysis software. One use for the report 2800 may be to list candidate subject patent content that may read against some or all reference content. This may aid in prioritizing searches for art for a queue of patent content, and/or it may aid in reviews that involve comparing a portfolio of patent documents against a set of reference items. In the sample report of FIG. 28, area 2802 shows an overall score of how references compared with one or more claim text inside the subject patent document. The score shown in 2802 may be the mean, median, mode or other average of any or all of the reference scores described earlier. Area 2802 also includes a claim brevity score, which may be the lowest claim brevity score found inside the subject patent document. This may be useful since a searcher may wish to look at subject patents with a lower claim brevity score before looking at other subject patents, because those claims may have fewer limitations, and therefore be easier to find art. Areas 2806 and 2810 show reference items that may be similar to claim text inside the subject patent 2804, and these items may also be listed in descending order of logical or centroid scores. Any number of groups of subject patent and reference items may be listed, and examples are represented as items 2812 and 2814 in the report 2800.

Calculation of Patent Claims Brevity Score

A patent brevity scoring system utilizes the claims of a patent to create a weighted score of claim strings in a claim, and then compound them across dependent claims to represent the overall weight of each claim. A higher compound score indicates a non-brief claim (with longer and more limitations), and a lower compound score indicates a brief claim (shorter with fewer limitations), a weight of 0 (zero) indicates no limitations. However, every claim should have some score value due to the presence of claim strings. The brevity score is useful for the purposes of evaluating the breadth and limitation impediment provided by a set of claims. For example, a claim set of 120 claims can be quickly evaluated for broadest claims by calculating the brevity score for independent claims and compound brevity score for dependent claims. The method may be useful for quickly evaluating large claim sets, especially for patents with hundreds or even thousands of claims.

When dividing a claim into claim strings, one technique is to parse the claims by punctuation to find groups of words that make up a limitation or element. For example, semi-colons, commas, colons and periods may be used as separators of claim strings. More refined methods may consider parts of speech in order to determine the end of clauses, and may further employ natural language processing tools to determine distinct claim strings. This can be solved in a variety of ways by a person of ordinary skill in the art.

To illustrate the usage, patent claims from U.S. Pat. No. 7,052,410 are used as an example of brevity score calculation. Table 2 shows a sample output report of claim brevity score and compound brevity score computed for claims 1-17 of the '410 patent. In the example shown, the broadest claim identified is Independent claim 9 at a Brevity Score of 31.25. Also in the example shown in Table 2, claim 13 would be expected to have a more limited scope than claim 15 due to the significantly higher score. The brevity score allows applications to quickly display the broadest or narrowest claims in claim sets.

TABLE 2

Claim Scores for Claims - 17 of the '410 Patent

| Claim | Claim Text | Brevity Score | Compound Brevity Score | Claim strings |
|---|---|---|---|---|
| Independent Claim 1 | 1. A golf club, comprising: a face; a body having a first end and a second end, said body coupled to said face at said first end, said body extending away from said face; a flange located on a side of said body and oriented at an angle relative to a top edge of said body for receiving a shaft; and a weight coupled to said second end of said body, said weight including ends that are curved toward said face. | 33.25 | | 7 |
| Dependent Claim 2 | 2. The golf club of claim 1, wherein said flange includes a bore for receiving said shaft and said bore is located at a point approximately equidistant from said first and second ends. | | 41.75 | 1 |
| Dependent Claim 3 | 3. The golf club of claim 1, wherein said face has a face length and said body has a body length, said face length | | 43.25 | 2 |

TABLE 2-continued

Claim Scores for Claims - 17 of the '410 Patent

| Claim | Claim Text | Brevity Score | Compound Brevity Score | Claim strings |
|---|---|---|---|---|
| | being substantially equal to said body length. | | | |
| Dependent Claim 4 | 4. The golf club of claim 1, wherein said weight is substantially symmetrically coupled to said body. | | 37.75 | 1 |
| Dependent Claim 5 | 5. The golf club head of claim 1, wherein said body member including weight-removing bores therethrough. | | 37.25 | 1 |
| Dependent Claim 6 | 6. The golf club head of claim 1, wherein said face and said body are arranged in a t-shape configuration. | | 38.25 | 1 |
| Dependent Claim 7 | 7. The golf club head of claim 1, wherein said weight ends are closer to said face than a middle portion of said weight. | | 39.25 | 1 |
| Dependent Claim 8 | 8. The golf club head of claim 1, wherein said weight is coupled to said body at a central portion of said weight, and wherein said weight ends are closer to said face than said weight central portion. | | 44.75 | 2 |
| Independent Claim 9 | 9. A golf club, comprising: a face member having a strike surface and a rear surface opposite said strike surface; a body member having a first end and a second end, said first end being coupled to said face member rear surface substantially perpendicular to said face member, said body member including weight-removing bores therethrough; and a weight member symmetrically coupled to said body member opposite said face member, said weight member including ends that are curved toward said face member. | 31.25 | | 6 |
| Dependent Claim 10 | 10. The golf club of claim 9, wherein: said face member has a face width and a face length, said face length being greater than said face width; said body member has a body width and a body length, said body length being greater than said body width; and wherein said face length is approximately equal to said body length. | | 54.50 | 5 |
| Dependent Claim 11 | 11. The golf club of claim 10, wherein said body member includes a bore for attaching a shaft thereto. | | 59.50 | 1 |
| Dependent Claim 12 | 12. The golf club of claim 11, wherein said bore is positioned on said body member such that it is approximately equidistant from said first and second ends. | | 66.75 | 1 |
| Dependent Claim 13 | 13. The golf club of claim 11, wherein said bore is on a side of said body member at | | 67.00 | 1 |
| Dependent Claim 14 | an angle to a top edge of said body member.<br>14. The golf club of claim 9, wherein said body member comprises two rails, said rails being substantially parallel and extending from said rear surface to said weight member. | | 40.75 | 2 |
| Dependent Claim 15 | 15. The golf club head of claim 9, wherein said face member and said body member are arranged in a t-shape configuration. | | 36.75 | 1 |
| Dependent Claim 16 | 16. The golf club head of claim 9, wherein said weight member ends are closer to said face member than a middle portion of said weight member. | | 38.00 | 1 |
| Dependent Claim 17 | 17. The golf club head of claim 9, wherein said weight member is coupled to said body member at a central portion of said weight member, and wherein said weight member ends are closer to said face member than said weight member central portion. | | 44.25 | 2 |

Figure 29:
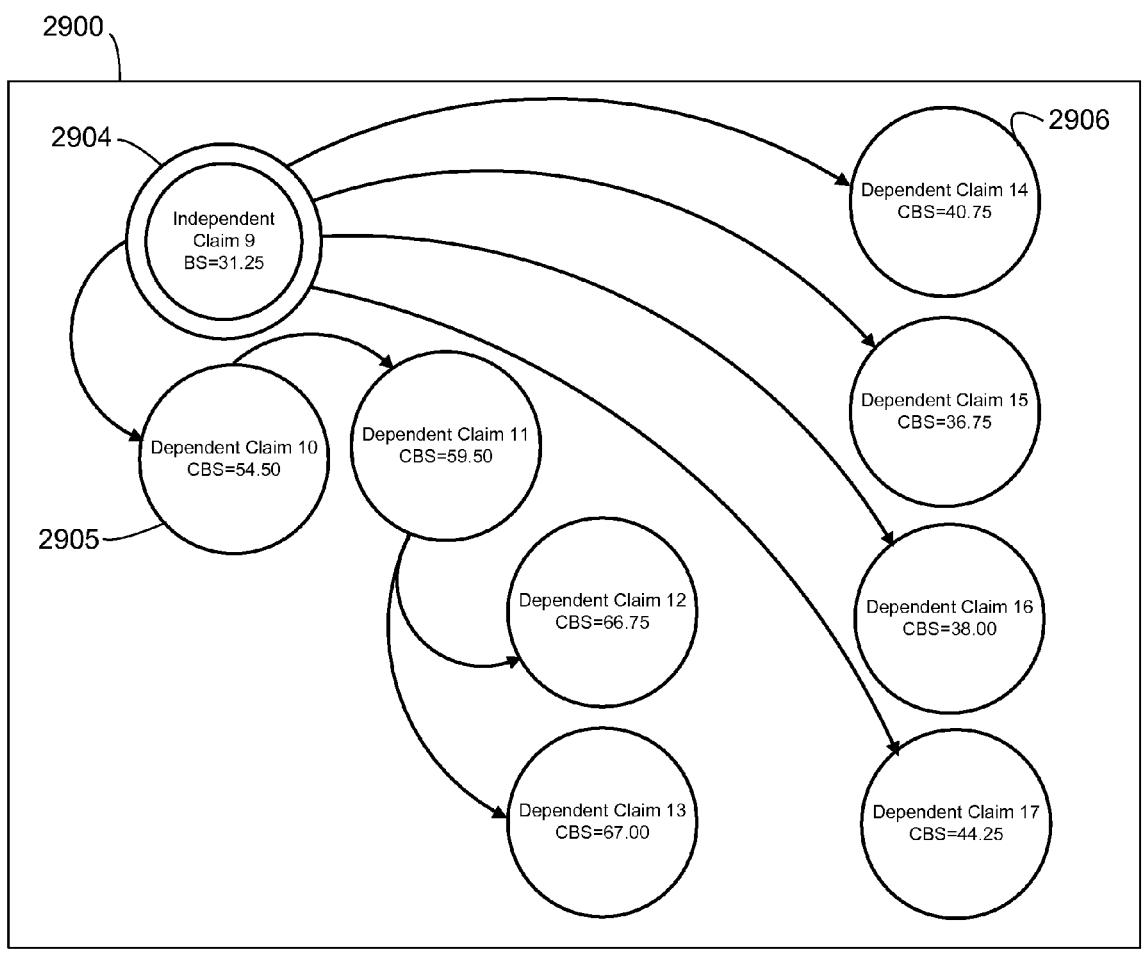
FIG. 29 illustrates the structure of some sample claims that may be analyzed for brevity.

FIG. 29 shows a pictorial view of some of the claims of the '410 patent. It can quickly be seen that claim 10 2905 depends on claim 9 2904, and claim 11 depends on claim 10 2905. Since the brevity score of a dependent claim incorporates the score of the independent claim from which it depends, the claim 10 score includes the score for claim 9 (31.25) plus a score calculated for the text associated just with claim 10. Similarly, the score for claim 14 2906 that depends on claim 9 2904 includes the score for claim 9 plus a score calculated just for the text associated with claim 14.

Figure 30:
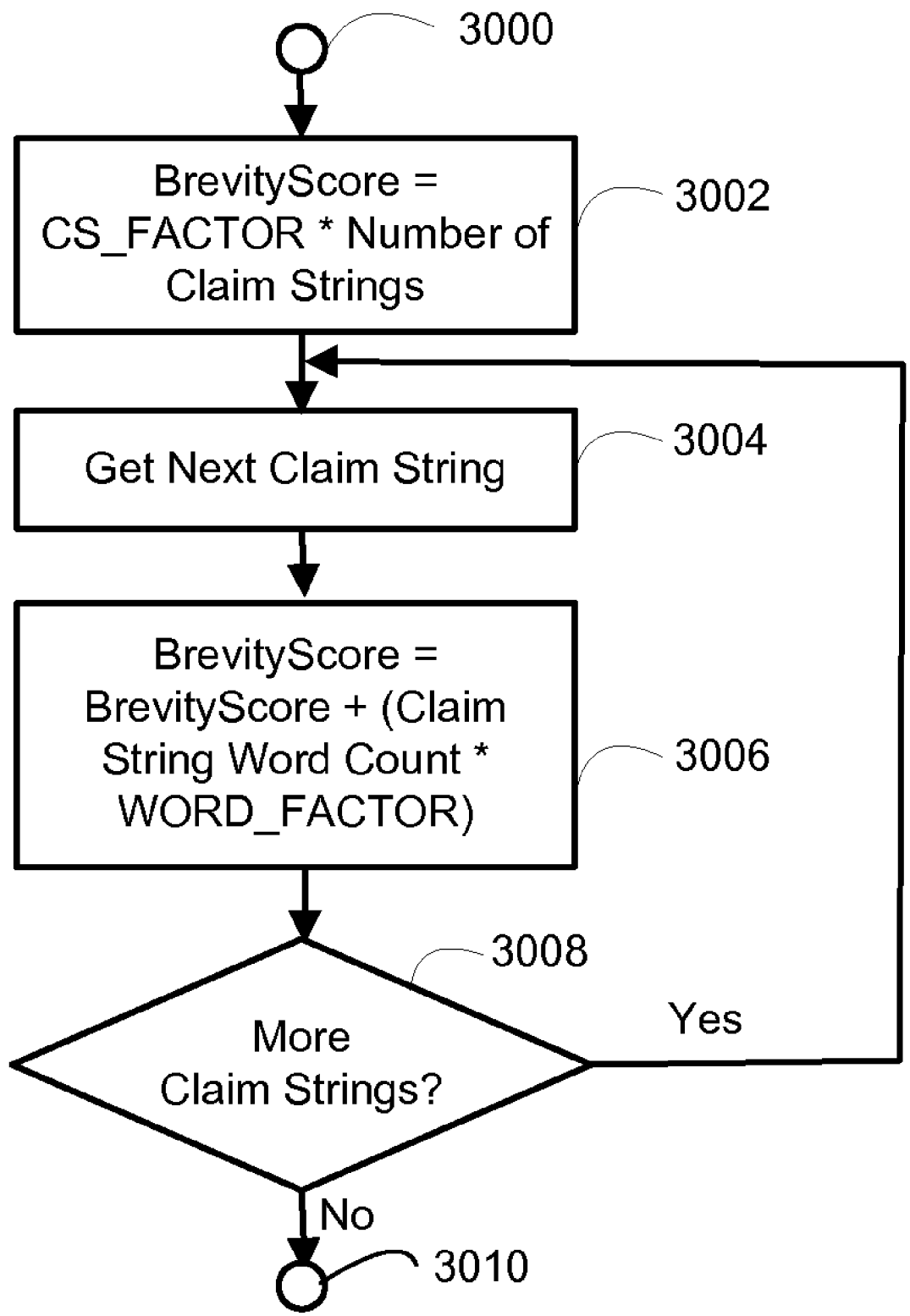
FIG. 30 illustrates a method for calculating base brevity score.

Referring to FIG. 30, a method for calculation of a claim brevity score is shown. The calculation uses weighting factors CS_FACTOR and WORD_FACTOR to tune the output of the function. The CS_FACTOR and WORD_FACTOR constants can be altered to a particular data set, or selected for their general applicability to all patents. In one embodiment, CS_FACTOR has a value of 2.0 and WORD_FACTOR has a value of 0.25. Advanced claim string identification techniques may also introduce negative brevity values computed in the sum for representing broadening claim strings, or those that are more desirable. Further, a dictionary of established word values and claim string values can be compiled to assign static known constants to those terms that spuriously affect the score, or those that are desirable for adjustment.

At starting step 3000, a claim from a patent has been parsed into claim strings. Step 3002 initializes the claim brevity score variable to CS_FACTOR multiplied by the number of claim strings in the claim. In step 3004, the next claim string is retrieved from the claim text. This claim string is now known as the current claim string. In step 3006, the brevity score variable is set to itself plus the current claim string word count multiplied by WORD_FACTOR. The program then proceeds to conditional step 3008 which tests if there are more claim strings. If conditional step 3008 evaluates to true, the program loops back to before step 3004. If conditional step 3008 evaluates to false, the program reaches end state 3010, and the claim brevity score has been calculated.

Each dependent claim accumulates a compound brevity score from all of the claims it depends on. For example, in the example of FIG. 29, claim 10 depends on claim 9; so the claim 10 compound brevity score is the sum of its own simple brevity score plus the brevity score of claim 9.

Figure 31:
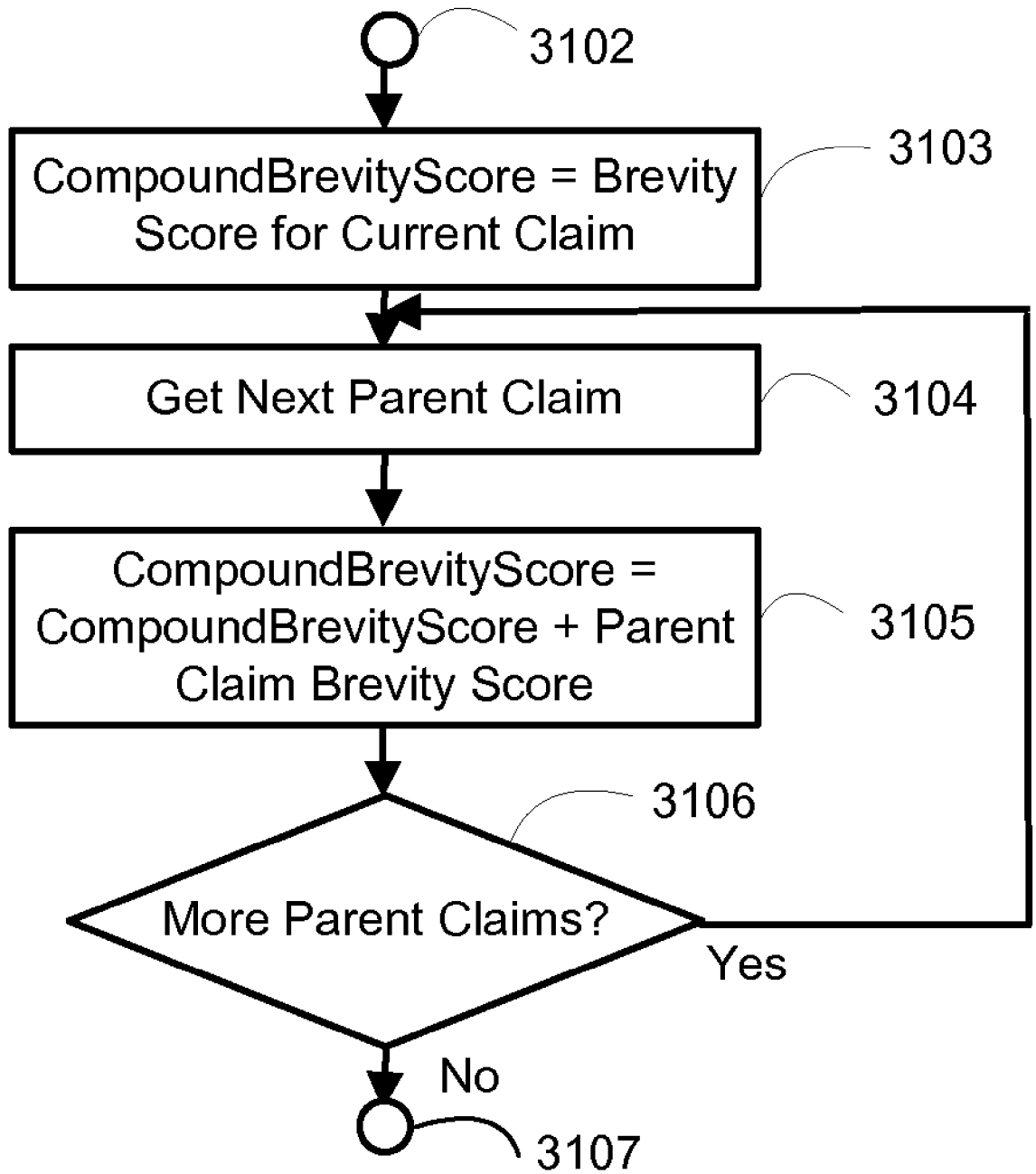
FIG. 31 illustrates a method for calculating compound brevity score.

Referring to FIG. 31, a method for calculation of brevity score for dependent claims is shown. At starting stage 3102, the dependent claim text has been retrieved, and there is access to the chain of parent claims. At step 3103 the brevity score for the text of the dependent claim is calculated using the method described in relation to FIG. 30. At step 3104, the parent claim is retrieved, and in step 3105 the brevity score for the text of the parent claim is added to the current compound brevity score. In conditional step 3106, the program routine tests if there is another parent further up the claim chain, and if so, the program loops back to before step 3104. If there is not, the program proceeds to end state 3107 where the compound brevity score for the dependent claim has been calculated.

We claim:

1. A method in a computer to automatically analyze a dependent claim, the method in the computer comprising:
   by the computer, parsing the dependent claim to obtain one or more claim strings, each claim string comprising words within a separate dependent claim element of the dependent claim and each claim string corresponding to the separate dependent claim element of the dependent claim;
   by the computer, determining a number of claim strings;
   by the computer, generating a number of claim strings score by merging the number of claim strings with a first factor;
   initializing a dependent claim score to the number of claim strings score; and
   for each claim string parsed from the dependent claim:
      by the computer, computing a word count for the words within the claim string,
      by the computer, determining a weighted word count based on the word count and a second factor,
      by the computer, merging the weighted word count with the dependent claim score;
   by the computer, determining a parent claim score associated with a parent claim of the dependent claim;
   merging the parent claim score with the dependent claim score.

2. The method in the computer of claim 1, where parsing employs a natural language processing system, the natural language processing system determining parts of speech of claim words and logical relations between claim words, each logical relation comprising two or more words and a logical relationship between the two or more words; and
   in response to the parts of speech and logical relations associated with the claim words, determining claim strings partially based on the parts of speech and logical relations.

3. The method in the computer of claim 2, further comprising generating output data that comprises one or more rows, where each row comprises a dependent claim and the dependent claim score for the dependent claim, the rows ordered from broadest dependent claim to narrowest dependent claim according to the dependent claim score.

4. The method in the computer of claim 2, further comprising:
   determining a broadest claim according to a minimum claim score; and
   displaying the broadest claim.

5. The method in the computer of claim 1, further comprising:
   determining a broadest claim according to a minimum claim score for a first document;
   determining a broadest claim according to another minimum claim score for a second document;
   generating a display including an identifier associated with the first document, an identifier associated with the second document, wherein the identifiers are ordered by minimum claim score.

6. The method in the computer of claim 1, wherein the first factor associated with the number of claim strings is about 2.0 and the second factor associated with the word count is about 0.25.

7. A method in a computer comprising:
   automatically parsing a dependent claim to obtain one or more claim strings, each claim string comprising words within a dependent claim element;
   automatically determining a number of claim strings within the dependent claim;
   automatically generating a number of claim strings score by merging the number of claim strings with a first factor;
   automatically initializing a dependent claim score to the number of claim strings score;
   for each claim string parsed from the claim:
      automatically computing a word count for the words within the claim string;
      automatically determining a weighted word count based on the word count and a second factor;
      automatically merging the weighted word count with the dependent claim score;
   automatically determining a parent claim score associated with a parent claim of the dependent claim;
   automatically merging the parent claim score with the dependent claim score;
   displaying the dependent claim and the dependent claim score in a hierarchical display.

8. The method in the computer of claim 7, where parsing employs a natural language processing system, the natural language processing system determining logical relations between claim words, each logical relation comprising two or more words and a logical relationship between the two or more words.

9. The method in the computer of claim 7, further comprising generating output data that comprises one or more rows, where each row comprises a claim and the claim score for the claim, the rows ordered from broadest claim to narrowest claim according to the claim score.

10. The method in the computer of claim 7, further comprising:
    determining a broadest claim according to a minimum claim score; and
    displaying the broadest claim.

11. The method performed by the computer of claim 7, further comprising:
    determining a broadest claim according to a minimum claim score for a first document;
    determining a broadest claim according to another minimum claim score for a second document;

generating a display including an identifier associated with the first document, an identifier associated with the second document, wherein the identifiers are ordered by minimum claim score.

12. A system for performing claim analysis, comprising:
a computer, comprising:
an analysis application configured to perform steps, comprising:
parsing a dependent claim to obtain one or more claim strings, each claim string comprising words within a dependent claim element;
determining a number of claim strings of the dependent claim;
initializing a dependent claim score by merging the number of claim strings with a first factor; and
for each claim string parsed from the dependent claim:
computing a word count for the words within the claim string,
determining a weighted word count based on the word count and a second factor,
merging the weighted word count to the dependent claim score;
determining a parent claim score associated with a parent claim of the dependent claim; and
merging the parent claim score with the dependent claim score.

13. The system of claim 12, further comprising:
a natural language processing system wherein the natural language processing system determines logical relations within the claim, each logical relation comprising two or more words and a logical relationship between the two or more words, and the natural language processing system determines the claim strings based on logical relations.

14. The system of claim 12, the analysis application further configured to perform steps for:
generating output data that comprises one or more rows, where each row comprises a claim and the claim score for the claim, the rows ordered from broadest claim to narrowest claim according to the claim score.

15. The system of claim 12, further configured to perform steps for:
determining a broadest claim according to a minimum claim score; and
displaying the broadest claim.

16. The system of claim 12, further configured to perform steps for:
determining a broadest claim according to a minimum claim score for a first document;
determining a broadest claim according to another minimum claim score for a second document;
generating a display including an identifier associated with the first document, an identifier associated with the second document, wherein the identifiers are ordered by minimum claim score.

17. The system of claim 12, wherein the first factor associated with the number of claim strings is about 2.0 and the second factor associated with the word count is about 0.25.

18. The system of claim 17, wherein merging the number of claim strings with the first factor comprises multiplying the number of claim strings by about 2.0.

19. The system of claim 18, wherein determining the weighted word count comprises multiplying the word count by about 0.25.

* * * * *